(12) United States Patent
Sumi

(10) Patent No.: US 8,010,710 B2
(45) Date of Patent: *Aug. 30, 2011

(54) APPARATUS AND METHOD FOR IDENTIFYING DEVICE TYPE OF SERIALLY INTERCONNECTED DEVICES

(75) Inventor: Shuji Sumi, Kanata (CA)

(73) Assignee: MOSAID Technologies Incorporated, Ottawa, Ontario (CA)

( * ) Notice: Subject to any disclaimer, the term of this patent is extended or adjusted under 35 U.S.C. 154(b) by 208 days.

This patent is subject to a terminal disclaimer.

(21) Appl. No.: 11/692,326

(22) Filed: Mar. 28, 2007

(65) Prior Publication Data

US 2008/0215778 A1    Sep. 4, 2008

Related U.S. Application Data

(60) Provisional application No. 60/892,712, filed on Mar. 2, 2007, provisional application No. 60/889,572, filed on Feb. 13, 2007.

(51) Int. Cl.
| | |
|---|---|
| G06F 3/00 | (2006.01) |
| G06F 13/00 | (2006.01) |
| G06F 9/00 | (2006.01) |
| G06F 9/24 | (2006.01) |
| G06F 15/177 | (2006.01) |
| G06F 1/24 | (2006.01) |

(52) U.S. Cl. ....... 710/8; 710/1; 710/9; 710/10; 710/104; 710/3; 713/1; 713/2; 713/100

(58) Field of Classification Search .................. 710/3, 1, 710/8, 9, 10, 104; 713/1, 2, 100
See application file for complete search history.

(56) References Cited

U.S. PATENT DOCUMENTS 4,174,536 A    11/1979 Misunas et al.
(Continued)

FOREIGN PATENT DOCUMENTS

EP    1717985    11/2006
(Continued)

OTHER PUBLICATIONS

Craig L. King, Ezana Haile, Microchip Technology Inc., "Communicating with Daisy Chained MCP42XXX Digital Potentiometers", 2001, pp. 1-8.
(Continued)

Primary Examiner — Alford W Kindred
Assistant Examiner — Farley Abad
(74) Attorney, Agent, or Firm — Leslie A. Kinsman; Borden Ladner Gervais LLP

(57) ABSTRACT

A memory controller is unaware of device types of a plurality of memory devices in a serial interconnection configuration. Possible device types include, e.g., random access memories (DRAM, SRAM, MRAM) and NAND-, NOR- and AND-type Flash memories. Each device has device type information on its device type. Each device is capable of performing a "+1" to an input search number. First, the memory controller sends a specific device type ("don't care") and an initial search number. Each device performs the "+1" calculation. The last device provides the memory controller with an N×"+1" search number from which the memory controller can recognize the total number of devices in the serial interconnection configuration. Thereafter, the memory controller sends a pre-determined device number for device type matching. Each device performs device type match determination of "previous match", "present match" and "don't care match" and based on the match determination, the input search number is or is not modified and propagated through the devices. From the propagated search number, the memory controller can identify the device type of each device.

44 Claims, 41 Drawing Sheets

U.S. PATENT DOCUMENTS

| | | | |
|---|---|---|---|
| 4,360,870 A | 11/1982 | McVey | |
| 4,617,566 A | 10/1986 | Diamond | |
| 4,733,376 A | 3/1988 | Ogawa | |
| 4,796,231 A | 1/1989 | Pinkham | |
| 5,126,808 A | 6/1992 | Montalvo et al. | |
| 5,136,292 A | 8/1992 | Ishida | |
| 5,175,819 A | 12/1992 | Le Ngoc et al. | |
| 5,204,669 A | 4/1993 | Dorfe et al. | |
| 5,243,703 A | 9/1993 | Farmwald et al. | |
| 5,249,270 A | 9/1993 | Stewart et al. | |
| 5,280,539 A | 1/1994 | Yeom et al. | |
| 5,319,598 A | 6/1994 | Aralis et al. | |
| 5,365,484 A | 11/1994 | Cleveland et al. | |
| 5,404,460 A | 4/1995 | Thomsen et al. | |
| 5,430,859 A | 7/1995 | Norman et al. | |
| 5,440,694 A | 8/1995 | Nakajima | |
| 5,452,259 A | 9/1995 | McLaury | |
| 5,473,563 A | 12/1995 | Suh et al. | |
| 5,473,566 A | 12/1995 | Rao | |
| 5,473,577 A | 12/1995 | Miyake et al. | |
| 5,535,336 A | 7/1996 | Smith et al. | |
| 5,596,724 A | 1/1997 | Mullins et al. | |
| 5,602,780 A | 2/1997 | Diem et al. | |
| 5,636,342 A | 6/1997 | Jeffries | |
| 5,671,178 A | 9/1997 | Park et al. | |
| 5,721,840 A | 2/1998 | Soga | |
| 5,740,379 A | 4/1998 | Hartwig | |
| 5,761,146 A | 6/1998 | Yoo et al. | |
| 5,771,199 A | 6/1998 | Lee | |
| 5,802,006 A | 9/1998 | Ohta | |
| 5,806,070 A | 9/1998 | Norman et al. | |
| 5,809,070 A * | 9/1998 | Krishnan et al. | 375/222 |
| 5,818,785 A | 10/1998 | Ohshima | |
| 5,828,899 A | 10/1998 | Richard et al. | |
| 5,835,935 A | 11/1998 | Estakhri et al. | |
| 5,859,809 A | 1/1999 | Kim | |
| 5,872,994 A | 2/1999 | Akiyama et al. | |
| 5,937,425 A | 8/1999 | Ban | |
| 5,941,974 A | 8/1999 | Babin | |
| 5,954,804 A | 9/1999 | Farmwald et al. | |
| 5,959,930 A | 9/1999 | Sakurai | |
| 5,995,417 A | 11/1999 | Chen et al. | |
| 6,002,638 A | 12/1999 | John | |
| 6,009,479 A | 12/1999 | Jeffries | |
| 6,085,290 A | 7/2000 | Smith et al. | |
| 6,091,660 A | 7/2000 | Sasaki et al. | |
| 6,107,658 A | 8/2000 | Itoh et al. | |
| 6,144,576 A | 11/2000 | Leddige et al. | |
| 6,148,364 A | 11/2000 | Srinivasan et al. | |
| 6,178,135 B1 | 1/2001 | Kang | |
| 6,304,921 B1 | 10/2001 | Rooke | |
| 6,317,350 B1 | 11/2001 | Pereira et al. | |
| 6,317,352 B1 | 11/2001 | Halbert et al. | |
| 6,317,812 B1 | 11/2001 | Lofgren et al. | |
| 6,438,064 B2 | 8/2002 | Ooishi | |
| 6,442,098 B1 | 8/2002 | Kengeri | |
| 6,453,365 B1 | 9/2002 | Habot | |
| 6,535,948 B1 | 3/2003 | Wheeler et al. | |
| 6,567,904 B1 | 5/2003 | Khandekar et al. | |
| 6,584,303 B1 | 6/2003 | Kingswood et al. | |
| 6,594,183 B1 | 7/2003 | Lofgren et al. | |
| 6,601,199 B1 | 7/2003 | Fukuda et al. | |
| 6,611,466 B2 | 8/2003 | Lee et al. | |
| 6,658,509 B1 | 12/2003 | Bonella et al. | |
| 6,658,582 B1 | 12/2003 | Han | |
| 6,680,904 B1 | 1/2004 | Kaplan et al. | |
| 6,715,044 B2 | 3/2004 | Lofgren et al. | |
| 6,718,432 B1 | 4/2004 | Srinivasan | |
| 6,732,221 B2 | 5/2004 | Ban | |
| 6,754,807 B1 | 6/2004 | Parthasarathy et al. | |
| 6,763,426 B1 | 7/2004 | James et al. | |
| 6,807,103 B2 | 10/2004 | Cavaleri et al. | |
| 6,816,933 B1 | 11/2004 | Andreas | |
| 6,850,443 B2 | 2/2005 | Lofgren et al. | |
| 6,853,557 B1 | 2/2005 | Haba et al. | |
| 6,853,573 B2 | 2/2005 | Kim et al. | |
| 6,928,501 B2 | 8/2005 | Andreas et al. | |
| 6,944,697 B2 | 9/2005 | Andreas | |
| 6,950,325 B1 | 9/2005 | Chen | |
| 6,967,874 B2 | 11/2005 | Hosono | |
| 6,996,644 B2 * | 2/2006 | Schoch et al. | 710/107 |
| 7,032,039 B2 | 4/2006 | DeCaro | |
| 7,043,630 B1 | 5/2006 | Xia | |
| 7,073,022 B2 | 7/2006 | El-Batal et al. | |
| 2002/0188781 A1 | 12/2002 | Schoch et al. | |
| 2003/0074505 A1 | 4/2003 | Andreas et al. | |
| 2003/0128702 A1 * | 7/2003 | Satoh et al. | 370/390 |
| 2003/0221061 A1 | 11/2003 | El-Batal et al. | |
| 2004/0001380 A1 | 1/2004 | Becca et al. | |
| 2004/0019736 A1 | 1/2004 | Kim et al. | |
| 2004/0024960 A1 | 2/2004 | King et al. | |
| 2004/0039854 A1 | 2/2004 | Estakhri et al. | |
| 2004/0148482 A1 * | 7/2004 | Grundy et al. | 711/167 |
| 2004/0199721 A1 | 10/2004 | Chen | |
| 2004/0230738 A1 | 11/2004 | Lim et al. | |
| 2005/0160218 A1 | 7/2005 | See et al. | |
| 2005/0213421 A1 | 9/2005 | Polizzi et al. | |
| 2005/0273539 A1 | 12/2005 | Yamamoto | |
| 2006/0050594 A1 | 3/2006 | Park | |
| 2006/0200602 A1 | 9/2006 | James | |
| 2007/0165457 A1 | 7/2007 | Kim | |
| 2008/0155046 A1 * | 6/2008 | Swain | 709/208 |
| 2008/0155126 A1 * | 6/2008 | Swain | 709/251 |

FOREIGN PATENT DOCUMENTS

| | | |
|---|---|---|
| WO | 01/69411 | 9/2001 |

OTHER PUBLICATIONS

Samsung Electronics Co. Ltd, "256M×8 Bit / 128 M×16 Bit / 512M×8 Bit NAND Flash Memory", K9K4G08U1M, May 6, 2005, pp. 1-41.

Toshiba, "2GBIT (256M×8 Bits) CMOS NAND E2PROM", TH58NVG1S3AFT05, May 19, 2003, pp. 1-32.

Amtel Corp., "High Speed Small Sectored SPI Flash Memory", pp. 1-22, 2006.

64 Megabit CMOS 3.0 Volt Flash Memory with 50MHz SPI, Spansion, pp. 1-22 (2006).

Intel Corporation, "Intel® Advanced+ Boot Block Flash Memory (C3)", May 2005, pp. 1-72.

M-Systems Flash Disk Pioneers Ltd., "DiskOnChip H1 4Gb (512MByte) and 8Gb (1 GByte) High Capacity Flash Disk with NAND and x2 Technology", Data Sheet, Rev. 0.5 (Preliminary), pp. 1-66, 2005.

Tal, A., "Guidelines for Integrating DiskOnChip in a Host System", AP-DOC-1004, Rev. 1.0, M-Systems Flash Pioneers Ltd., pp. 1-15, 2004.

Samsung Electronics Co. Ltd, OneNAND4G(KFW4G16Q2M-DEB6), OneNAND2G(KFH2G16Q2M-DEB6), OneNAND1G(KFW1G16Q2M-DEB6) Flash Memory, OneNAND™ Specification Ver. 1.2, pp. 1-125, Dec. 23, 2005.

Kennedy, J., et al., "A 2Gb/s Point-to-Point Heterogeneous Voltage Capable DRAM Interface for Capacity-Scalable Memory Subsystems", ISSCC 2004/Session 1/DRAM/11.8, IEEE International Solid-State Circuits Conference, Feb. 15-19, 2004, vol. 1, pp. 214-523.

Kim, Jae-Kwan, et al., "A 3.6Gb/s/pin Simultaneous Bidirectional (SBD) I/O Interface for High-Speed DRAM", ISSCC 2004/Session 22/DSL and Multi-Gb/s I/O 22.7, IEEE International Solid-State Circuits Conference Feb. 15-19, 2004, vol. 1, pp. 414-415.

"HyperTransport TM I/O Link Specification", Revision 2.00, Document No. HTC20031217-0036-00, Hypertransport Technology Consortium, pp. 1-325, 2001.

"IEEE Standard for High-Bandwidth Memory Interface Based on Scalable Coherent Interface (SCI) Signaling Technology (RamLink)", IEEE Std. 1596.4-1996, The Institute of Electrical Electronics Engineers, Inc., pp. i-91, (Mar. 1996).

Oshima, et al., "High-Speed Memory Architectures for Multimedia Applications", Circuits & Devices, IEEE 8755-3996/97, pp. 8-13, Jan. 1997.

Gjessing, S., et al., "RamLink: A High-Bandwidth Point-to-Point Memory Architecture", Proceedings CompCom 1992, IEEE 0-8186-2655-0/92, pp. 328-331, Feb. 24-28, 1992.

Gjessing, S., et al., "Performance of the RamLink Memory Architecture", Proceedings of the Twenty-Seventh Annual Hawaii International Conference on System Sciences, IEEE 1060-3425/94, pp. 154-162, Jan. 1994.

Gjessing, S., et al., "A RAM Link for High Speed", Special Report/Memory, IEEE Spectrum, pp. 52-53, Oct. 1992.

Diamond, S.L., "SyncLink: High: High-speed DRAM for the Future", Micro Standards, IEEE Micro, pp. 74-75, Dec. 1996.

Samsung Electronics, "DDR2 Fully Buffered Dimm 240pin FBDIMMS based on 512Mb C-die" Rev. 1.3, Sep. 2006, pp. 1-32, Sep. 2006.

"HyperTransport TM I/O Link Specification", Revision 3.00, Document No. HTC20051222-0046-0008, Hypertransport Technology Consortium, pp. 1-428, Apr. 2006.

"8-megabit 2.5-volt Only or 2.7-volt Only DataFlash®," Technical Specification, Atmel, Rev. 2225H-DFLSH (2004).

Samsung Electronics, "K9XXG08UXM Preliminary Flash Memory," Technical Specification, Samsung Electronics.

"1024K12CTM CMOS Serial EEPROM," Technical Specification, Microchip Technology Inc., (2006).

"The I2C-Bus Specification," Version 2.1, Philips Semiconductors, Jan. 2000.

"16 Mbit LPC Serial Flash," Preliminary Specification, Silicon Storage Technology Inc., (2006).

"16 Mbit SPI Serial Flash," Preliminary Specification, Silicon Storage Technology Inc., (2005).

"2Mbit, Low Voltage, Serial Flash Memory with 40 Mhz SPI Bus Interface," Technical Specification, STMicroelectronics Group of Companies (2005).

"NAND Flash Applications Design Guide," Revision 1.0, Toshiba America Electronics Components, Inc., (Apr. 2003).

McVey, JM "Programmable Identification for I/O Device", IBM Technical Disclosure Bulletin, Aug. 1979.

PCT Patent Application No. PCT/CA2007/002193 International Search Report dated Apr. 7, 2008.

PCT Patent Application No. PCT/CA2007/002171 International Search Report dated Mar. 17, 2008.

PCT Patent Application No. PCT/CA2007/002173 International Search Report dated Apr. 7, 2008.

PCT Patent Application No. PCT/CA2007/002182 International Search Report dated Mar. 18, 2008.

* cited by examiner

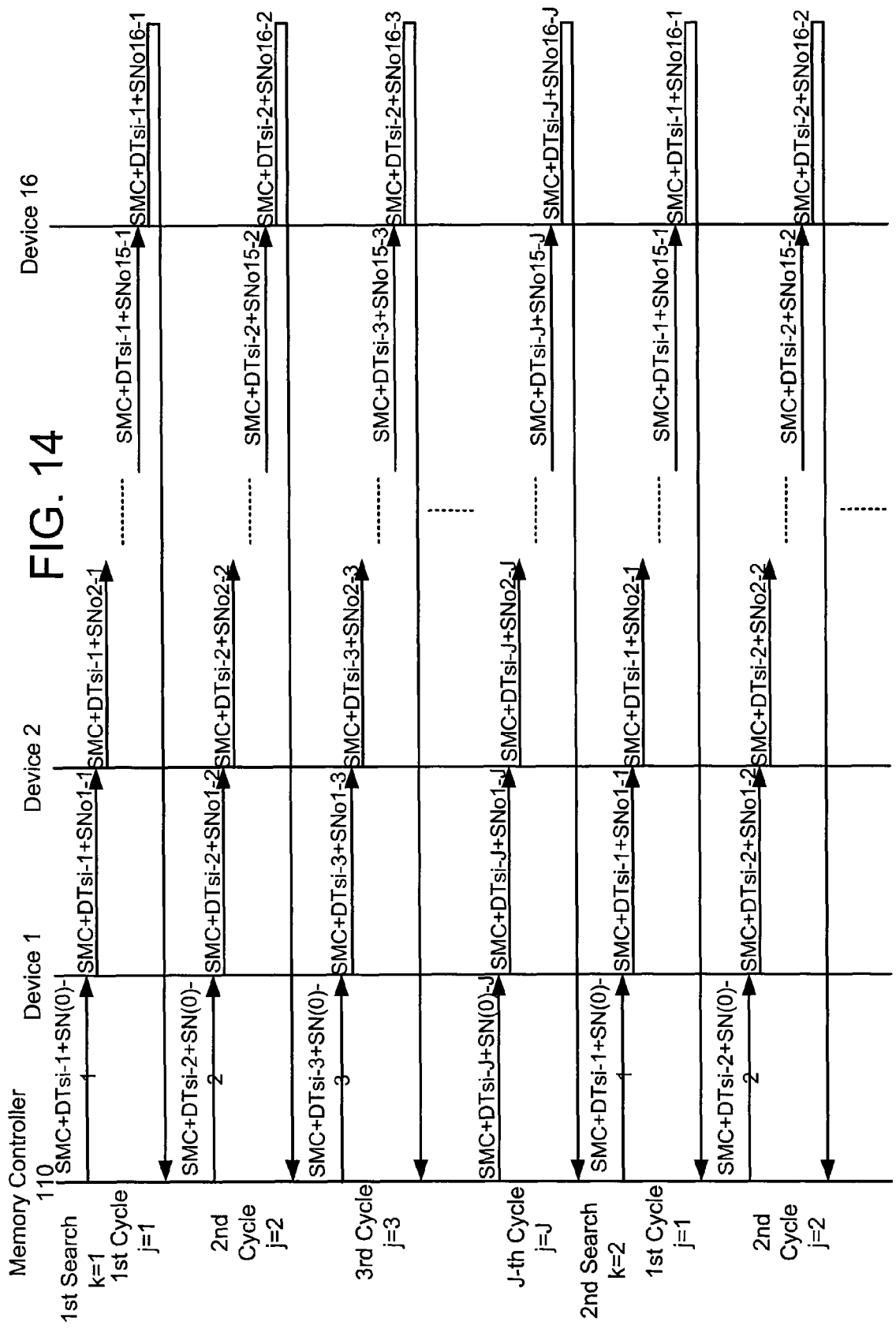

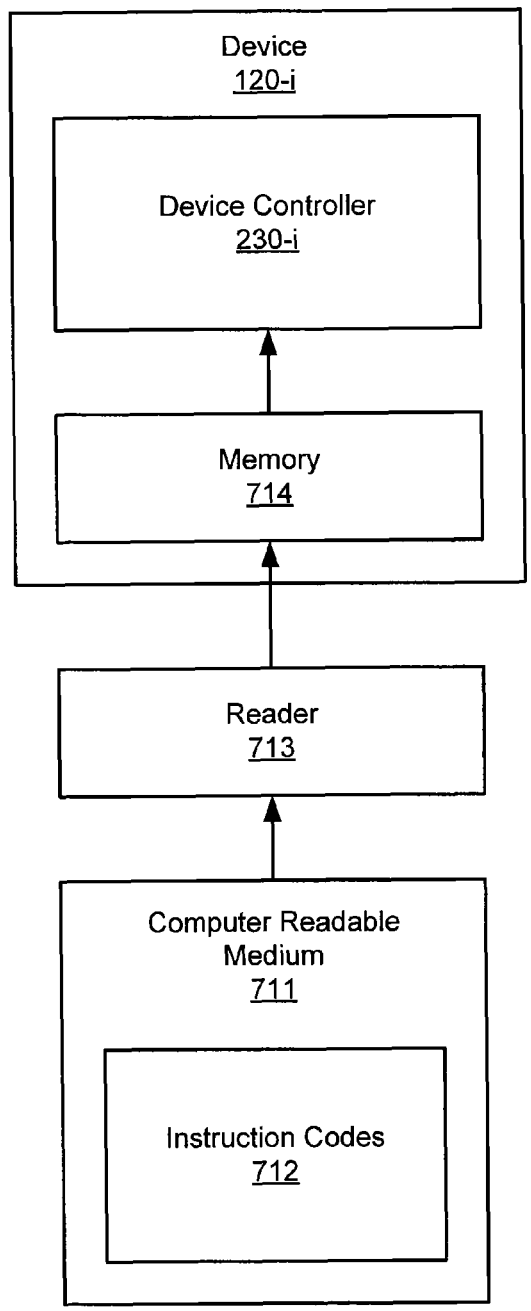
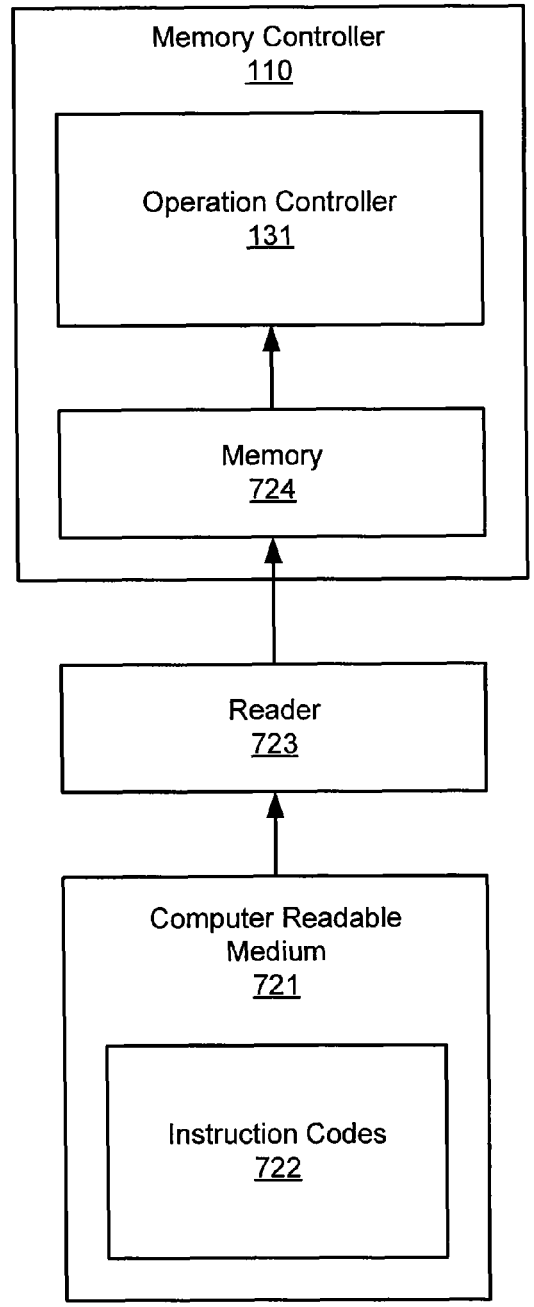
FIG. 25A
FIG. 25B

APPARATUS AND METHOD FOR IDENTIFYING DEVICE TYPE OF SERIALLY INTERCONNECTED DEVICES

CROSS REFERENCE TO RELATED APPLICATIONS

This application claims the benefit of priority from U.S. Provisional Patent Application No. 60/892,712 filed Mar. 2, 2007, the disclosure of which is expressly incorporated herein by reference in its entirety, and from U.S. Provisional Patent Application No. 60/889,572 filed on Feb. 13, 2007.

FIELD OF THE INVENTION

The present invention relates generally to semiconductor device systems. More particularly, the present invention relates to an apparatus and method for identifying types of devices in a serial interconnection configuration.

BACKGROUND OF THE INVENTION

Current electronic equipment uses semiconductor devices such as, for example, memory devices and processing devices. For example, mobile electronic products such as, for example, digital cameras, portable digital assistants, portable audio/video players and mobile terminals continue to require mass storage memories, preferably non-volatile memory with ever increasing capacities and speed capabilities. Non-volatile memory and hard disk drives are preferred since data is retained in the absence of power, thus extending battery life.

While existing memory devices operate at speeds sufficient for many current consumer electronic equipment, such memory devices may not be adequate for use in future electronic products and other products where high data rates are desired. For example, a mobile multimedia device that records high definition moving pictures is likely to require a memory module with a greater programming throughput than one with current memory technology. While such a solution appears to be straightforward, there is a problem with signal quality at such high frequencies, which sets a practical limitation on the operating frequency of the memory. The memory communicates with other components using a set of parallel input/output (I/O) pins, the number of which depends on the desired configuration. The I/O pins receive command instructions and input data, and provide output data. This is commonly known as a parallel interface. High-speed operation may cause deleterious communication effects such as, for example, cross-talk, signal skew and signal attenuation, which degrade signal quality.

In order to incorporate higher density and faster operation on the system boards, there are two design techniques possible: multi-drop and serial interconnection configurations. These design techniques may be used to overcome the density issue that determines the cost and operating efficiency of memory swapping between a hard disk and a memory system. However, multi-drop configurations have shortcomings relative to the serial interconnection of memory systems. For example, if the number of multi-drop memory systems increases, as a result of the loading effect of each pin, the delay time also increases so that the total performance of multi-drop is degraded by the multi-drop connection caused by the wire resistor-capacitor loading and the pin capacitance of the memory device. A serial link may provide a serial interconnection configuration to control command bits, address bits, and data bits effectively through the serial interconnection. In the serial interconnection configuration, each device is identified by a device identifier or a device address.

SUMMARY OF THE INVENTION

In a system including a controller and a plurality of devices, the controller may be unaware of how many devices are connected thereto and/or of the device types. It may be required to recognize a device type of the connected devices for the controller to address a specific device.

In accordance with an aspect of the present invention, there is provided a system comprising: a signal sender for sending a serial input signal including device type information; a serial interconnection configuration of first to N-th devices, N being an integer greater than one, at least one of the devices being capable of determining a device type (DT) to provide a determination result, the DT determination result being transmitted to an other device; and a signal receiver for receiving a serial output signal from the N-th device, the received serial output signal containing the DT determination result.

For example, the devices have unidentified DTs. The devices include either identical DTs or mixed DTs in the serial interconnection configuration.

For example, the signal sender includes an information provider for providing information on a search DT and on a search number (SN). The device may include a device type determiner for determining the DT of the device based on the search DT. In response to a DT determination result, the device may modify the received search DT and/or SN and the DT and SN are transmitted to an other device. With or without being modified, the DT and SN are propagated through the devices in the serial interconnection configuration. From the SN provided by the last device, the total number of the serially interconnected devices can be recognized.

Advantageously, the device includes a DT replacer. When the received DT matches a reference DT associated with the device, the received DT is replaced with a pre-determined DT that matches any of the device type. Also, the device may include an adder of SN to modify the received SN. Furthermore, the device may include a DT match indication holder that holds the DT match determination. In a next search, the held DT match determination will cause the device to skip the DT match determination operation and the DT and SN modification In accordance with another aspect of the present invention, there is provided a method for identifying a device type of a device in a serial interconnection configuration of first to N-th devices, N being an integer greater than one, the method comprising: sending a serial input signal including device type (DT) information to one of the devices; determining a device type (DT) at the device that receives the DT information; transmitting a DT determination result; and receiving a serial output signal from the N-th device, the received serial output signal containing the DT determination result.

For example, the step of sending includes providing information on a search DT and a search number (SN). Based on the search DT, the DT of the device is determined. In response to the DT determination result, a received SN may be modified and the received search DT may be replaced with a pre-defined DT that matches any one of the DTs. The modified or non-modified DT and the modified or non-modified SN are combined and a combined DT-SN is transmitted to a next device of the serial interconnection configuration. Such a combined DT-SN is propagated through the serial interconnection configuration.

Advantageously, the step of receiving includes receiving the serial output signal from the N-th device in the serial interconnection configuration, the received serial output signal containing the combined SN-DT. An address of the device in the serial interconnection configuration may be recognized in response to the SN of the received serial output signal.

In accordance with a further aspect of the present invention, there is provided a method for identifying a device type of a device in a serial interconnection configuration of first to N-th devices, N being an integer greater than one. The method includes: sending a serial input signal including device type (DT) information to one of the devices; determining a device type (DT) at the device that receives the DT information; transmitting a DT determination result; and receiving a serial output signal from the N-th device, the received serial output signal containing the DT determination result.

In accordance with yet a further aspect of the present invention there is provided an apparatus for identifying a device type of a device in a serial interconnection configuration of first to N-th devices, N being an integer greater than one. The apparatus includes: a signal sender for sending a serial input signal including device type (DT) information to one of the devices; a determiner for determining a device type (DT) at the device that receives the DT information; a transmitter for transmitting a DT determination result; and a signal receiver for receiving a serial output signal from the N-th device, the received serial output signal containing the DT determination result.

In accordance with yet a further aspect of the present invention, there is provided an apparatus for identifying a device type of a device in a serial interconnection configuration of first to N-th devices, N being an integer greater than one, the apparatus comprising: an identifier for identifying the number of the devices in the serial interconnection configuration; and an operator for performing, after the number of the devices in the serial interconnection configuration is identified. The operator includes: a sender for sending a serial input signal including a first device type (DT) information to one of the devices; a determiner for determining a device type (DT) at the device that receives the DT information; a transmitter for transmitting a DT determination result; and a receiver for receiving a serial output signal from the N-th device, the received serial output signal containing the DT determination result.

In accordance with yet a further aspect of the present invention there is provided an apparatus for controlling a serial interconnection configuration of first to N-th devices, N being an integer greater than one, each of the devices being capable of determining a device type to provide a determination result and of modifying received information data. The apparatus includes: a signal provider for providing a serial input signal including information data on a device type (DT) and a search number (SN) to the first device of the serial interconnection configuration, the DT and SN being propagated with or without being modified in response to DT determination results by the devices; a signal receiver for receiving a serial output signal from the N-th device of the serial interconnection configuration, the received serial output signal containing the propagated DT and SN; and a recognizer for recognizing the total number of the devices in the serial interconnection configuration in response to the propagated SN and identifying the device type in the serial interconnection configuration in response to the total number and the propagated DT and SN.

In accordance with yet a further aspect of the present invention, there is provided a semiconductor device configured in a serial interconnection of first to N-th devices, N being an integer greater than one, the serial interconnected devices being coupled to a controller for providing device type (DT) and search number (SN) information data. The device includes: a determiner for determining a device type to output a determination result in response to the DT information data provided by the controller or a previous device; a modifier for modifying DT and/or SN information data received from the controller or the previous device in response to the determination result; and a transmitter for transmitting the DT and SN in a combination to the next device.

In accordance with yet a further aspect of the present invention, there is provided a machine-readable medium storing commands and instructions which, when executed, cause a processor to perform a method of identifying a device type of a device in a serial interconnection configuration of first to N-th devices, N being an integer greater than one. The method comprises: sending a serial input signal including device type (DT) information to one of the devices; determining a device type (DT) at the device that receives the DT information; transmitting a DT determination result; and receiving a serial output signal from the N-th device, the received serial output signal containing the DT determination result.

Advantageously, the wherein the method further comprises identifying the number of the devices in the serial interconnection configuration. The step of identifying is performed before the steps of sending, determining, transmitting and receiving.

In accordance with yet a further aspect of the present invention, there is provided a machine-readable medium storing commands and instructions which, when executed, cause a processor to perform a method for modifying received information on a device in a serial interconnection configuration of first to N-th devices, N being an integer greater than one. The method comprises: receiving a serial input signal including device type (DT) information and a search number (SN) at one of the devices; determining a device type (DT) from the received DT information; modifying the received DT and the received SN in response to a DT determination result; and transmitting a modified DT and a modified SN.

In accordance with embodiments of the present invention, there are provided a semiconductor device and a system including semiconductor devices. The semiconductor devices are such as, for example, memory devices and processing devices, which are used for electronic equipment.

In accordance with an embodiment of the present invention, there is provided a system including a memory controller and a serial interconnection configuration of N memory devices. The memory controller is unaware of the total number of the devices in the serial interconnection configuration, and is also unaware of the type of each of the serially interconnected devices. A possible device type is, e.g., random access memories (DRAM, SRAM, MRAM) and NAND-type, NOR-type and AND-type Flash memories.

Device type (DT) information associated with each of the devices is provided by a storage in each of the devices. Upon receipt of a search DT, a device performs a DT determination between the received DT and the associated DT. Each device is capable of performing a "+1" to an input search number (SN).

First, the memory controller sends a specific device type ("don't care") and an initial search number. Each device performs the "+1" calculation. The N-th device provides the memory controller with an N×"+1" search number from which the memory controller can recognize the total number of devices in the serial interconnection configuration.

Thereafter, the memory controller sends a pre-determined device number for device type matching. Each device performs device type match determination of a "previous match", a "present match" and a "don't care match". Based on the match determination, the input search number either modified or not, and propagated through the devices. From the propagated search number, the memory controller can identify the device type of each device.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached figures, wherein:

FIG. 14 is a schematic diagram illustrating a protocol conducted in the devices shown in FIG. 1, with various serial input device types DTsi;

FIG. 25A is a block diagram illustrating a machine-readable medium storing commands and instructions for use in a device of FIG. 1; and FIG. 25B is a block diagram illustrating a machine-readable medium storing commands and instructions for use in a memory controller of FIG. 1.

DETAILED DESCRIPTION

Figure 1:
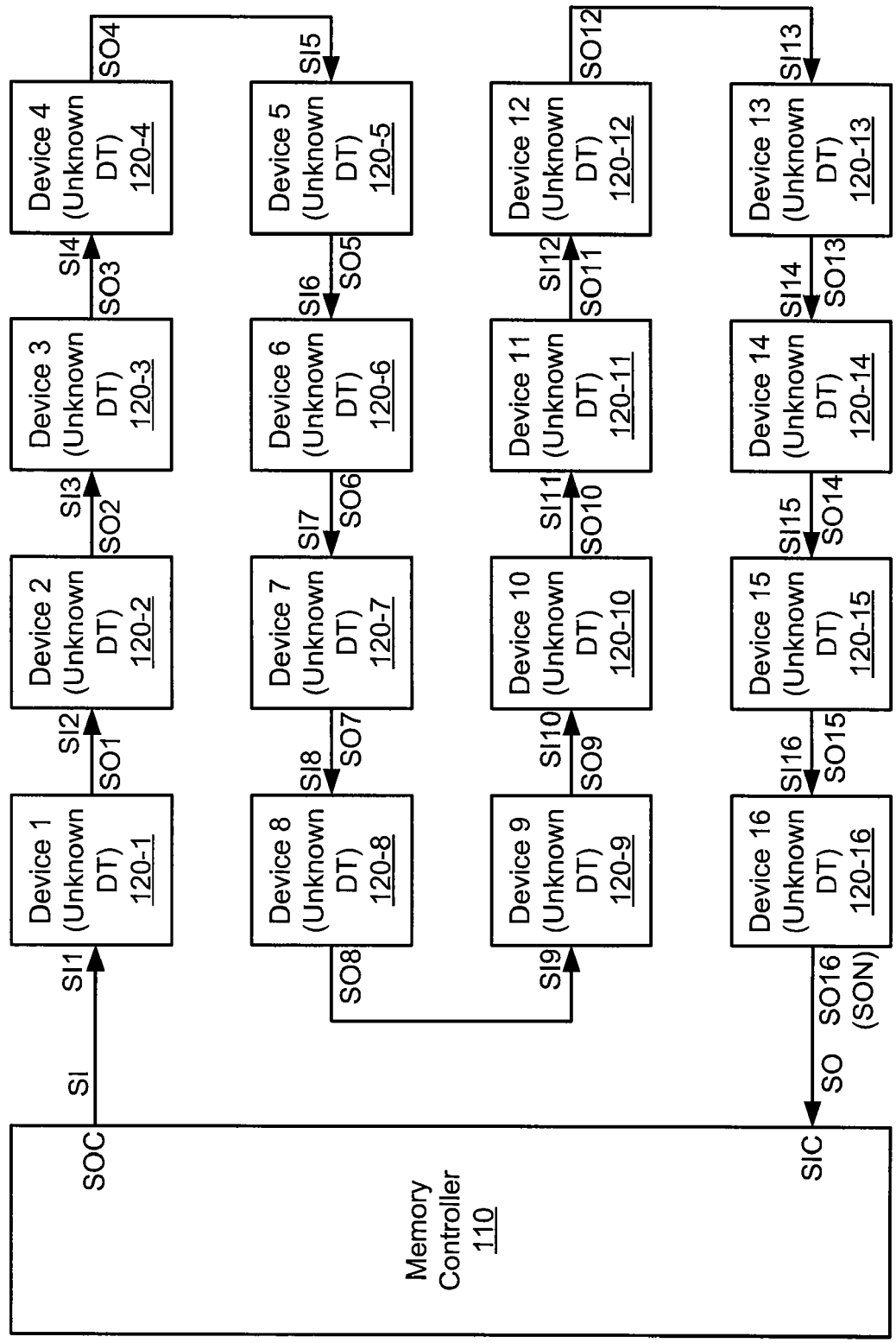
FIG. 1 is a block diagram illustrating an example of a memory system including a plurality of memory devices in a serial interconnection configuration to which embodiments of the present invention are applied.

In the following detailed description of embodiments of the present invention, reference is made to the accompanying drawings, which form a part hereof, and in which is shown, by way of illustration, embodiments in which the present invention may be practiced. These embodiments are described in sufficient detail to enable those of ordinary skill in the art to practice the present invention. It is to be understood that other embodiments may be utilized and that logical, electrical, and other changes may be made without departing from the scope of the present invention. The following detailed description is, therefore, not to be taken in a limiting sense, and the scope of the present invention is defined by the appended claims.

Generally, the present invention provides an apparatus and method for capturing and processing data in serially interconnected devices.

Some memory subsystems employ multiple memory devices, such as, for example, Flash memory devices, with serial interfaces. Here, the command string may be fed to all of the devices even though the command may only be performed on one of the devices. To select the device on which the command is to be performed, the command string may contain a device identifier (ID) or a device address that identifies the memory device to which the command is directed. Each device receiving the command string and compares the ID contained in the command string to an ID associated with the device. If the two IDs match, the device in question will assume that the command is directed to it to execute the command.

Such an arrangement requires the assignment of an ID for each device, the ID being used for addressing the device. One technique to assign an ID for a device is to hardwire an internal, unique, ID into the device. One drawback with this approach, however, is that if large volumes of devices are used, the size of the ID may have to be quite large in order to ensure that each device contains a unique ID. Managing a large-sized ID may add significant complexity to the device, which in turn may increase the cost of producing the device.

Another approach to assigning IDs to devices involves externally hardwiring an ID for each device. Here, the ID may be specified by wiring various pins on the device to certain states to assign an ID for the device. The device reads the wired state of the pins and assigns its ID from the read state. One drawback with this approach, however, is that external wiring is needed to assign the ID for each device. This may add to the complexity of, e.g., printed circuit boards (PCBs) that hold the memory devices. Another drawback with this approach is that it may require pins to be dedicated for the assignment of the ID. This may consume precious resources that could be otherwise better used. In addition, dedicating pins for the assignment of the ID may require a greater footprint for the device than if pins were not used to assign the ID.

One example to address at least some of these shortcomings is to automatically assign an ID for a device in a serial interconnection configuration, in a manner that does not require special internal or external hardwiring of the ID. According to an aspect of this technique, an input signal is transferred to a first device in a serial interconnection configuration. Then, a generator generates an ID in response to the input signal and a transmitter transfers an output signal associated with the ID to a second device. Details of ID generation for a serial interconnection configuration of memory devices of mixed type are disclosed in U.S. Provisional Patent Application No. 60/887,401 filed Jan. 31, 2007, the content of which is entirely incorporated herein by reference. Also, a packet based ID generation is disclosed in U.S. patent application Ser. No. 11/529,293 filed Sep. 29, 2006 entitled "Packet Based ID modification for Serially Interconnected Devices", the content of which is entirely incorporated herein by reference. These techniques are related to the generation of IDs by the devices themselves in the serial interconnection configuration.

It may be required to identify a device type of each device in a serial interconnection configuration, wherein the device types are unknown to the memory controller. Once the device type of each device is identified, with reference to the "absolute" device address, the memory controller can send data to an intended device associated with that address.

Examples of the present invention will now be described with reference to a serial interconnection configuration of devices, the device types of which are unidentified, or unknown, to their related memory controller.

FIG. 1 shows an example of a memory system in which embodiments of the present invention are implemented. The memory system includes a plurality of memory devices in a serial interconnection configuration and a memory controller. It is assumed that the memory controller is not aware a total number N of memory devices in the serial interconnection configuration. It is also assumed that a device type of each of the memory devices is unknown to the memory controller. In the particular example shown in FIG. 1, the number N of memory devices in the serial interconnection is 16 and the device types of the 16 memory devices are unknown to the memory controller. The device types may be of only one type (i.e., the type of all devices is identical) or of different types (i.e., the types of devices are "mixed").

Referring to FIG. 1, a memory controller 110 is coupled to the serial interconnection configuration of the N memory devices (in this example, devices 1-16, 120-1-120-16). The memory devices included in the serial interconnection configuration are of any type of memories, such as, for example, random access memories and Flash memories. For example, the random access memories can include dynamic random access memory (DRAM), static random access memory (SRAM), magnetoresistive random access memory (MRAM) and the Flash memories can include NAND-type, NOR-type, AND-type, and other type of Flash memories. Each of the devices has a similar structure and has serial input and output connections. The serial input and output connections of each device are coupled to a serial output connection of a previous device and a serial input connection of a next device, respectively. The serial input connection of the first device (device 1, 120-1) and the serial output of the last device (N-th device: device 16, 120-16) are coupled to a serial output control (SOC) connection and a serial input control (SIC) connection of the memory controller 110, respectively.

The memory controller 110 sends a serial input SI to device 1, 120-1. The SI contains various information and data for system operation. In a normal operation mode of the system, the SI includes data to be processed by an intended device (e.g., device 3), a device address (e.g., address "3") of the intended device and others. The SI data is transferred through unintended (or non-addressed) devices without being processed (or altered). With reference to the transferred address, a device can recognize that it is the intended device. The intended (or addressed) device receives the transferred data and processes it. Then, the processed (or altered) data is transmitted to the next device. The processed data is further transferred through unintended devices. As such, the SI data is propagated through the devices in the serial interconnection configuration with or without being altered.

Figure 2:
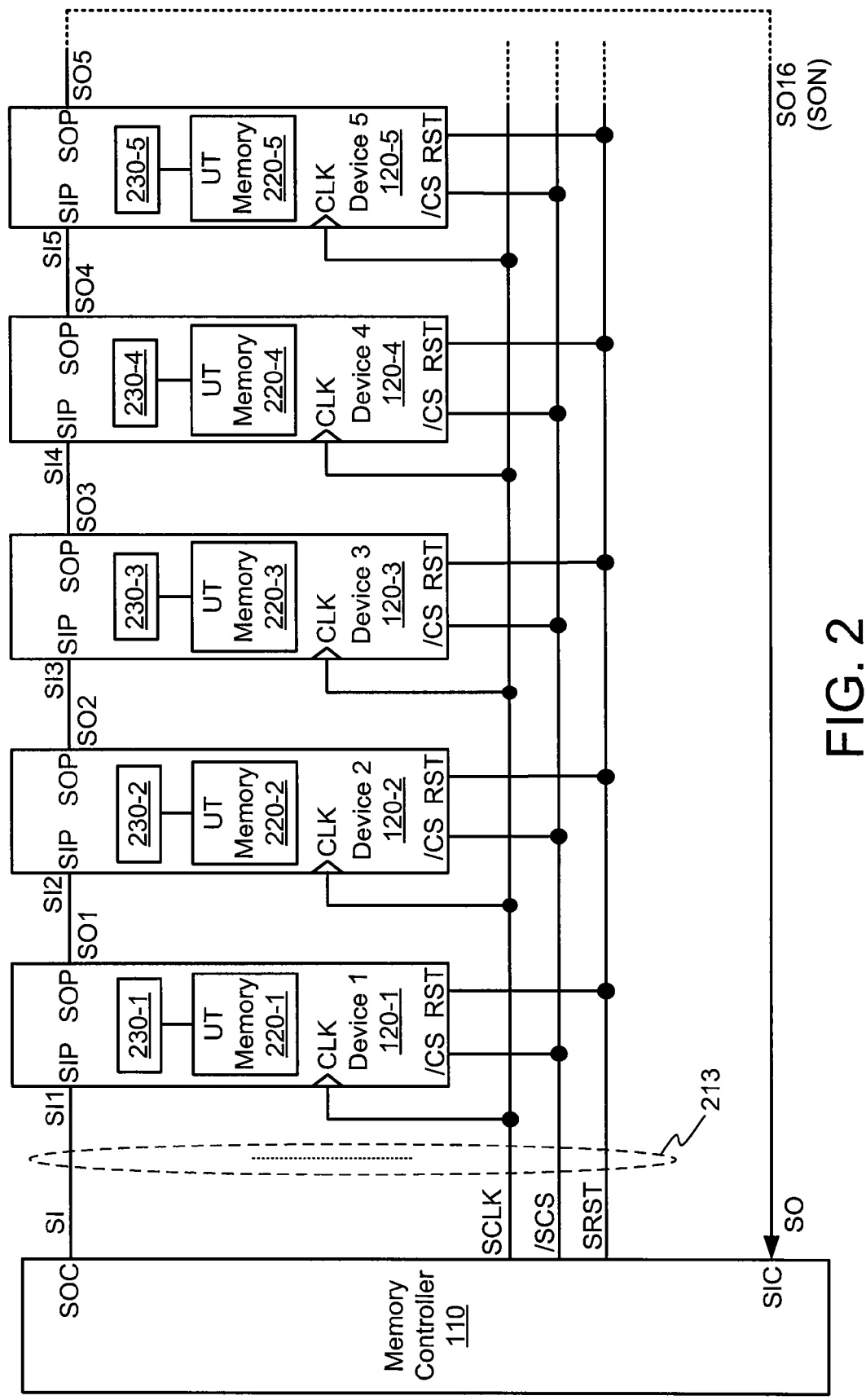
FIG. 2 is a block diagram illustrating part of the serial interconnection configuration shown in FIG. 1.

FIG. 2 shows part of the system of FIG. 1 in more details. Referring to FIG. 2, part of the serial interconnection configuration includes unknown type (UT) devices 1-5 (120-1-120-5). Devices 1-5 (120-1-120-5) include memories 220-1-220-5 therein, respectively. A memory type of each device is unknown to the memory controller 110. Each of the unknown type (UT) memories 220-1-220-5 may be a NAND-type Flash memory, a NOR-type Flash memory, DRAM, SRAM, MRAM or another type memory. Devices 1-5 (120-1-120-5) are provided with device controllers 230-1-230-5, respectively. In each of the devices, the device controller is connected to the unknown type memory to access it for data processing.

Each of the serially interconnected devices has a similar structure with the exception of the memory type. Each device includes a serial input port (SIP) connection, a serial output port (SOP) connection, a chip select input (/CS), a clock input (CLK) and a reset input (RST). The memory controller 110 provides a group of signals 213 containing information on the chip select/SCS, serial input SI, clock SCLK, reset SRST and other control and data information (not shown). In the particular example shown in FIG. 2, the chip select signal/SCS, the clock signal SCLK and the reset signal SRST are commonly fed to all of the serially interconnected devices.

The serial input SI is fed from the SOC connection of the memory controller 110, as a serial input SI1, to the SIP connection of device 1, 120-1. Device 1 outputs a serial output SO1 from its SOP connection to the next device (i.e., device 2, 120-2). The memory controller 110 receives a serial output SO from the SOP connection of the last device (i.e., device 16) at its SIC connection. Each of the devices performs similar functions and thus, the serial input SI is propagated through the interconnected devices with or without being altered.

Figure 3:
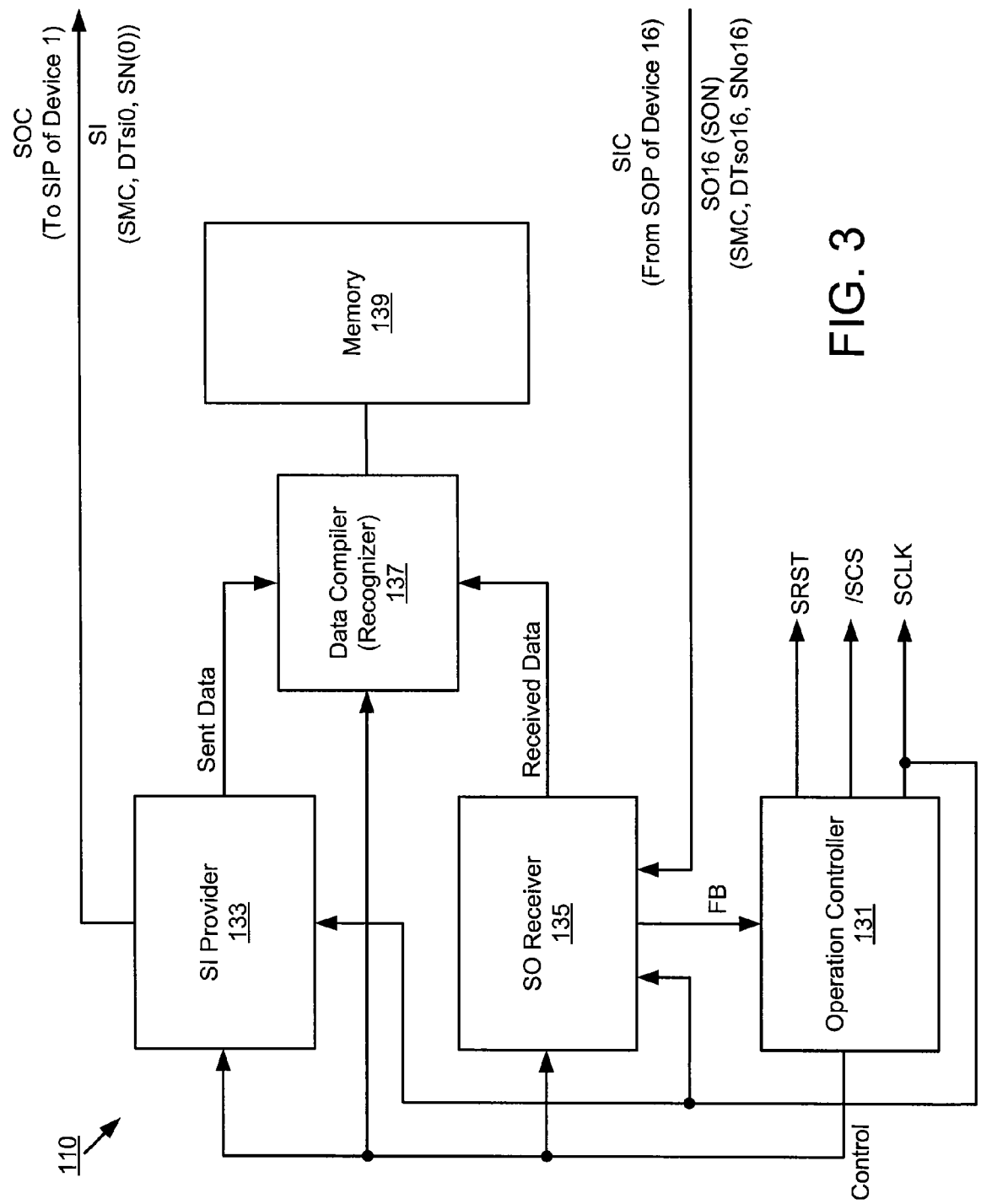
FIG. 3 is a block diagram illustrating an example of a memory controller shown in FIG. 1.

FIG. 3 shows details of the memory controller 110 shown in FIG. 1. Referring to FIGS. 1-3, the memory controller 110 includes an operation controller 131, a serial input (SI) provider 133, a serial output (SO) receiver 135, a data compiler 137 and a memory 139. The operation controller 131 provides the clock signal SCLK, the chip select signal/SCS and the reset signal SRST to the devices 120-1-120-16 of the serial interconnection configuration. The clock signal SCLK is provided to the SI provider 133 and the SO receiver 135 for their operations. The operations of the SI provider 133, the SO receiver 135 and the data compiler 137 are controlled by the operation controller 131. The SI provider 133 sends the SI data through the SOC connection to the first device (device 1, 120-1) of the serial interconnection configuration.

In the device identification process, the SI contains a search operation command SMC, an initial device type DTsi0 and an initial search number SN(0). By the serial interconnection, the search operation command SMC, the device type DT and the search number SN are propagated therethrough. Each device performs a DT match determination and modifies (or alters) the DT and the SN in response to the DT match determination. The modified or non-modified DT and SN accompanying the search operation command SMC are transmitted from the SOP connection of one device to the SIP connection of the next device. The propagated SO is fed to the memory controller 110. The SO receiver 135 receives the SO through the SIC connection from the last device (device 16, 120-16) of the serial interconnection configuration. The SI provider 133 provides the data compiler 137 with the data sent through the SOC connection. The SO receiver 135 also provides the data compiler 137 with the data received through the SIC connection. The data compiler 137 performs data compiling in response to the data provided by the SI provider 133 and the SO receiver 135. The data compiler 137 also performs a function of recognition of value or number contained in the received data. The data compiler 137 provides data and/or compiled data to the memory 139 which stores the provided data and compiled data. The operation controller 131 receives feedback (FB) information from the SO receiver 135 for use in a control of the SI provider 133 and of the SO receiver 135.

Figure 4:
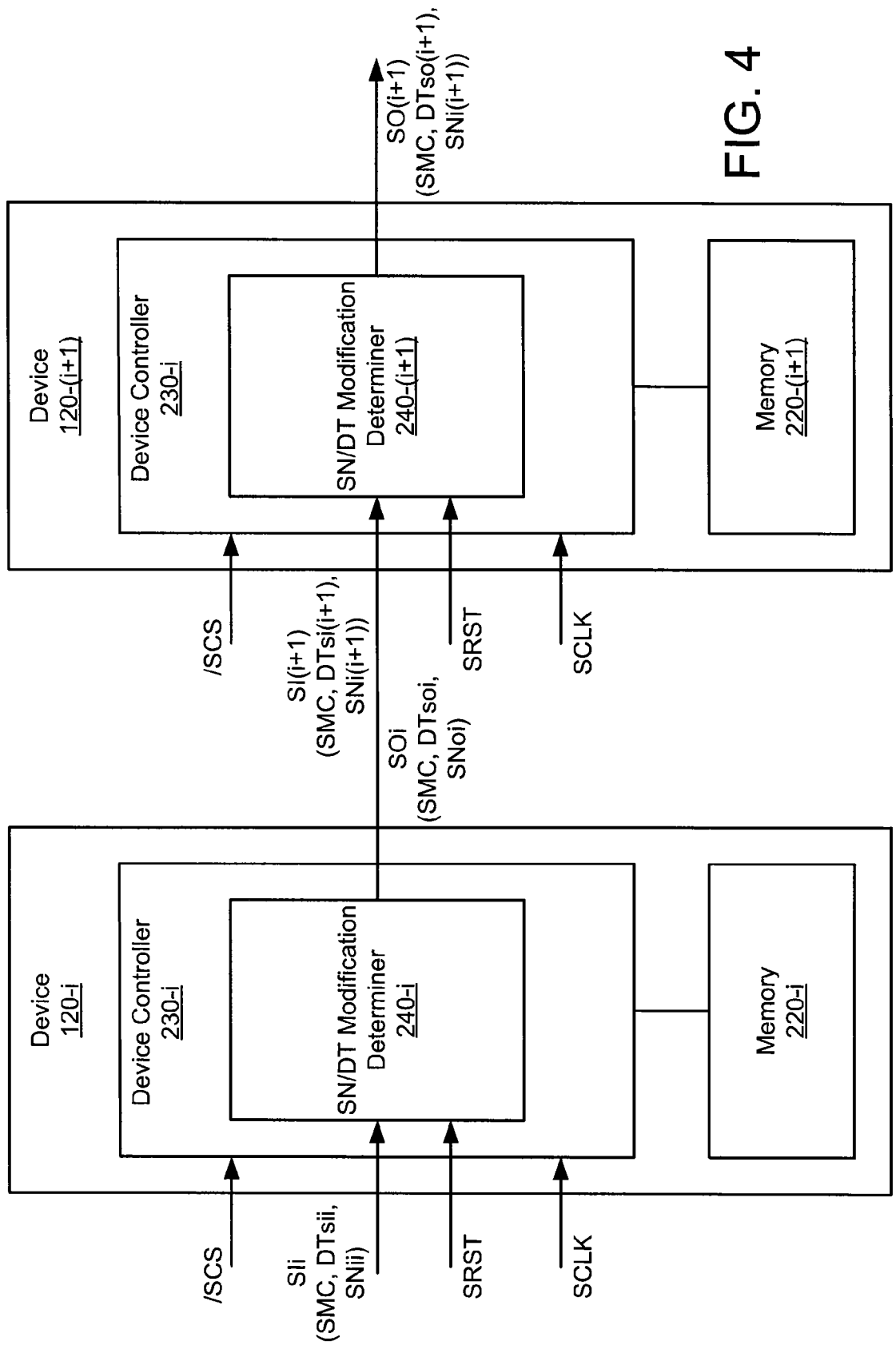
FIG. 4 is a block diagram illustrating two devices in the serial interconnection configuration shown in FIG. 2.

FIG. 4 shows two devices in the serial interconnection configuration shown in FIG. 2. Referring to FIG. 4, a device 120-$i$ represents one of the devices 120-1-120-5 shown in FIG. 2 and another device 120-(i+1) represents the next device to device 120-$i$. Each device has a similar structure. The device 120-$i$ includes a device controller 230-$i$ and a memory 220-$i$ connected thereto. The types of memories are unknown to the memory controller 110, because they have not been detected (or identified). The next device 120-(i+1) includes a device controller 230-(i+1) and a memory 220-(i+1) connected thereto. Each device controller includes a processor for processing data and executing commands. In this example, a search number (SN)/device type (DT) modification determiner is shown as included in the device controller. An SN/DT modification determiner 240-$i$ of the device 120-$i$ receives a serial input SIi containing a search operation command SMC, an input device type DTsii and an output search number SNii from a previous device and performs a DT match determination, a device type (DT) modification and a search number (SN) modification. The device 120-$i$ outputs a serial output SOi containing the search operation command SMC, an output device type DTsoi and an output search number SNoi. The serial output SOi is transmitted to the next device 120-(i+1) that performs similar functions as the device 120-i.

The serial input SIi contains commands and data. In the example, the commands include the search operation command SMC of p-bits (e.g., p being eight) and other commands (not shown). The device type (DT) contains m bits (e.g., eight bits). The search number (SN) contains n bits (e.g., eight bits). The DT and/or SN is propagated through the devices in the serial interconnection configuration with or without being modified (or altered) together with the search operation command SMC.

Figure 5:
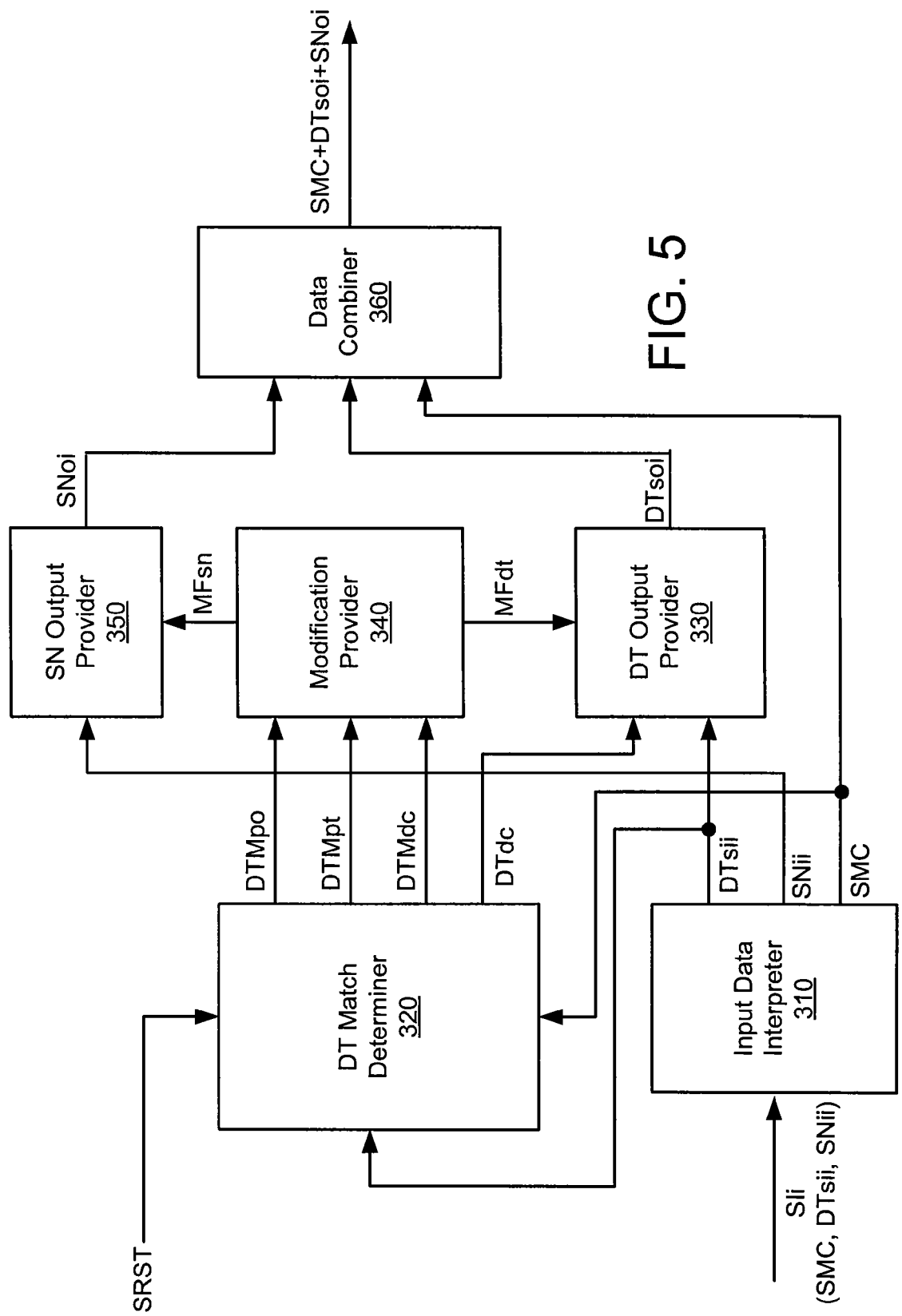
FIG. 5 is a block diagram illustrating an example of a search number (SN)/device type (DT) modification determiner shown in FIG. 4.

FIG. 5 shows details of the SN/DT modification determiner (240-i, 240-(i+1)) shown in FIG. 4. Referring to FIG. 5, the SN/DT modification determiner includes an input data interpreter 310, a DT match determiner 320, a DT output provider 330, a modification provider 340, a search number (SN) output provider 350 and a data combiner 360. The SIi is fed to the input data interpreter 310 which in turn outputs the SNii, the DTsii and the search operation command SMC. The DTsii is provided to the DT match determiner 320 and the DT output provider 330. The SNii is fed to the SN output provider 350. The search operation command SMC is fed to the DT match determiner 320 and the data combiner 360.

The DT match determiner 320 performs the DT match determination based on the input DTsii in response to the search operation command SMC and outputs a present DT match indication DTMpt, a "don't care" DT match indication DTMdc and a previous DT match indication DTMpo that are fed to the modification provider 340. The DT match determiner 320 provides a "don't care" code DTdc to the DT output provider 330.

In response to the present DT match indication DTMpt, the "don't care" DT match indication DTMdc and the previous DT match indication DTMpo, the modification provider 340 performs logic functions and provides a search number (SN) modifying indication MFsn to the SN output provider 350 and a device type (DT) modifying indication MFdt to the DT output provider 330.

The SN output provider 350 modifies the input SN, SNii, in response to the SN modifying indication MFsn and provides an output SN, SNoi. The DT output provider 330 modifies the input DT, DTsii, in response to the DT modifying indication MFdt and provides an output DT, DTsoi. In this particular example, the DTsoi is either the DTsii or the DTdc. The data combiner 360 receives the SNoi, the DTsoi and the search operation command SMC and combines them to output a combined SMC-DTsoi-SNoi. The combined SMC-DTsoi-SNoi is provided by the SN/DT modification determiner to the next device.

Figure 6:
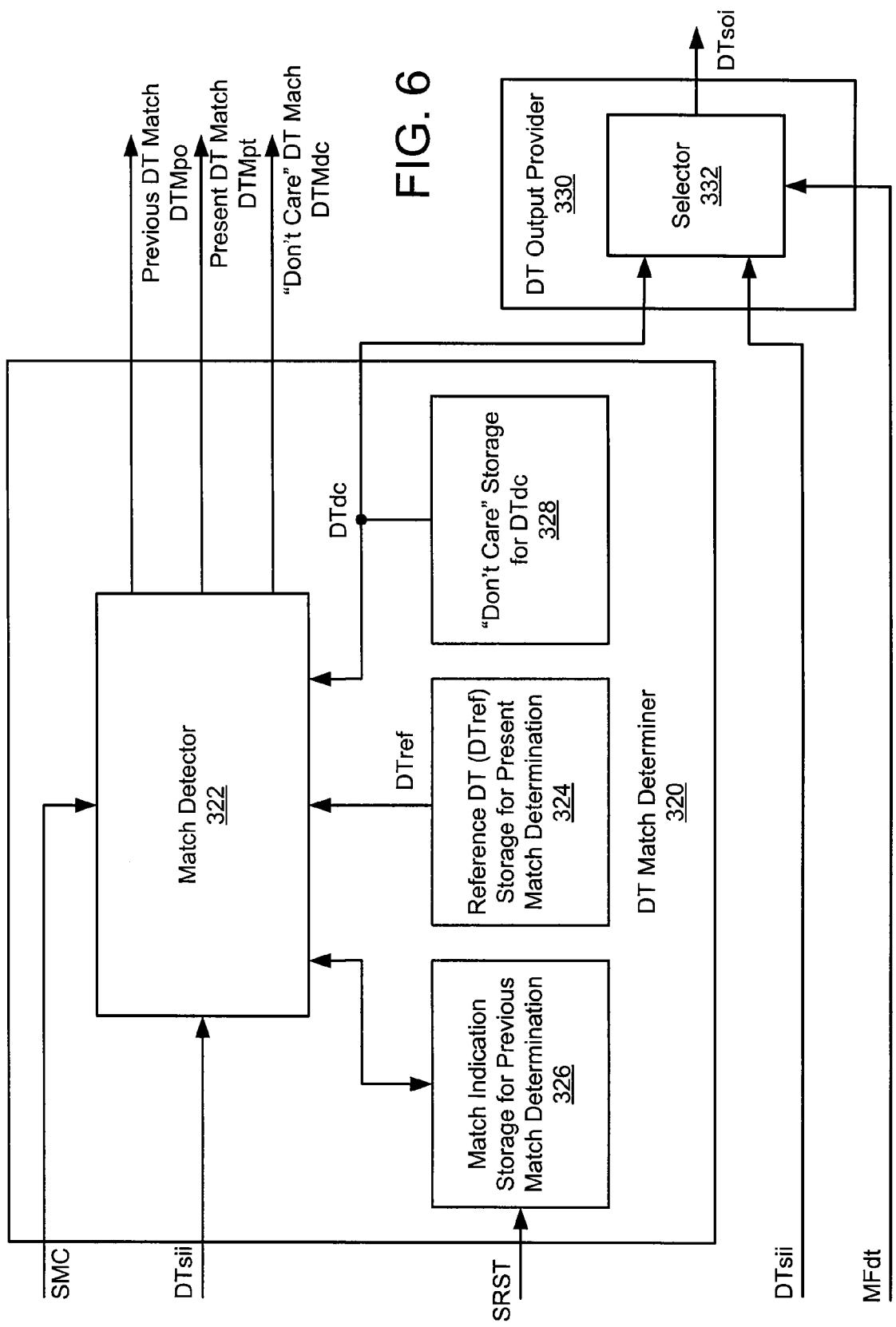
FIG. 6 is a block diagram illustrating details of a DT match determiner and a DT output provider shown in FIG. 5.

FIG. 6 shows details of the DT match determiner 320 and of the DT output provider 330 shown in FIG. 5. Referring to FIGS. 2-6, the DT match determiner 320 (of a present device DVi) includes a match detector 322 that is activated by the search operation command SMC. The match detector 322 is connected to three storages. A first storage 324 stores a reference device type DTrefi associated with the present device DVi, which indicates the type of the memory 220-i included in the device DVi. The DTrefi is provided to the match detector 322. When the match detector 322 compares the DTsii with the DTrefi and finds a match between them, a match indication is stored in a second storage 326 (e.g., a one-bit register). The match indication is held until the storage 326 is reset or powered-off. Thereafter, the match indication is held as a "previous match" indication that is provided to the match detector 322. A third storage 328 stores the "don't care" code DTdc that is fed to the match detector 322. The "don't care" code DTdc is pre-determined.

In response to the input DTsii, the match detector 322 performs a DT match determination with reference to the previous match indication, the DTdc and the DTref. When the determination function of the match detector 322 is activated, (i) if the previous match indication is found or detected, the previous DT match indication DTMpo will be output; (ii) if a match with the "don't care" code DTdc is detected, the "don't care" DT match indication DTMdc will be output; and (iii) if there is a match between the DTsii and the DTref, the present DT match will be output.

The DT output provider 330 includes a selector 332 that receives the input DTsii and the DTdc. In response to the DT modifying indication MFdt, the selector 332 selects one of the DTsii and the DTdc and outputs a selected one as the output DTsoi.

Figure 7:
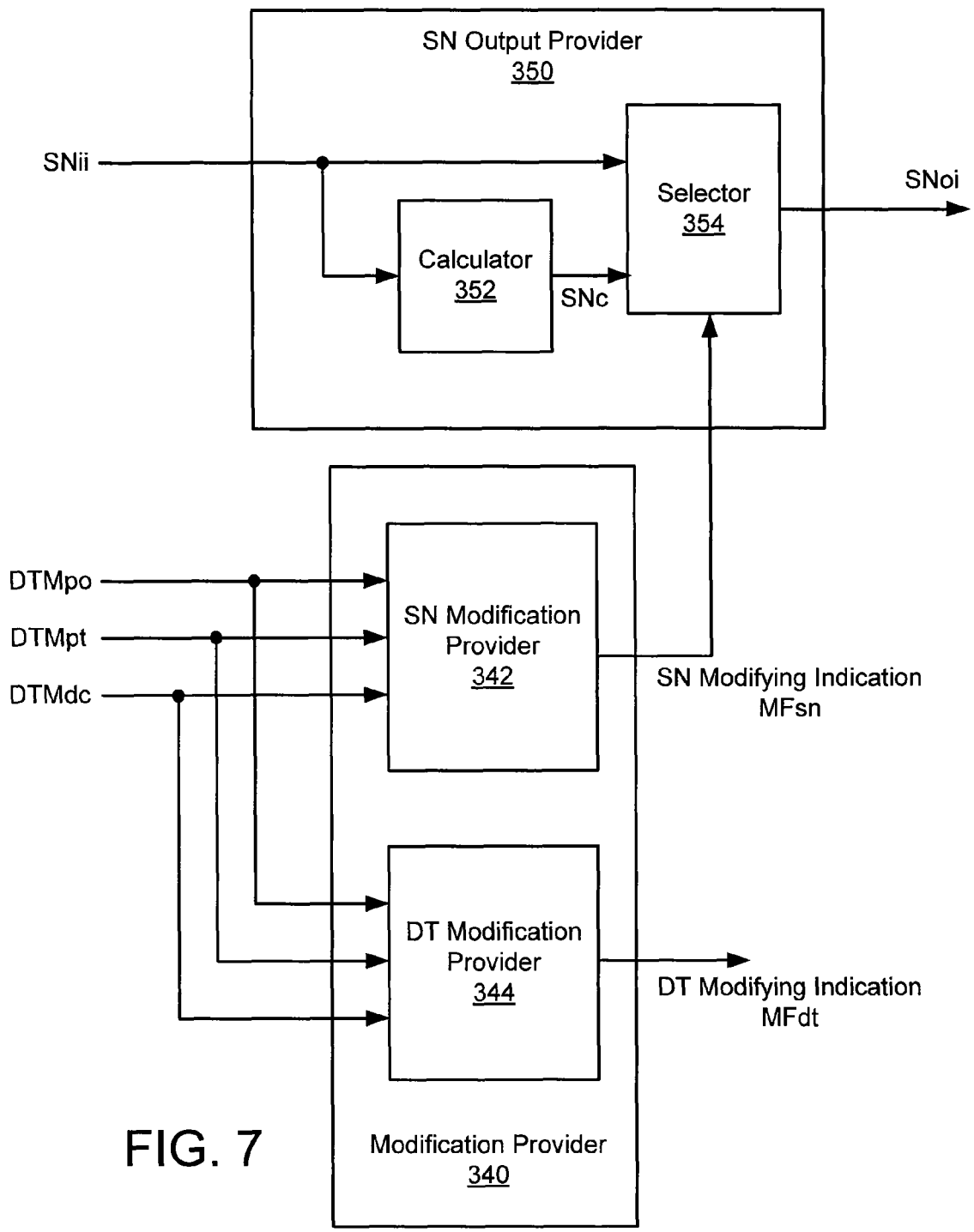
FIG. 7 is a block diagram illustrating details of a modification provider and a search number (SN) output provider shown in FIG. 5.

FIG. 7 shows details of the modification provider 340 and the SN output provider 350 shown in FIG. 5. Referring to FIG. 7, the modification provider 340 includes a search number (SN) modification provider 342 and a device type (DT) modification provider 344, which receive the previous DT match indication DTMpo, the "don't care" DT match indication DTMdc and the present DT match indication DTMpt. The SN modification provider 342 enables the SN modifying indication MFsn when an enabled present DT match indication DTMpt or an enabled "don't care" DT match indication DTMdc is input thereto. The DT modification provider 344 enables the DT modifying indication MFdt only when an enabled present DT match indication DTMpt is input thereto.

The SN output provider 350 includes a calculator 352 and a selector 354. The input SNii is fed to the calculator 352 and the selector 354. The calculator 352 performs an arithmetic operation, the arithmetic result SNc of which is fed to the selector 354. In response to the SN modifying indication MFsn from the SN modification provider 342, the selector 354 selects one of the SNii and the arithmetic result SNc and the selection is output as the output SNoi. In this particular example, the calculator 352 performs an adding operation ("+1") and thus, the SNc is "SNii+1". Alternatively, another calculation with another value can be applicable.

The SNoi, the DTsoi and the search operation command SMC are input to the data combiner 360, by which they are combined, with the result that the combined SMC+DTsoi+SNoi is output as the SOi, as shown in FIG. 5.

Again referring to FIG. 6, the storage 324 is a reference device type provider that is, for example, a one-time-programmable (OTP) element configured by a non-volatile memory. The OTP element stores a device type number as a device type reference (DTref) that is programmed to the device prior to the system operation. Alternatively, the device type number storage is a programmable memory that can store a device type number or value as a device type reference (DTref) programmed to the device prior to performing the SN and DT modification process. Table 1 shows an example of the definition of device types in serialized byte code.

TABLE 1

| Device Type | HEX | Bit 7 | Bit 6 | Bit 5 | Bit 4 | Bit 3 | Bit 2 | Bit 1 | Bit 0 |
|---|---|---|---|---|---|---|---|---|---|
| NAND Flash (DTnd) | 00h | 0 | 0 | 0 | 0 | 0 | 0 | 0 | 0 |
| NOR Flash (DTnr) | 01h | 0 | 0 | 0 | 0 | 0 | 0 | 0 | 1 |

TABLE 1-continued

| Device Type | HEX | Bit 7 | Bit 6 | Bit 5 | Bit 4 | Bit 3 | Bit 2 | Bit 1 | Bit 0 |
|---|---|---|---|---|---|---|---|---|---|
| AND Flash (DTad) | 02h | 0 | 0 | 0 | 0 | 0 | 0 | 1 | 0 |
| DRAM (DTdm) | 03h | 0 | 0 | 0 | 0 | 0 | 0 | 1 | 1 |
| SRAM (DTsm) | 04h | 0 | 0 | 0 | 0 | 0 | 1 | 0 | 0 |
| MRAM (DTmm) | 05h | 0 | 0 | 0 | 0 | 0 | 1 | 0 | 1 |
| — | — | — | — | — | — | — | — | — | — |
| — | — | — | — | — | — | — | — | — | — |
| Not Used* | FFh | 1 | 1 | 1 | 1 | 1 | 1 | 1 | 1 |

As shown in Table 1 (*), a device type of all bits being "1" is not used as a reference device type. Such a bit structure is pre-defined to be used as a "don't care" device type. The storage 328 stores the "don't care" code. Alternatively, the storage 328 is provided with a code generator that generates the pre-determined code to be fed to the match determiner 322 and the DT output provider 330.

Those of ordinary skill in the art understand that the definitions of the device types in Table 1 can be changed and that more device types can be added.

Figure 8:
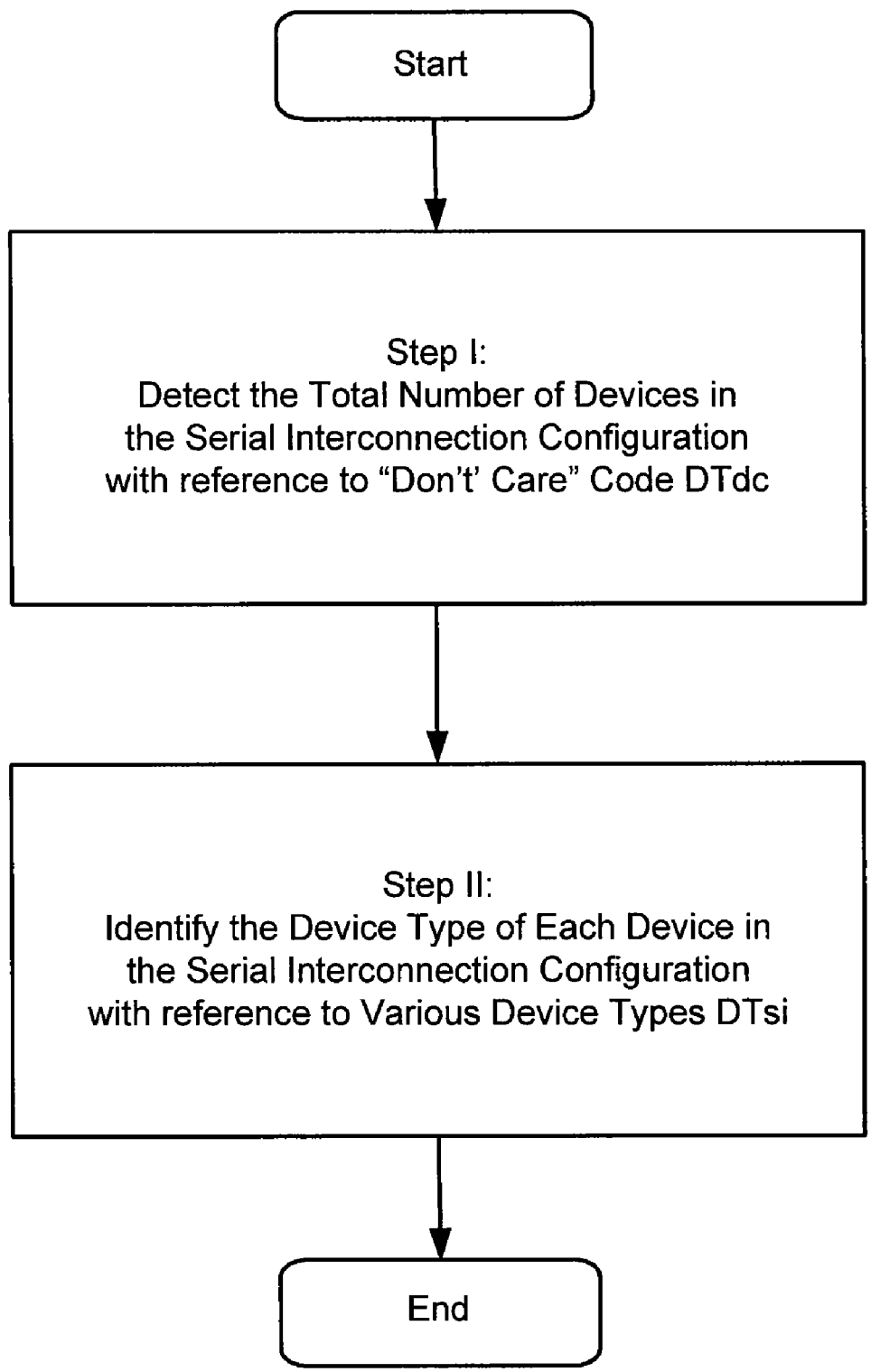
FIG. 8 is a flow chart illustrating a process conducted by the memory system shown in FIG. 1.

FIG. 8 shows a process conducted by the memory system shown in FIG. 1. As shown in FIG. 8, the device identification process includes two steps. Step I is to detect the total device number Ndv using the "don't care" code DTdc. Step II is to identify the device type of each device using various device types, after obtaining the total device number Ndv.

Figure 9:
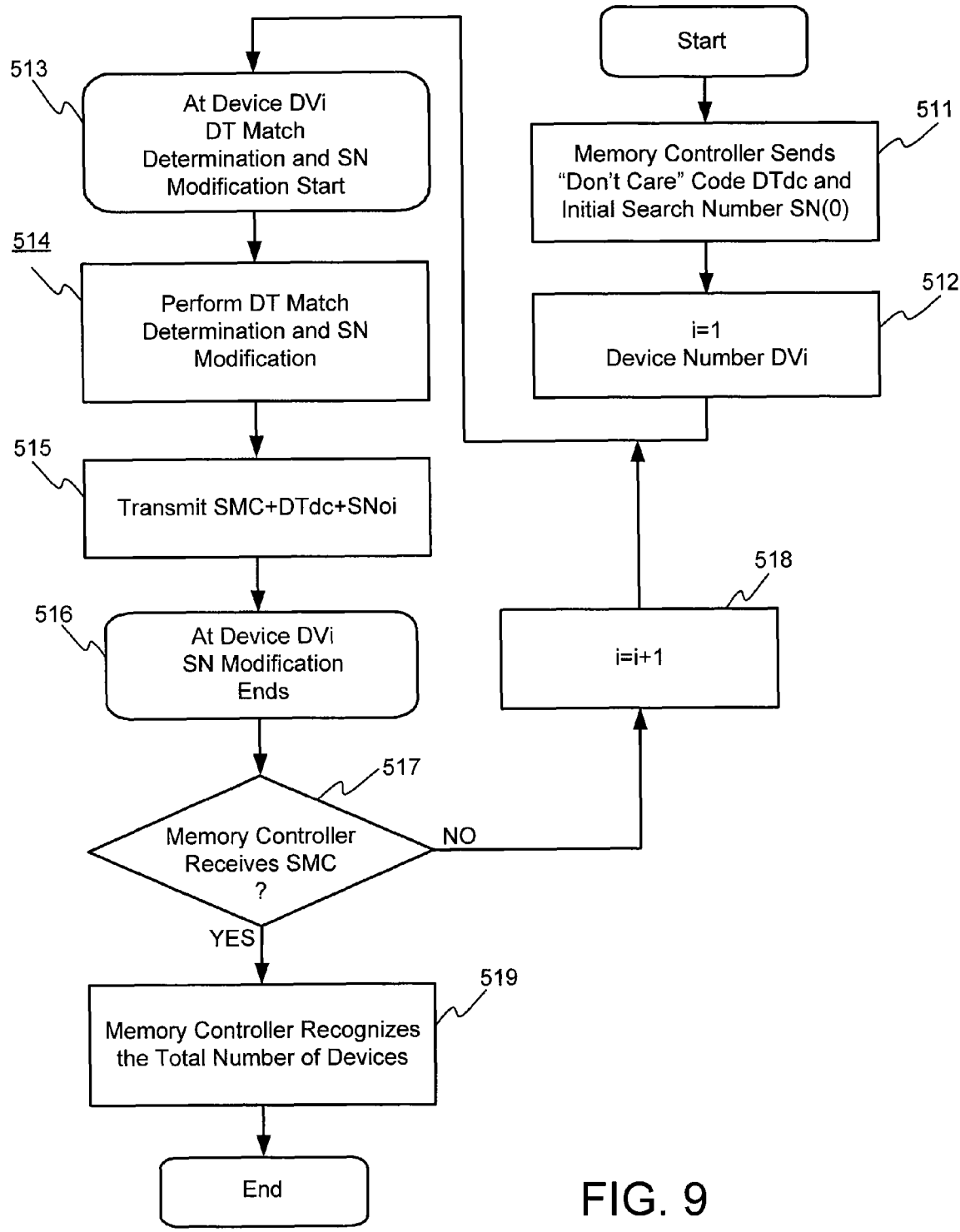
FIG. 9 is a flow chart illustrating an example of a method for identifying a total number of devices in the serial interconnection configuration shown in FIG. 1.

FIG. 9 shows a method for identifying the total number of devices in the serial interconnection configuration shown in FIG. 1. The method shown in FIG. 9 is to perform step I shown in FIG. 8.

Referring to FIGS. 1-9, the memory controller 110 sends the search operation command SMC, the "don't care" code DTdc and an initial search number SN(0) to the first device (device 1, 120-1) of the serial interconnection configuration (step 511). For the operations of each device, first, a device number i is assigned as 1 (step 512). The i-th device DVi (the present device) starts a search number (SN) modification process (step 513). The present device DVi (e.g., device 2) receives, from a previous device DV(i−1), e.g., device 1, the search number SNii and the device type, DTdc, accompanying the search operation command SMC. The device DVi performs a device type (DT) match determination and the SN modification (step 514). Details of step 514 will be described later with reference to FIG. 12. The device DVi outputs a modified SN as an output SNoi in response to a DT match determination result. Upon completion of the DT match determination and the SN modification, a combination of the search operation command SMC, the DTdc and the SNoi is transmitted to a next device DV(i+1) (step 515). At device DVi, the DT match determination and the SN modification end (step 516). If the next device DV(i+1) that received the combined data from the present device DVi is another device in the serial interconnection configuration, the present device DVi will not be determined as the last device in the serial interconnection configuration (NO at step 517). Then, the next device DV(i+1) operates as a present device DVi (step 518) and the operations at steps 513-516 are performed. Such operations are repeated by all of the devices in the serial interconnection configuration. If the next device DV(i+1) that received the combined data from the present device DVi is the memory controller 110, the present device DVi will be determined as the last device in the serial interconnection configuration (YES at step 517). This is determined whether the memory controller 110 (the SO receiver 135) received the SMC in the SO from the last device. Then, the memory controller 110 recognizes from the received SO the total device number Ndv of the serial interconnection configuration (step 519). The SO from the device 120-16 contains the modified SN that indicates the total number of devices. The data compiler 137 of the memory controller 110 recognizes the total device number Ndv.

Figure 10:
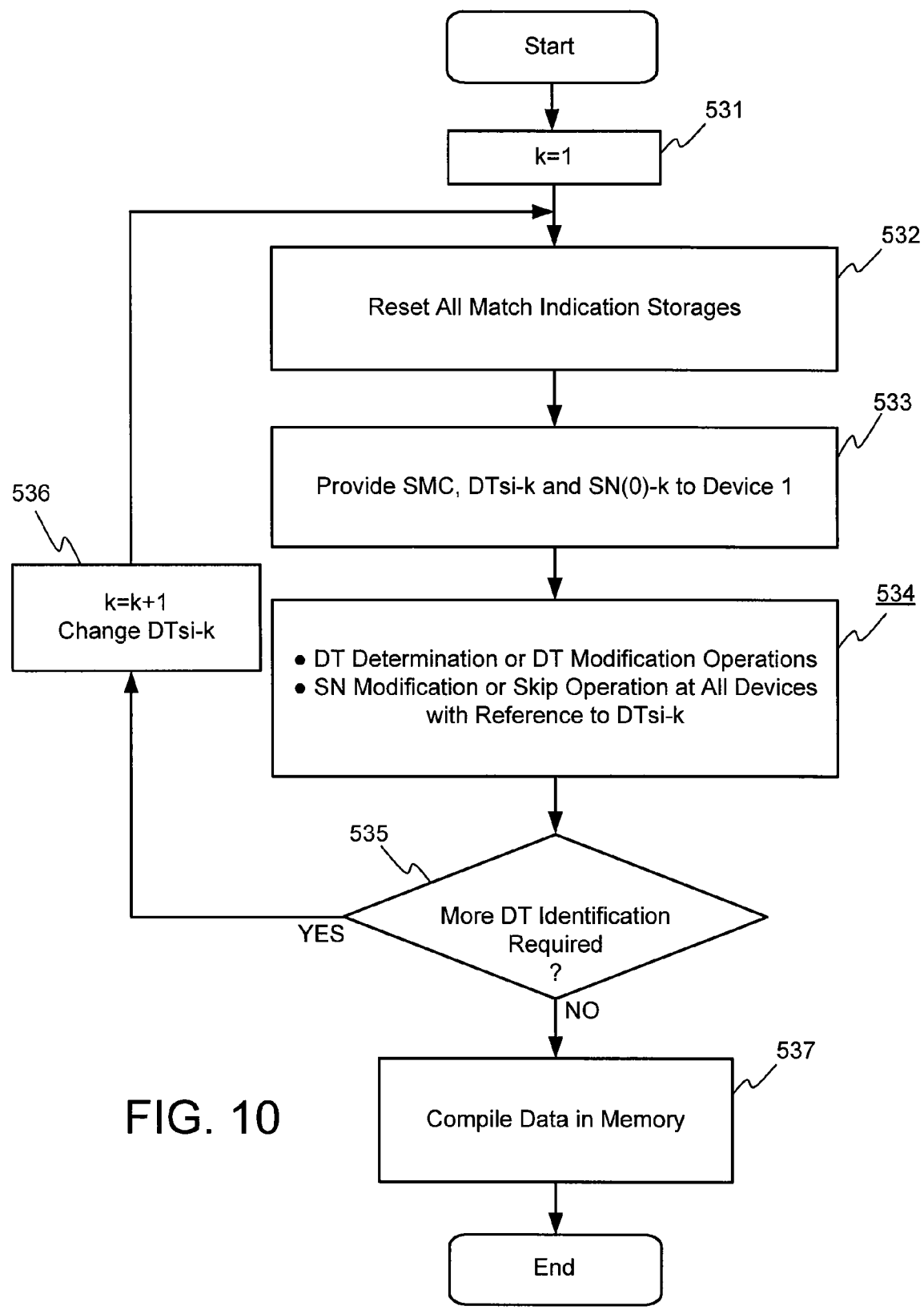
FIG. 10 is a flow chart illustrating operations of a device type match determination and an SN modification performed by an identifying method of the devices shown in FIG. 1.

FIG. 10 depicts the operations of a device type match determination and a search number modification performed in the identifying method of the devices shown in FIG. 1. The method shown in FIG. 10 is to achieve step II shown in FIG. 8.

Referring to FIGS. 1-10, to operate with a search of various device types, an operation repetition parameter k is assigned a value of 1 (step 531), that is, a first search DTsi. The search DTsi is chosen and sent by the memory controller 110. Prior to the providing of the DTsi, the memory controller 110 sends the reset signal SRST to the devices 120-1-120-16 of the serial interconnection configuration to reset the storages 326 in all devices (step 532). Thus, no match indications are stored in the storages 326 before the DT match determination operation.

The memory controller 110 (the SI provider 133) sends a search operation command SMC, a k-th device type DTsi0-k and an initial search number SN(0)-k, in a combination, to device 1 (step 533). At device DVi, the DT determination and/or DT modification operation, the SN modification or the skip operation are performed and successively, such operations are performed at all devices with reference to the DTsi-k (step 534). Once one cycle of the search for devices 1-16 is completed, the DTsi-k, and the search result (e.g., the SN value of a propagated SNo16), are compiled by the data compiler 137 of the memory controller 110. The compiled data is stored in the memory 139. With reference to the DTsi-k, search cycles for devices 1-16 are reiterated if necessary. Such DT determination, DT/SN modifications and data compiling/store are performed at every cycle of the search operation. Upon completion of all search operation cycles with the DTsi-k, it is determined whether or not another device identification process with reference to another DTsi is necessary (step 535).

If another device identification process is required with reference to another device type DTsi (YES at step 535), steps 532-534 will be repeated with a new repetition parameter k (k=k+1) and a new DTsi (step 536). If no more DT match search and SN modification are required (NO at step 535), the data compiler 137 of the memory controller 110 re-compiles the data in the memory 139 and re-store re-compiled data therein.

Figure 11:
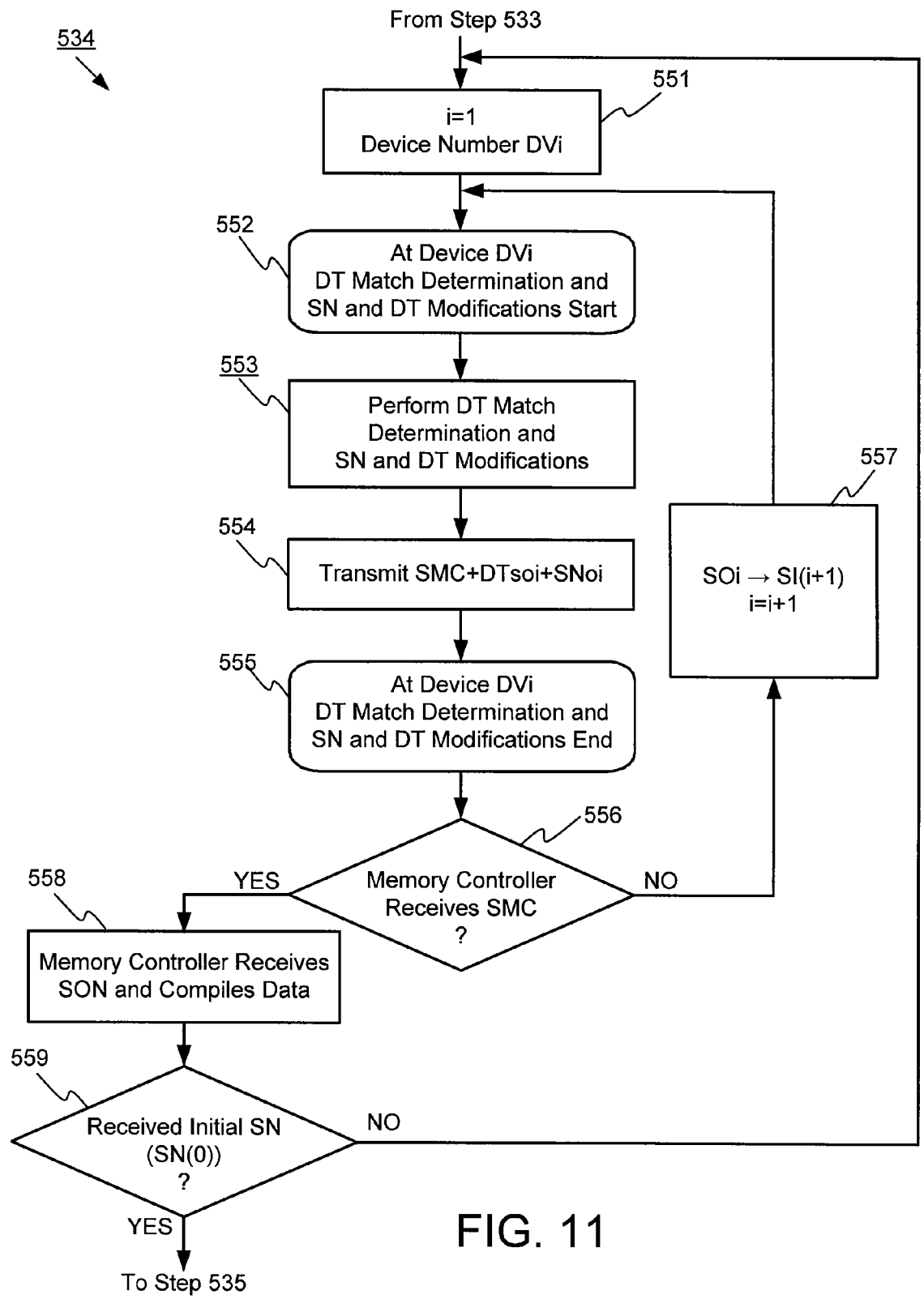
FIG. 11 is a flow chart illustrating part of the operations shown in FIG. 10.

FIG. 11 shows details of the DT determination and DT modification operations at step 534 of FIG. 10. Referring to FIGS. 1-11, first, a device DVi is assigned as i=1 (step 551). Then, at the i-th device DVi, the DT match determination and SN modification process starts (step 552). The present device DVi (e.g., device 2) receives, from a previous device DV(i−1) (e.g., device 1), a search operation command SMC, a device type (DT), DTsi-k, and a search number (SN), SNii, in a combination. The DT match determination is performed and then, the DT modification and the SN modification are performed in response to a DT match determination result (step 553). The input DTsi-k or a modified DT is output as an output DTsoi. The input SNii or a modified SN is output as an output SNoi. The output device type DTsoi and the output search number SNoi are provided by the DT output provider 330 and the SN output provider 350, respectively, of the SN/DT modification determiner of the device DVi. Details of step 553 will be described later with reference to FIG. 12. The search operation command SMC, the DTsoi and the SNoi are combined by the data combiner 360 of the device DVi. Then, the combined SMC-DTsoi-SNoi is transmitted to a next device DV(i+1) (step 554). At device DVi, the DT match determination and the SN and DT modifications end (step 555).

If the next device DV(i+1) that received the combined data from the present device DVi is another device in the serial interconnection configuration, the present device DVi will not be determined as the last device in the serial interconnection configuration (NO at step 556). Then, the next device DV(i+1) operates as a present device DVi (step 557) and the operations at steps 552-555 are performed. Thus, the operations are repeated by all of the devices in the serial interconnection configuration. If the next device DV(i+1) that receives the combined data from the present device DVi is the memory controller 110, the present device DVi will be determined as the last device in the serial interconnection configuration (YES at step 556). The memory controller 110 (the SO receiver 135) receives the combined data from the last device of the serial interconnection configuration. The memory controller 110 (the data compiler 137) compiles data and the compiled data is stored in the memory 139 (step 558). One search cycle ends. If the received SNo16 contained in the combined data is 0 (YES at step 559), another search cycle will start and i is re-assigned as 1 (step 551). The operations of steps 552-558 are repeated. If the SNo16 is 0 (YES at step 559), operation will continue to determine whether another device identification is required (step 535 of FIG. 10).

Figure 12:
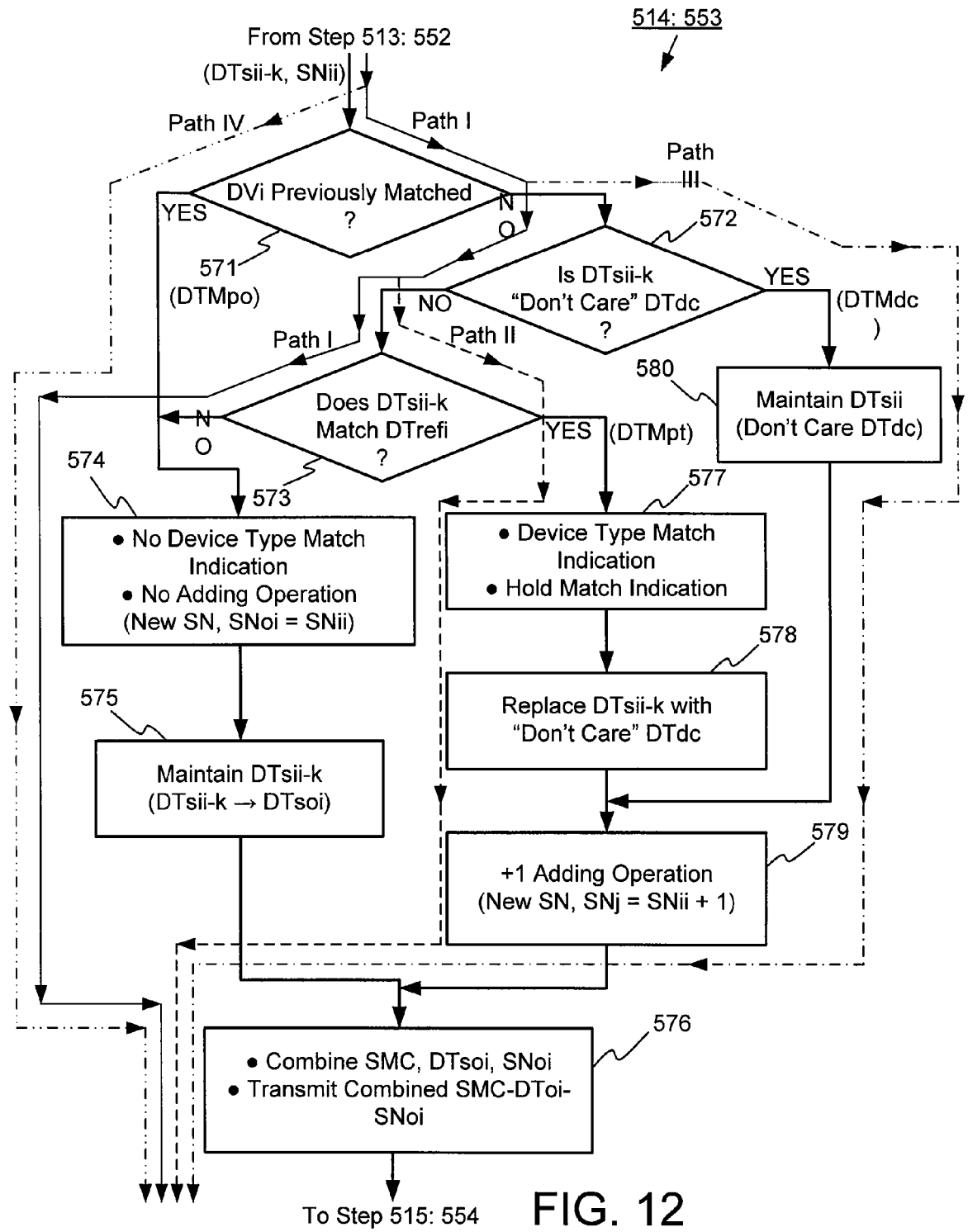
FIG. 12 is a flow chart illustrating a method for performing DT match determination and modification shown in FIGS. 9 and 11.

FIG. 12 shows the operations of the DT match determination and modification of step 514 as shown in FIG. 9 and step 553 as shown in FIG. 11. The operations of step 514 are similar to those of step 553. There are four determination operations depicted as "Path I", "Path II", "Path III" and "Path IV".

Path I is an operation path in which none of the present DT match indication DTMpt, the "don't care" DT match indication DTMdc and the previous DT match indication DTMpo is enabled. No device match is detected. No modifications of the DT and the SN are performed.

Path II is an operation path in which only the present DT match indication DTMpt is enabled. Both the DT and the SN are modified.

Path III is an operation path in which only the "don't care" DT match indication DTMdc is enabled. The DT is not modified. The SN is modified.

Path IV is an operation path in which only the previous DT match indication DTMpo is enabled. No modifications of the DT and the SN are performed.

Referring to FIGS. 1-12, the present device DVi receives the DTsi-k and the SNii accompanying the search operation command SMC and starts the determination and modification operations. At the device DVi, in response to the search operation command SMC, the match detector 322 of the SN/DT modification determiner 240-i performs the DT match determination.

The match detector 322 checks the storage 326 of the DT match determiner 320 (step 571). If no "previous match indication" is stored in the storage 326 (NO at step 571), the match detector 322 will compare the DTsii-k with the "don't care" code DTdc stored in (or generated by) the storage 328 (step 572). If the received DTsii-k is not the DTdc (NO at step 572), the match detector 322 will further compare the DTsii-k with the reference DT, DTrefi, stored in the storage 324 (step 573). If no match between the DTsii-k and the DTrefi (NO at step 573), the input DTsii-k will be determined as none of the previously matched DT, the DTdc and the DTrefi, Thus, none of the previous DT match indication DTMpo, the "don't care" DT match indication DTMdc and the present DT match indication DTMpt is enabled. Without a match between the DTsii-k and the DTrefi, the match detector 322 does not store a match indication in the storage 326. Neither the SN modifying indication MFsn nor the DT modifying indication MFdt are enabled by the modification provider 340. The selector 354 of the SN output provider 350 selects the SNii as the SNoi (step 574). Thus, the modification of the SN is skipped (or bypassed). Furthermore, the selector 332 of the DT output provider 330 selects the DTsii-k and outputs the selected DTsii-k as the DTsoi (step 575). Thus, the modification of the DT is skipped (or bypassed). The DTsoi and the SNoi are combined with the search operation command SMC by the data combiner 360 of the present device DVi and the combined SMC-DT-SN is transmitted to the next device DV(i+1) (step 576). This operation route is depicted as "Path I". Then, step 515 or 554 is performed.

If the DTsii-k matches the DTrefi (YES at step 573), the match detector 322 will store a "present match" indication in the storage 326 and enable the present DT match indication DTMpt. Thus, once a match between the DTsii-k and the DTrefi is determined, the match indication is held in the storage (step 577). In response to the enabling of the present DT match indication DTMpt, the SN modification provider 342 and the DT modification provider 344 provide the SN modifying indication MFsn and the DT modifying indication MFdt, respectively. In response to the DT modifying indication MFdt, the selector 332 of the DT output provider 330 selects the DTdc and outputs the DTdc as the DTsoi. Thus, the input DTsii-k is replaced with the DTdc (step 578). In response to the SN modifying indication MFsn, the selector 354 of the SN output provider 350 selects the SNc from the calculator 352 and outputs the SNc (=SNii+1) as the SNoi. Thus, "+1" adding operation is performed (step 579). Then, the replaced DTdc and the added SNc are combined with the search operation command SMC by the data combiner 360 and the combined data SMC-DT-SN is transmitted to the next device DV(i+1) (step 576). This operation route is depicted as "Path II". Then, step 515 or 554 is performed.

If the DTsii-k is the DTdc, the match detector 322 will enable the "don't care" DT match indication DTMdc (YES at step 572). In response to the "don't care" DT match indication DTMdc, the SN modification provider 342 enables the SN modifying indication MFsn and the DT modification provider 344 does not enable the DT modifying indication MFdt. The selector 332 of the DT output provider 330 selects the input DTsii-k (i.e., the DTdc) and the DTdc is output as the DTsoi (step 580). In response to the enabled SN modifying indication MFsn, the selector 354 of the SN output provider 350 selects the SNc from the calculator 352 and the added SN (=SNii+1) is output as the SNoi (step 579). The selected DTsoi and the added SNoi are combined with the search operation command SMC by the data combiner 360 and the combined SMC-DT-SN is transmitted to the next device DV(i+1) (step 576). This operation route is depicted as "Path III". Then, step 515 or 554 is performed.

As mentioned above, once a match between the DTsii-k and the DTrefi is determined (YES step 573), the "present match indication" DTMpt is stored in the storage 324, in one search cycle. In another (or a next, or later) search cycle, the stored "match indication" is referenced to as a "previous match" in that device DVi.

If, in a next search cycle, a "previous match indication" is stored in the storage 326 (YES at step 571), the match detector 322 will not perform further determinations. The operations of steps 574-576 are performed. None of the previous DT match indication DTMpo, the "don't care" DT match indication DTMdc and the present DT match indication DTMpt is enabled. Thus, the operations of match determination and modifications are skipped. This operation route is depicted as "Path IV". Then, step 515 or 554 is performed.

Figure 13:
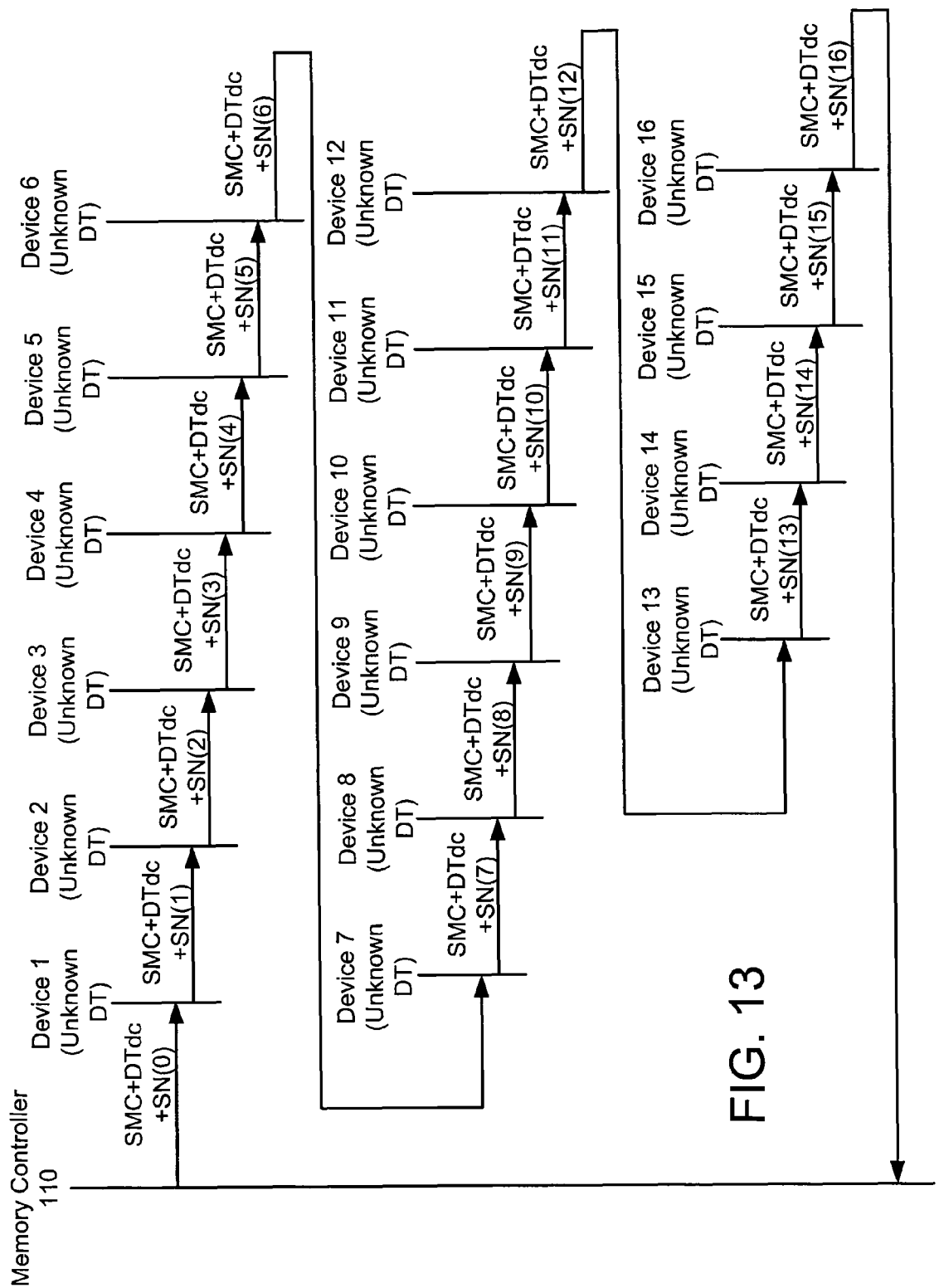
FIG. 13 is a schematic diagram illustrating a protocol conducted in the devices, with a serial input device type DTsi of a "don't care" code DTdc, to identify the total number of the devices in the serial interconnection configuration shown in FIG. 1.

FIG. 13 shows a protocol conducted in the devices, with a serial input device type DTsi of a "don't care" code DTdc, to identify the total number of devices in the serial interconnection configuration shown in FIG. 1. Referring to FIGS. 1-13, the memory controller 110 sends the DTdc as a search device type DTsi and an initial search number SN(0) to device 1 of the serial interconnection configuration. The DTdc and the SN(0) are combined with a search operation command SMC. In this case, the match detector 322 of device 1 detects the DTsi (i.e., the DTdc) and the "don't care" DT match indication DTMdc is enabled (YES step 572). The DTdc of the DTsi is maintained (step 580). The SN(0) is incremented by the calculator 352 and an incremented SN (SNo1=SN(0)+1) is output (step 579). The data combiner 360 of device 1 transmits a combined SMC+DTdc+(SN(0)+1) to device 2 (step 576).

Device 2 performs similar operations as device 1 and the search number SN is further incremented to "SN(1)+1". Such operations are repeated by all of the devices and the SN is incremented by each device. In this case, all devices perform the operations of "Path II". The incremented SN is propagated through the devices in the serial interconnection configuration. In this particular case, the value or number of the SNo16 contained in the SO16 is "SN(16)". From the SNo16 (=SN(16)), the memory controller 110 (the data compiler 137) recognizes that the total device number Ndv of the serial interconnection configuration is "16". This number is stored in the memory 139 of the memory controller 110. Information on the total number Ndv will be used later for identifying the device type of each device.

FIG. 14 shows a protocol conducted in the devices shown in FIG. 1, with various serial input device types DTsi. When an operation repetition parameter k is 1, with reference to a first DTsi-1 (e.g., a device type DTnd for NAND Flash devices), a search cycle of the DT and SN modification operations is repeated. Then, with reference to another DTsi (i.e., another number of the operation repetition parameter k), the device type identification is conducted. Such device type identification operations are reiterated with reference to all DTsi-k (1≦k≦M).

First Device Identification Operation (k=1)

A first device identification operation will be described, referring to FIGS. 1-14. A search reference device type DTsi-1 is the DTnd for NAND Flash devices. Each of FIGS. 15A-15E shows a protocol conducted in the devices shown in FIG. 1, with a serial input device type DTsi of a NAND Flash device type DTnd and a device type match of a NAND Flash device being detected.

(1) First Search Cycle (j=1):

The memory controller 110 (the SI provider 133) sends the DTsi-1 of the DTnd to device 1 of the serial interconnection configuration, the DTnd being in a combination of the search operation command SMC and an initial search number SN(0). If the match detector 322 of device 1 determines that the input DTsi-1 (DTnd) matches a reference DTref associated with device 1 (stored in the storage 326), a "present match" indication will be provided by the match detector 322 and stored in the storage 324 (steps 573 and 577). Then, the input DTnd of the DTsi-1 is replaced with the "don't care" code DTdc by the selector 332 of the DT output provider (step 578). The input SN(0) is incremented by the SN output provider 350 (step 579). A combined SMC-DTdc-SN(1) is transmitted as the SO1 to device 2 (step 576). Device 1 performs the operations of Path II.

Device 2 receives SI2 (i.e., SO1) that contains the DTdc. Thus, the DT match determiner 320 of device 2 conducts the operations of steps 580, 579 and 576. Thus, an incremented SN(2) is output and combined with the SMC and the DTdc. A combined SMC-DTdc-SN(2) is transmitted. Device 2 performs the operations of Path III.

Similarly, each of devices 3-16 repeats a similar process to that of device 2. An incremented SN is provided by each device. The devices perform the operations of Path III. Thus, the SNo16 contains a propagated SN(16). From the received SNo16 (SN(16)), the memory controller 110 (the data compiler 137) can identify which device has the device type DTsi-1 (i.e., DTnd) sent by the memory controller 110 by performing the calculation:

(Ndv+1)−(Number or Value of SNo16).

Figure 15A:
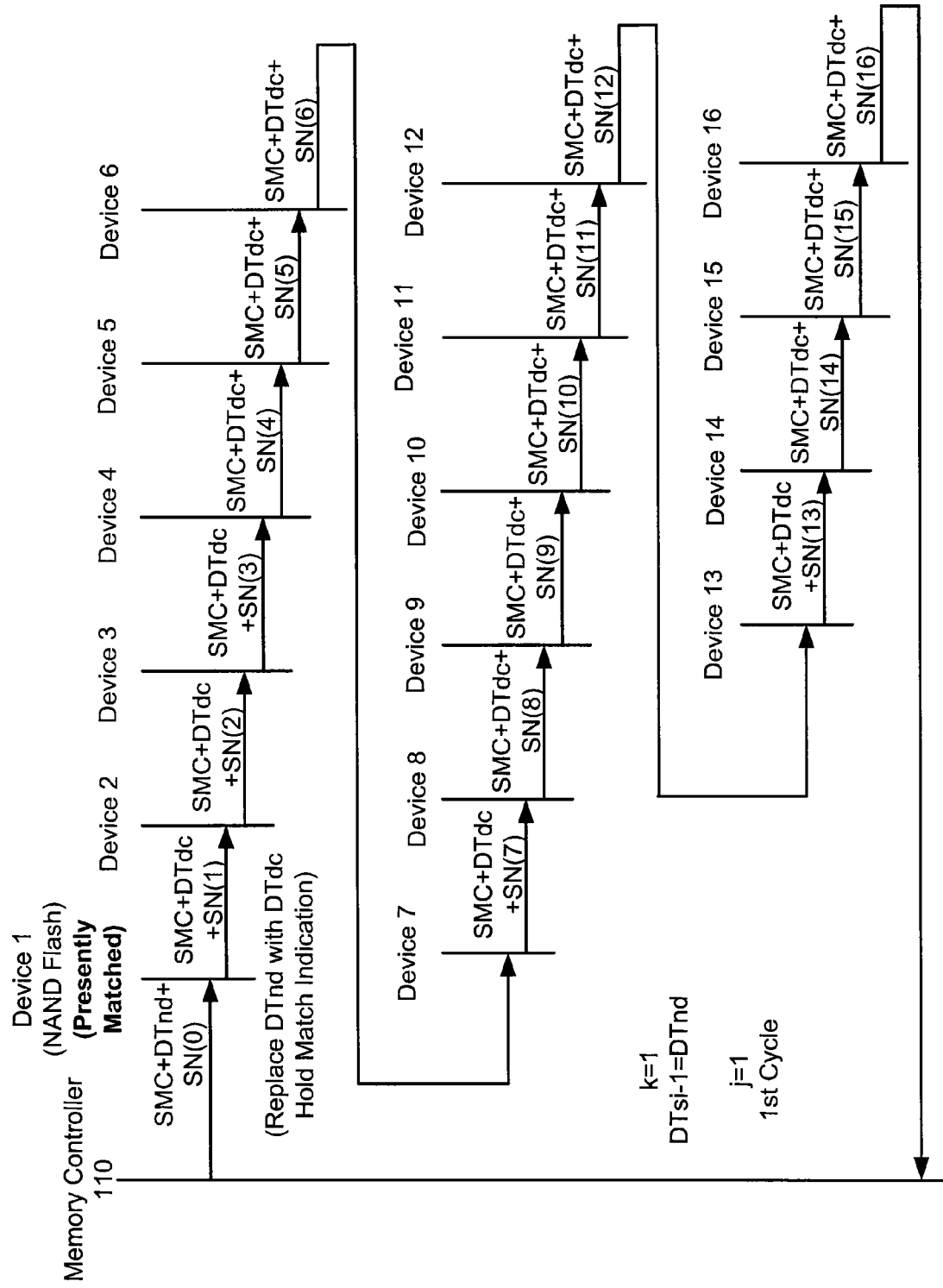
FIG. 15A is a schematic diagram illustrating a protocol conducted in the devices shown in FIG. 1, with a serial input device type DTsi of a NAND Flash device type DTnd and with a device type match of a first NAND Flash device being detected.

In this case, the SNo16 has a value or number of SN(16) and thus, the DT of device 1 is a NAND Flash device. Such operations of the first search cycle are depicted in FIG. 15A.

Figure 15B:
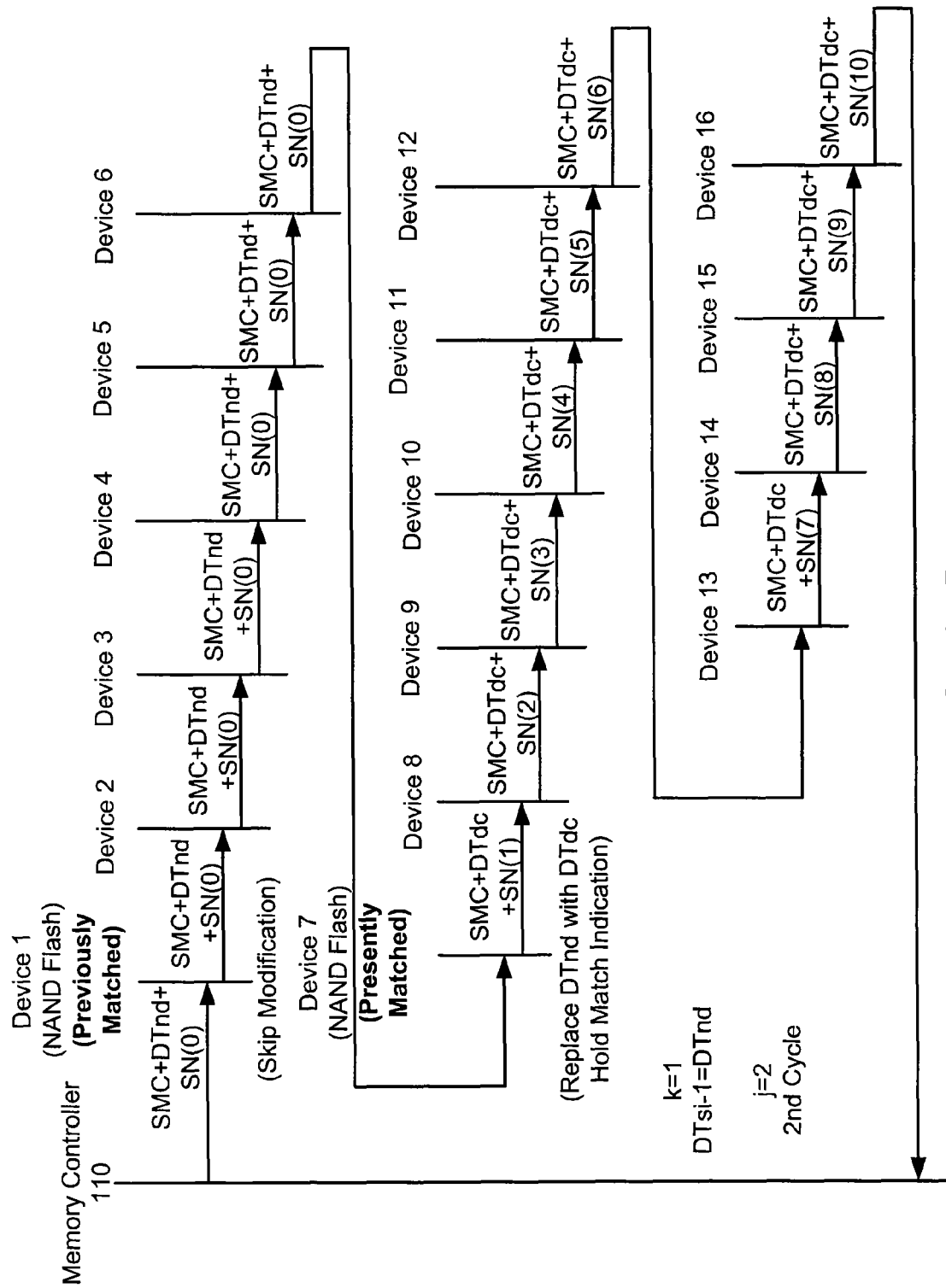
FIG. 15B is a schematic diagram illustrating a protocol conducted in the devices shown in FIG. 1, with a serial input device type DTsi of a NAND Flash device type DTnd and with a device type match of a second NAND Flash device being detected.

(2) Second Search Cycle (j=2):

The memory controller 110 again sends the DTnd as a search DTsi with an initial SN, SN(0), to device 1. Since the storage 324 of the DT match determiner 320 has stored a "previous match indication" therein in the first search cycle, while the DTsi-1 (DTnd) matches the reference DTref of device 1, the match detector 322 skips the determination and modification operations (YES at step 571). Device 1 conducts the operations of steps 574-576 and transmits a combined SMC-DTnd-SN(0) to device 2. Device 1 performs the operations of Path IV. If each of devices 2-6 does not determine a "present match" between the DTnd and its reference DTref (NO at steps 571, 572 and 573), the modification operation will be skipped in that device (steps 574, 575 and 576). The devices perform the operations of Path I. If device 7 determines a "present match" (YES at step 573), the operations of steps 577, 578, 579 and 576 will be conducted. Device 7 performs the operations of Path II. An incremented SN (SN(0)+1=SN(1)) is output and the DTsi (DTnd) is replaced with the DTdc. A combined SMC-DTdc-SN(1) is transmitted to device 8. Then, each of devices 8-16 conducts the operations of steps 580, 579 and 576 (Path III). Thus, the SNo16 contains the propagated SN(10). From the value of "10", the memory controller 110 identifies device 7 (=(16+1)−10) as a NAND Flash device. This is shown in FIG. 15B.

(3) Third Search Cycle (j=3):

The memory controller 110 again sends the DTnd as a search DTsi with an initial SN, SN(0), to device 1. The storages 324 of devices 1 and 7 store a "previous match indication" in the first search cycle and the second search cycle, respectively. While the DTsi-1 (DTnd) matches the reference DTref of devices 1 and 7, the match detector 322 of each of devices 1 and 7 skips the determination and modification operations (YES at step 571). Thus, a combined SMC-DTnd-SN(0) is transmitted to device 8. Devices 1 and 7 perform the operations of Path IV. Devices 2-6 perform the operations of Path I. If each of devices 8-10 does not determine a "present match", the modification operation will be skipped. Devices 8-10 perform the operations of Path I. If device 11 determines a "present match" (YES at step 573), the operations of steps 577, 578, 579 and 576 will be conducted. Device 11 performs the operations of Path II. An incremented SN (SN(0)+1=SN(1)) is output and the DTsi (DTnd) is replaced with the DTdc.

Figure 15C:
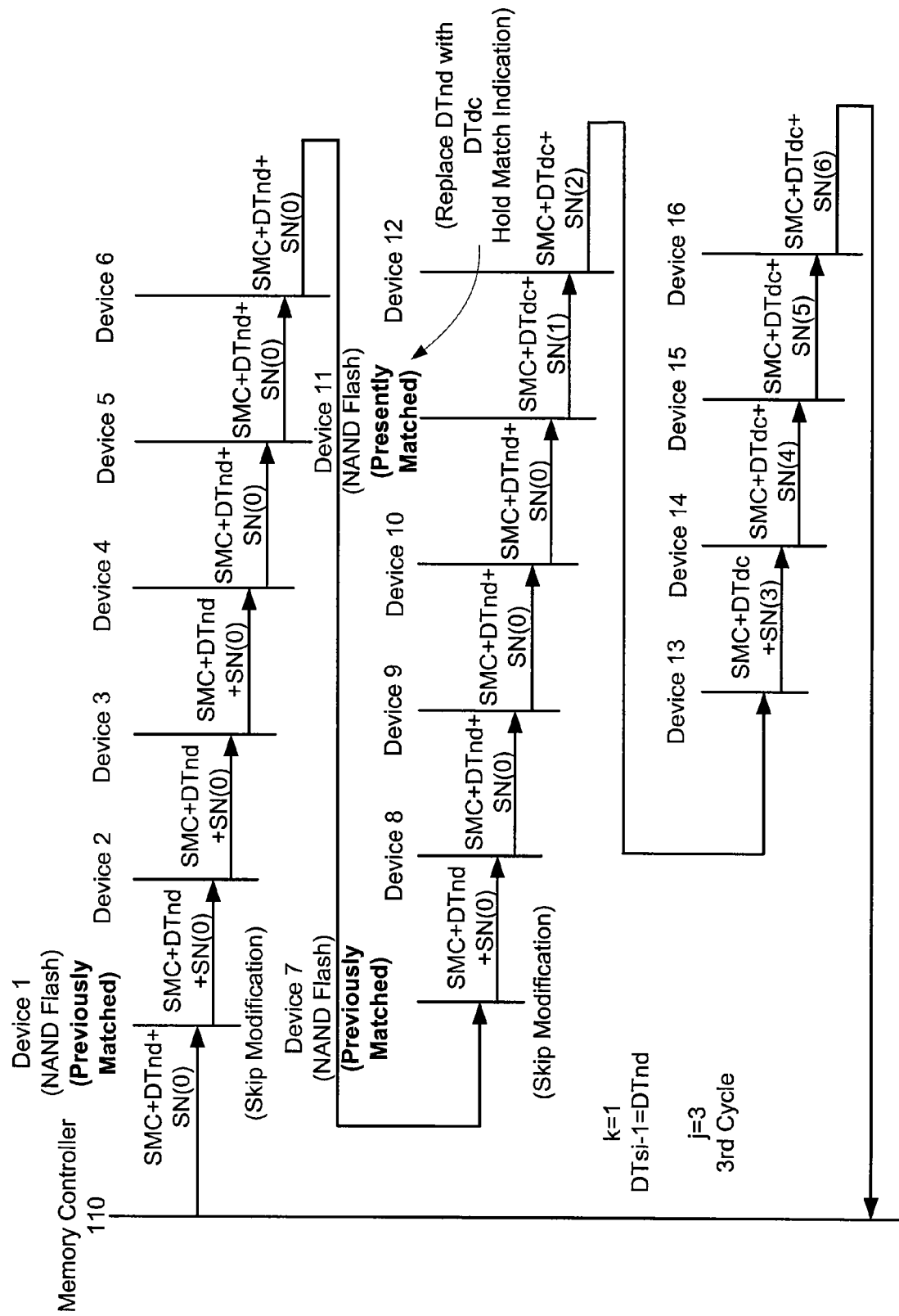
FIG. 15C is a schematic diagram illustrating a protocol conducted in the devices shown in FIG. 1, with a serial input device type DTsi of a NAND Flash device type DTnd and with a device type match of a third NAND Flash device being detected.

A combined SMC-DTdc-SN(1) is transmitted to device 12. Then, each of devices 12-16 conducts the operations of steps 580, 579 and 576. The devices perform the operations of Path III. Thus, the SNo16 contains the propagated SN(6). From the value of "6", the memory controller 110 identifies device 11(=(16+1)–6) as a NAND Flash device. This is shown in FIG. 15C.

Figure 15D:
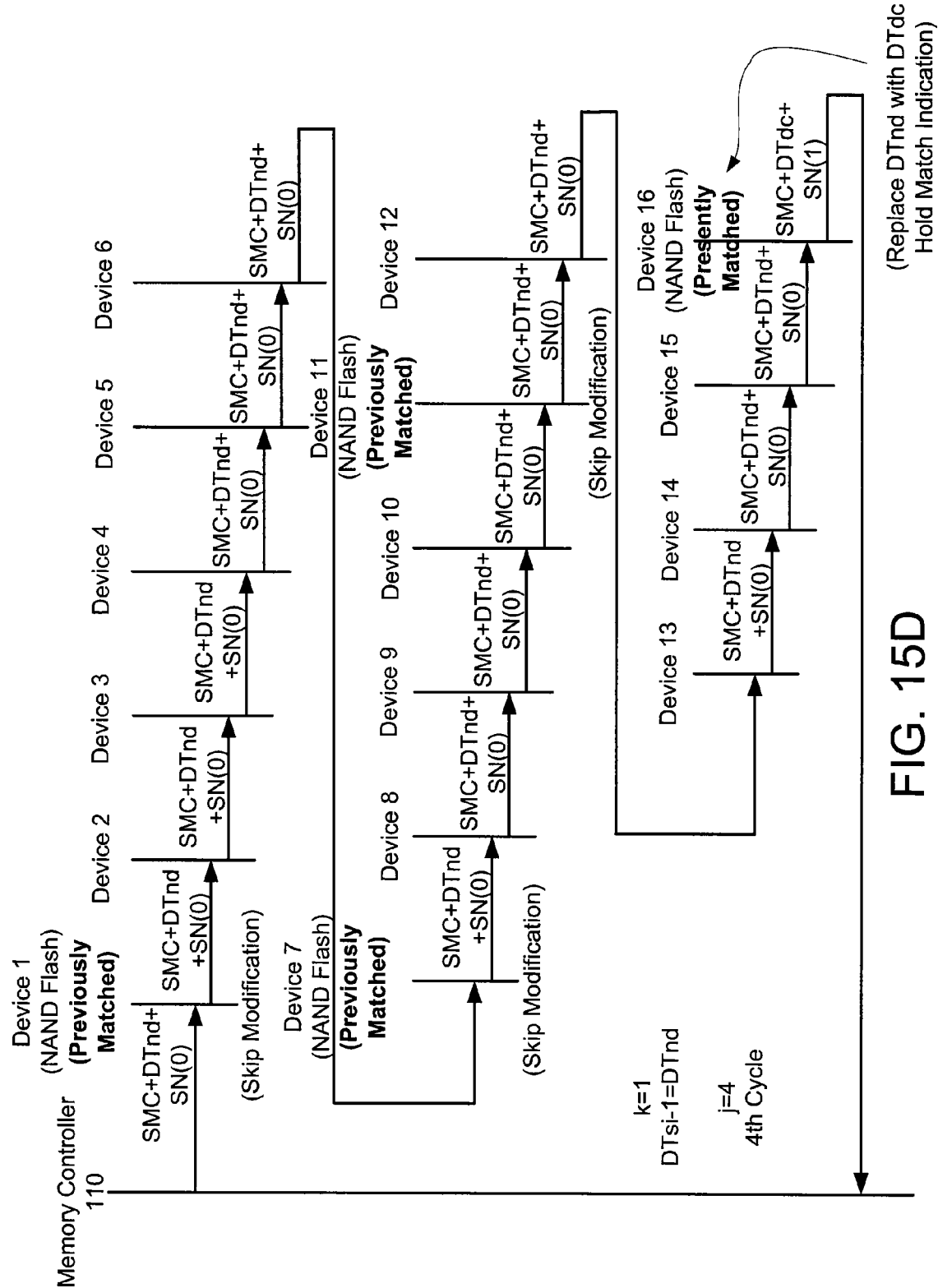
FIG. 15D is a schematic diagram illustrating a protocol conducted in the devices shown in FIG. 1, with a serial input device type DTsi of a NAND Flash device type DTnd and with a device type match of a fourth NAND Flash device being detected.

(4) Fourth Search Cycle (j=4):

The memory controller 110 again sends the DTnd as a search DTsi with an initial SN, SN(0), to device 1. The storages 324 of devices 1, 7 and 11 store a "previous match indication" in the first, second and third search cycles, respectively. While the DTsi-1 (DTnd) matches the reference DTref of each of devices 1, 7 and 11, the match detector 322 of each of devices 1, 7 and 11 skips the determination and modification operations (YES at step 571). Devices 1, 7 and 11 perform the operations of Path IV. Devices 2-6 and 8-10 perform the operations of Path I. Thus, a combined SMC-DTnd-SN(0) is transmitted to device 12. If none of devices 12-15 determines a "present match", the modification operation will be skipped. The devices perform the operations of Path I. If device 16 determines a "present match" (YES at step 573), an incremented SN (SN(0)+1=SN(1)) is output and the DTsi (DTnd) is replaced with the DTdc. Device 16 performs the operations of Path II. A combined SMC-DTdc-SN(1) is transmitted to the next device, that is, to the memory controller 110. The SNo16 contains the propagated SN(1). From the value of "1", the memory controller 110 identifies device 16 (=(16+1)–1) as a NAND Flash device. This is shown in FIG. 15D.

Figure 15E:
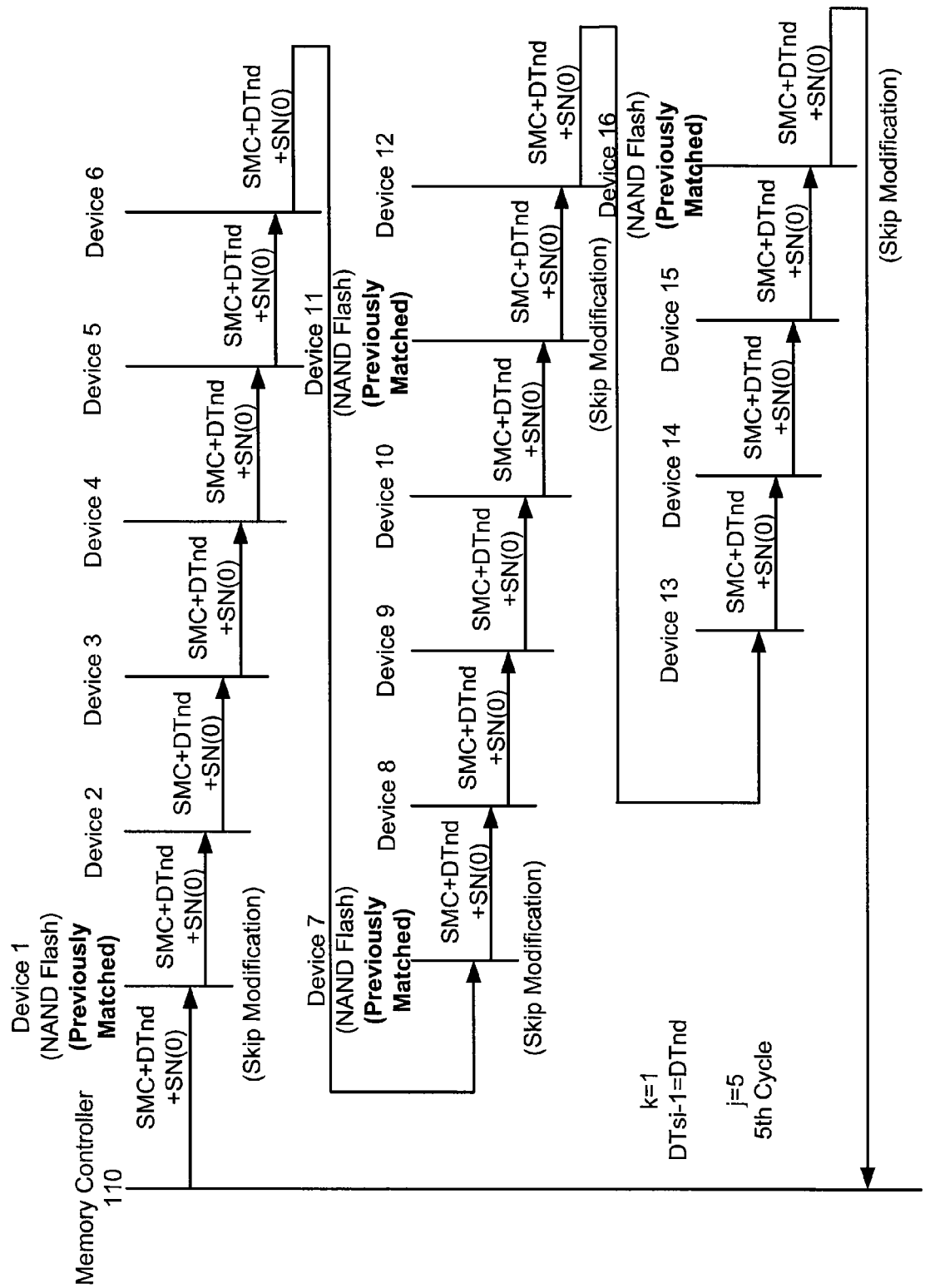
FIG. 15E is a schematic diagram illustrating a protocol conducted in the devices shown in FIG. 1, with a serial input device type DTsi of a NAND Flash device type DTnd and with no NAND Flash device being detected.

(5) Fifth Search Cycle (j=5):

The memory controller 110 again sends the DTnd as a search DTsi with an initial SN, SN(0), to device 1. The storages 324 of devices 1, 7, 11 and 16 store a "previous match indication" in the first, second, third and fourth search cycles, respectively. While the DTsi-1 (DTnd) matches the reference DTref of each of devices 1, 7, 11 and 16, the match detector 322 of each of devices 1, 7, 11 and 16 skips the determination and modification operations (YES at step 571). Devices 1, 7, 11 and 16 perform the operations of Path IV. The other devices perform the operations of Path I. Thus, a combined SMC-DTnd-SN(0) is transmitted to a next device, that is, the memory controller 110. The SNo16 contains the propagated SN(0). From the value of "0", the memory controller 110 recognizes that no more devices are required to be identified with reference to the DTsi-1 (DTnd). This is depicted in FIG. 15E. If another search is required (YES at step 535), the memory controller 110 changes the DTsi-k to another DTsi (step 536). Then, the modification operations are repeated.

Second Device Identification Operation (k=2)

A second device identification operation will be described. A search reference device type DTsi-2 is the DTnr for NOR Flash devices. Each of FIGS. 16A-16D shows a protocol conducted in the devices shown in FIG. 1, with a serial input device type DTsi of a NOR Flash device type DTnr and a device type match of a NOR Flash device being detected.

Prior to the start of the match determination and modification operations, the storages 324 of the DT match determiners 320 of all devices are reset by the reset signal SRST to cancel the "previous match indications" in the previous search with reference to the DTnd (step 532). A second device identification operation will be described referring to FIGS. 1-14.

Figure 16A:
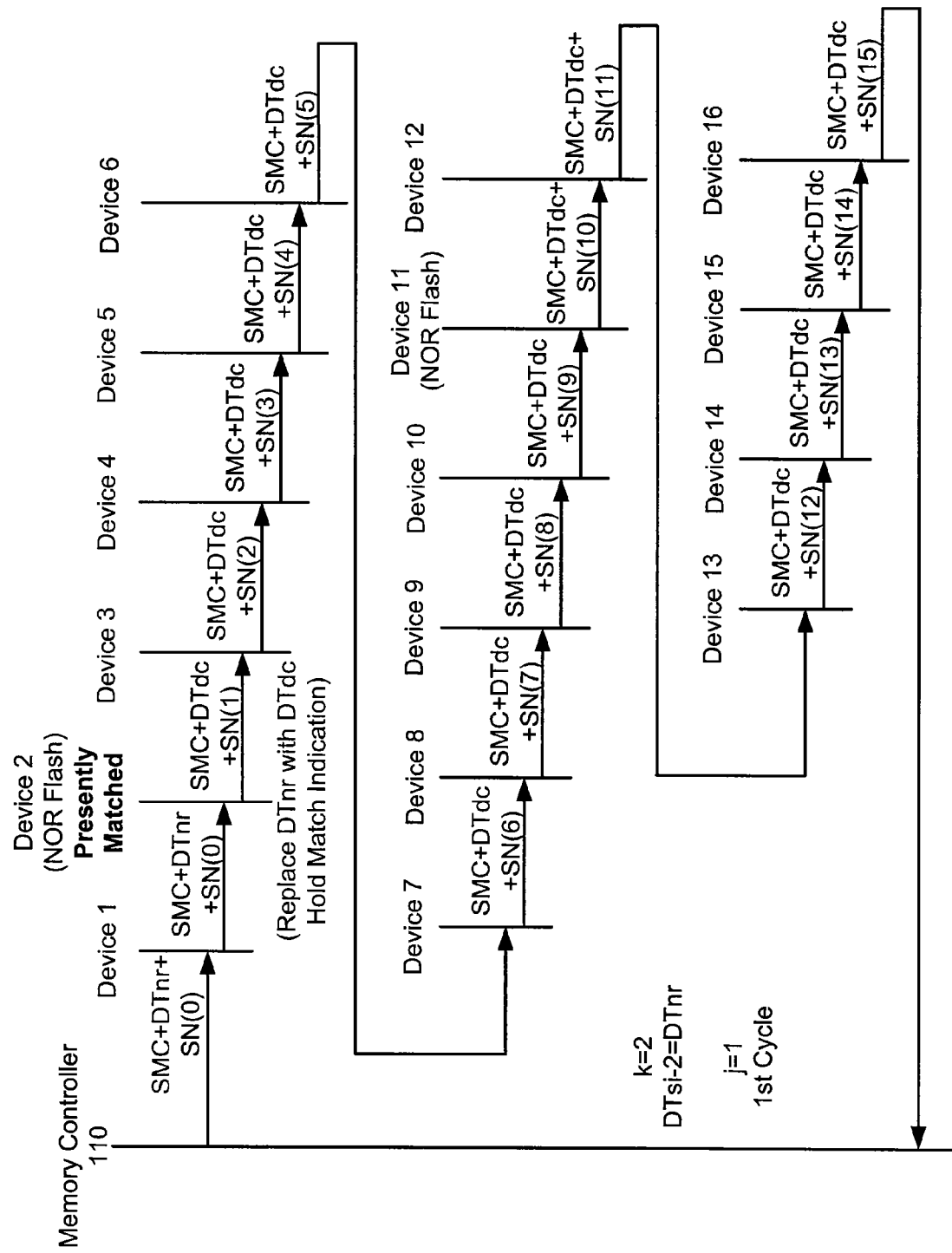
FIG. 16A is a schematic diagram illustrating a protocol conducted in the devices shown in FIG. 1, with a serial input device type DTsi of a NOR Flash device type DTnr and with a device type match of a first NOR Flash device being detected.

(1) First Search Cycle (j=1):

The memory controller 110 (the SI provider 133) sends the DTsi-2 of the DTnr to device 1 of the serial interconnection configuration, the DTnr being in a combination of the search operation command SMC and an initial search number SN(0). If device 1 does not detect a match determination with the DTnr, a combined SMC-DTnr-SN(0) is transmitted to device 2. In a case where the match detector 322 of device 2 determines that the DTsi matches its reference DTref (step 573), a match indication is stored in the storage 324 (step 577) and the DTnr is replaced with the DTdc by the selector 332 of the DT output provider (step 578). The SN is incremented by the SN output provider 350 (step 579). A combined SMC-DTdc-SN(1) is transmitted to device 3. Then, since the input DTsi is the DTdc, the DT match determiners 320 of all of devices 3-16 conduct the operations of steps 580, 579 and 576. The input SN is incremented by each device. Thus, the SNo16 contains the propagated SN(15). From the value of "15", the memory controller 110 identifies device 2(=(16+1)–15) as a NOR Flash device. In this case, device 1 performs the operations of Path I. Device 2 performs the operations of Path II. The other devices perform the operations of Path III. This is shown in FIG. 16A.

Figure 16B:
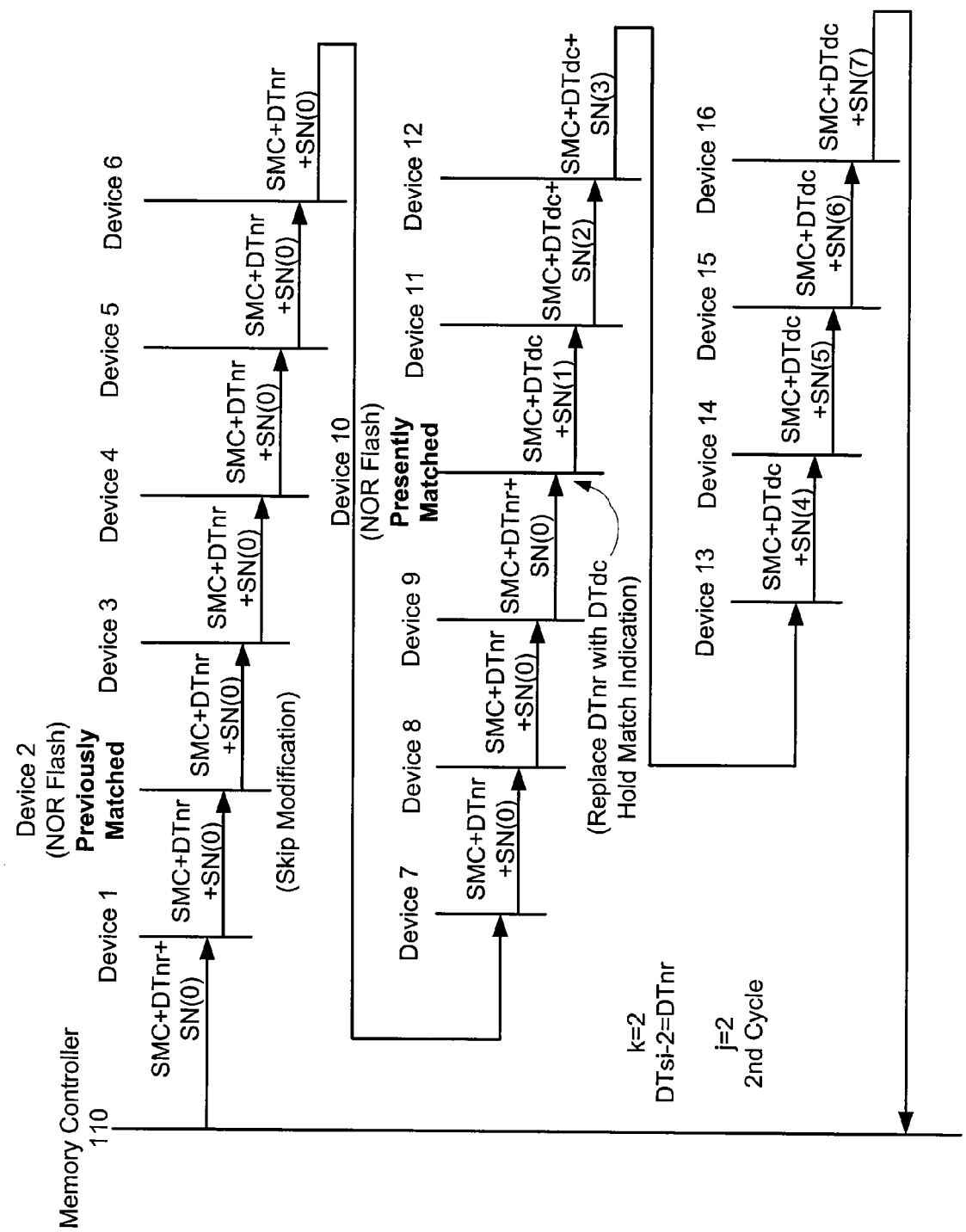
FIG. 16B is a schematic diagram illustrating a protocol conducted in the devices shown in FIG. 1, with a serial input device type DTsi of a NOR Flash device type DTnr and with a device type match of a second NOR Flash device being detected.

(2) Second Search Cycle (j=2):

The memory controller 110 again sends the DTnr as a search DTsi with an initial SN, SN(0), to device 1. Since the storage 324 of device 2 has a "previous match indication" stored therein in the first search cycle, while the DTsi-2 (DTnr) matches the reference DTref of device 2, the match detector 322 skips the determination and modification operations (YES at step 571). A combined SMC-DTnr-SN(0) is transmitted. It is assumed that device 10 detects a "present match" (YES at step 573). Device 10 performs the operations of Path II. Devices 1 and 3-9 perform the operations of Path I. The other devices perform the operations of Path III. Thus, the SNo16 contains the propagated SN(7). From the value of "7", the memory controller 110 identifies device 10(=(16+1)–7) as a NOR Flash device. This is shown in FIG. 16B.

Figure 16C:
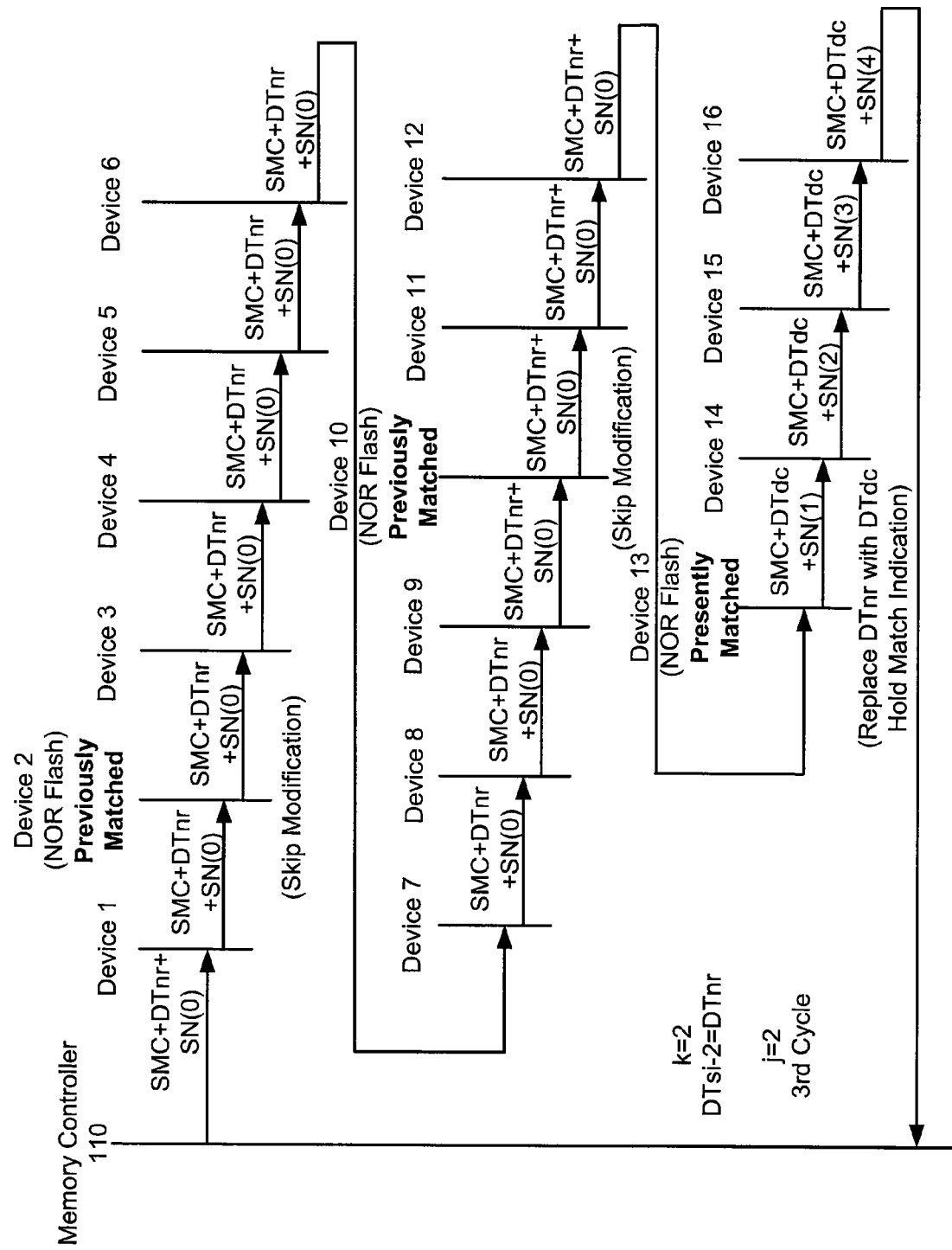
FIG. 16C is a schematic diagram illustrating a protocol conducted in the devices shown in FIG. 1, with a serial input device type DTsi of a NAND Flash device type DTnd and with a device type match of a third NOR Flash device being detected.

(3) Third Search Cycle (j=3):

The memory controller 110 again sends the DTnr as a search DTsi with an initial SN, SN(0), to device 1. The storages 324 of devices 2 and 10 store a "previous match indication" in the first and second search cycles, respectively. Devices 2 and 10 perform the operations of Path IV. It is assumed that device 13 detects a "present match" (YES at step 573). Device 13 performs the operations of Path II. Devices 1, 3-9 and 11-12 perform the operations of Path I. The other devices perform the operations of Path III. Thus, the SNo16 contains the propagated SN(4). From the value of "4", the memory controller 110 identifies device 13(=(16+1)–4) as a NOR Flash device. This is shown in FIG. 16C.

Figure 16D:
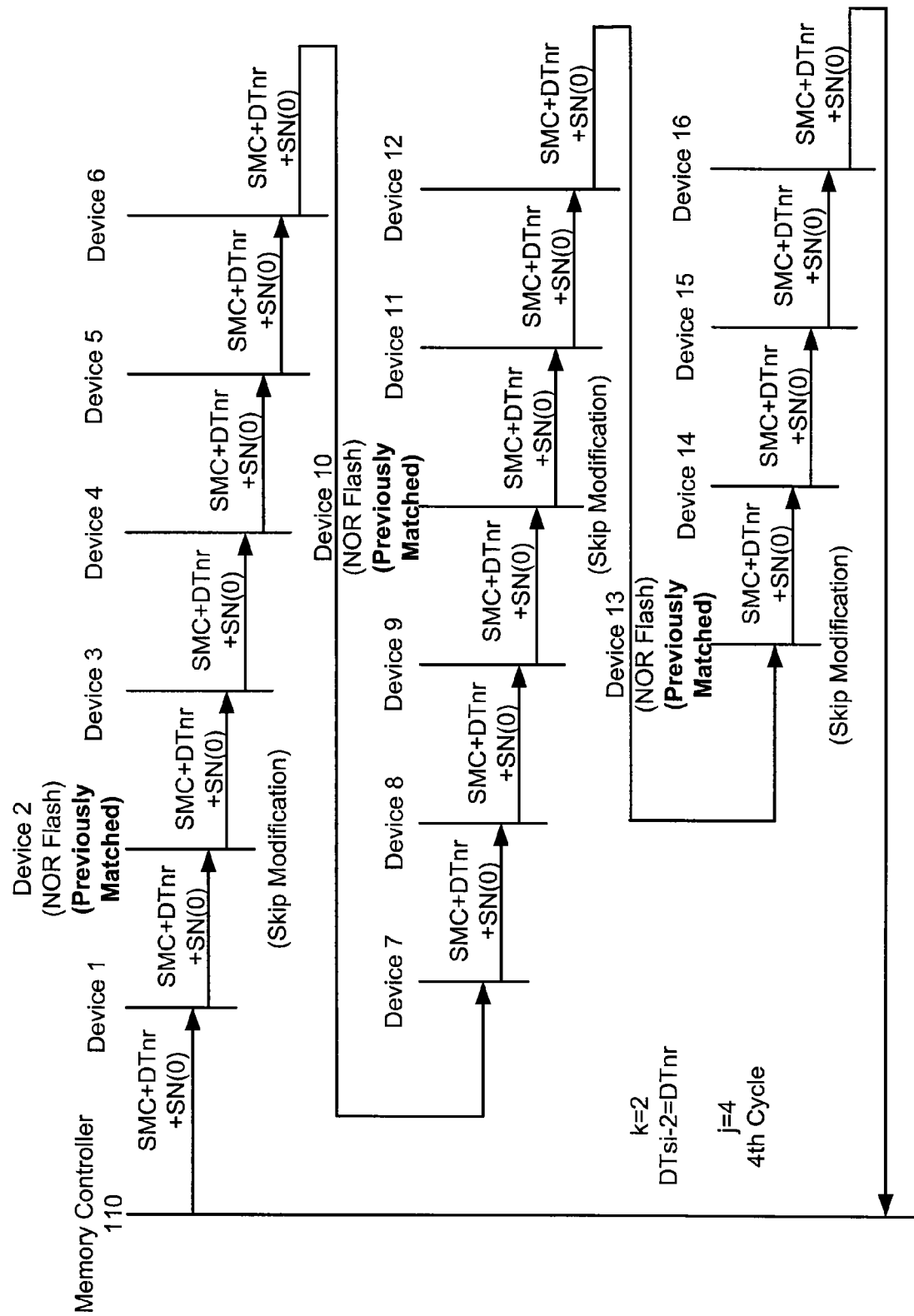
FIG. 16D is a schematic diagram illustrating a protocol conducted in the devices shown in FIG. 1, with a serial input device type DTsi of a NOR Flash device type DTnd and with no NOR Flash device being detected.

(4) Fourth Search Cycle (j=4):

The memory controller 110 again sends the DTnr as a search DTsi with an initial SN, SN(0), to device 1. The storages 324 of devices 2, 10 and 13 store a "previous match indication" in the first, second and third search cycles, respectively. Devices 2, 10 and 13 perform the operations of Path IV. It is assumed that no other devices detect a "present match" (NO at step 573). Devices 1, 3-9, 11-12 and 14-16 perform the operations of Path I. The modification operation is skipped. Therefore, the search number SN is propagated without being modified. The propagated SNo16 contains the SN(0). From the value of "0", the memory controller 110 recognizes that no more devices are required to be identified with reference to the DTsi-2 (DTnr). This is depicted in FIG. 16D. If another search is required (YES at step 535), the memory controller 110 changes the DTsi-k to another DTsi (step 536). Then, the modification operations are repeated.

Third Device Identification Operation (k=3)

A third device identification operation will be described. A search reference device type DTsi-3 is the DTdm for DRAM devices. Each of FIGS. 17A-17D shows a protocol conducted in the devices shown in FIG. 1, with a serial input device type DTsi of a DRAM device type DTdm and a device type match of a DRAM device being detected.

Prior to the start of the match determination and modification operations, the storages 324 of the DT match determiners 320 of all devices are reset by the reset signal SRST to cancel the "previous match indications" in the previous search with reference to the DTnr (step 532). A third device identification operation will be described referring to FIGS. 1-14.

Figure 17A:
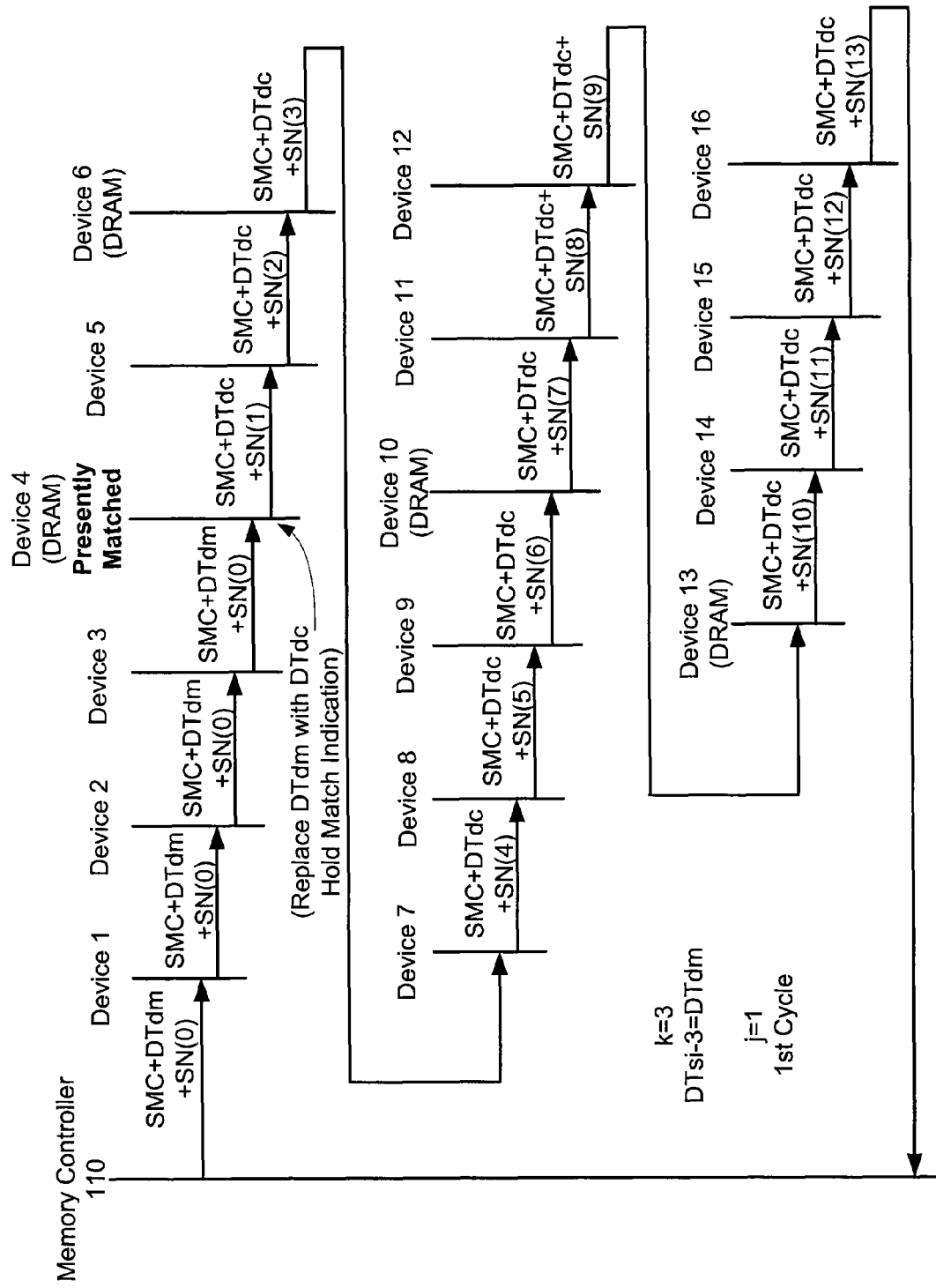
FIG. 17A is a schematic diagram illustrating a protocol conducted in the devices shown in FIG. 1, with a serial input device type DTsi of a DRAM device type DTdm and with a device type match of a first DRAM device being detected.

(1) First Search Cycle (j=1):

The memory controller 110 (the SI provider 133) sends the DTsi-3 of the DTdm to device 1 of the serial interconnection configuration, the DTdm being in a combination of the search operation command SMC and an initial search number SN(0). It is assumed that device 4 detects a "present match" (YES at step 573). Device 4 performs the operations of Path II. Devices 1-3 perform the operations of Path I. The other devices perform the operations of Path III. The SNo16 contains the propagated SN(13). From the value of "13", the memory controller 110 identifies device 4(=(16+1)−13) as a DRAM device. This is shown in FIG. 17A.

Figure 17B:
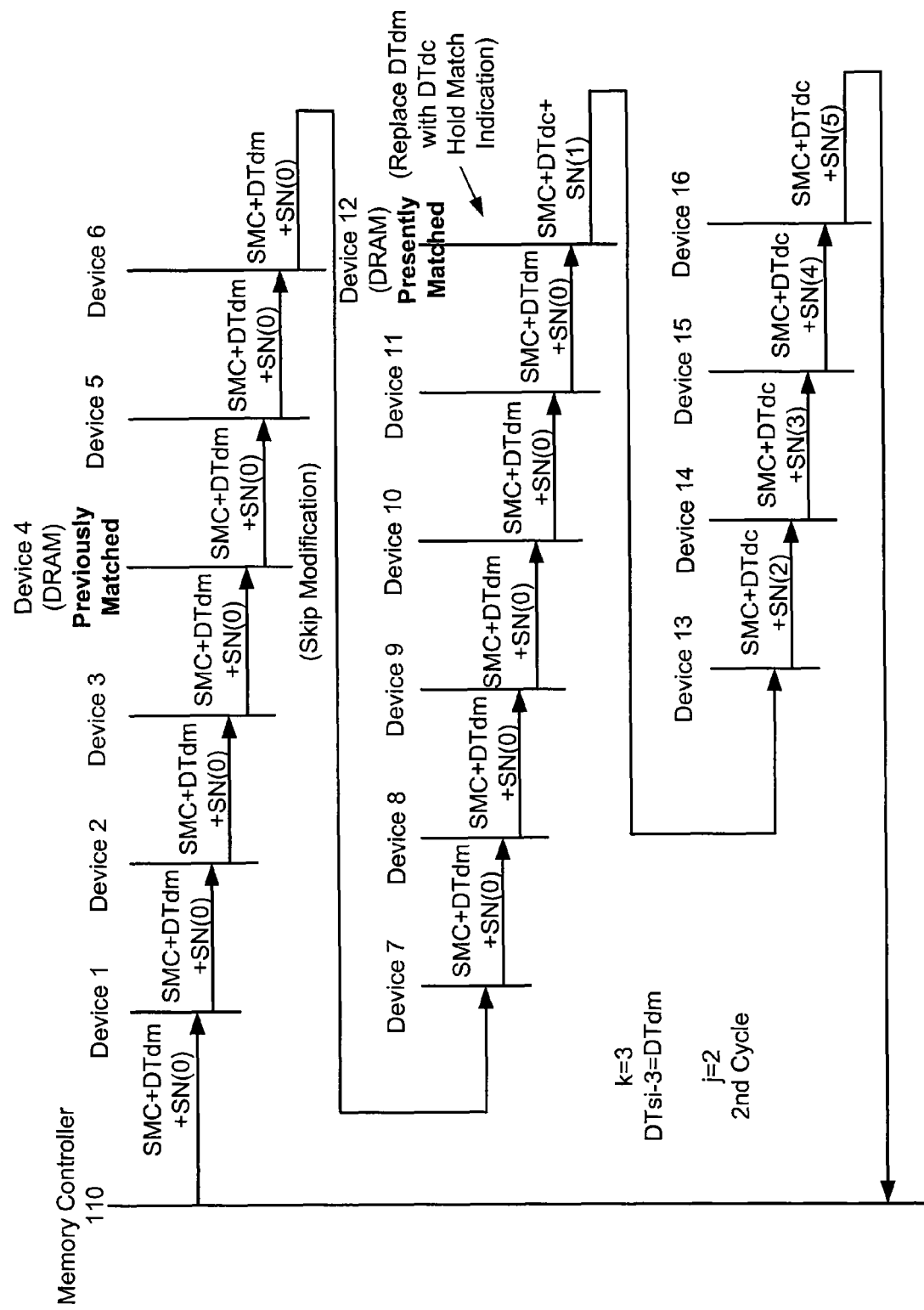
FIG. 17B is a schematic diagram illustrating a protocol conducted in the devices shown in FIG. 1, with a serial input device type DTsi of a DRAM device type DTdm and with a device type match of a second DRAM device being detected.

(2) Second Search Cycle (j=2):

The memory controller 110 again sends the DTdm as a search DTsi with an initial SN, SN(0), to device 1. The storage 324 of device 4 has a "previous match indication" stored therein in the first search cycle. Device 4 performs the operations of Path IV. It is assumed that device 12 detects a "present match" (YES at step 573). Device 12 performs the operations of Path II. Devices 1-3 and 5-11 perform the operations of Path I. The other devices perform the operations of Path III. The SNo16 contains the propagated SN(5). From the value of "5", the memory controller 110 identifies device 12 (=(16+1)−5) as a DRAM device. This is shown in FIG. 17B.

Figure 17C:
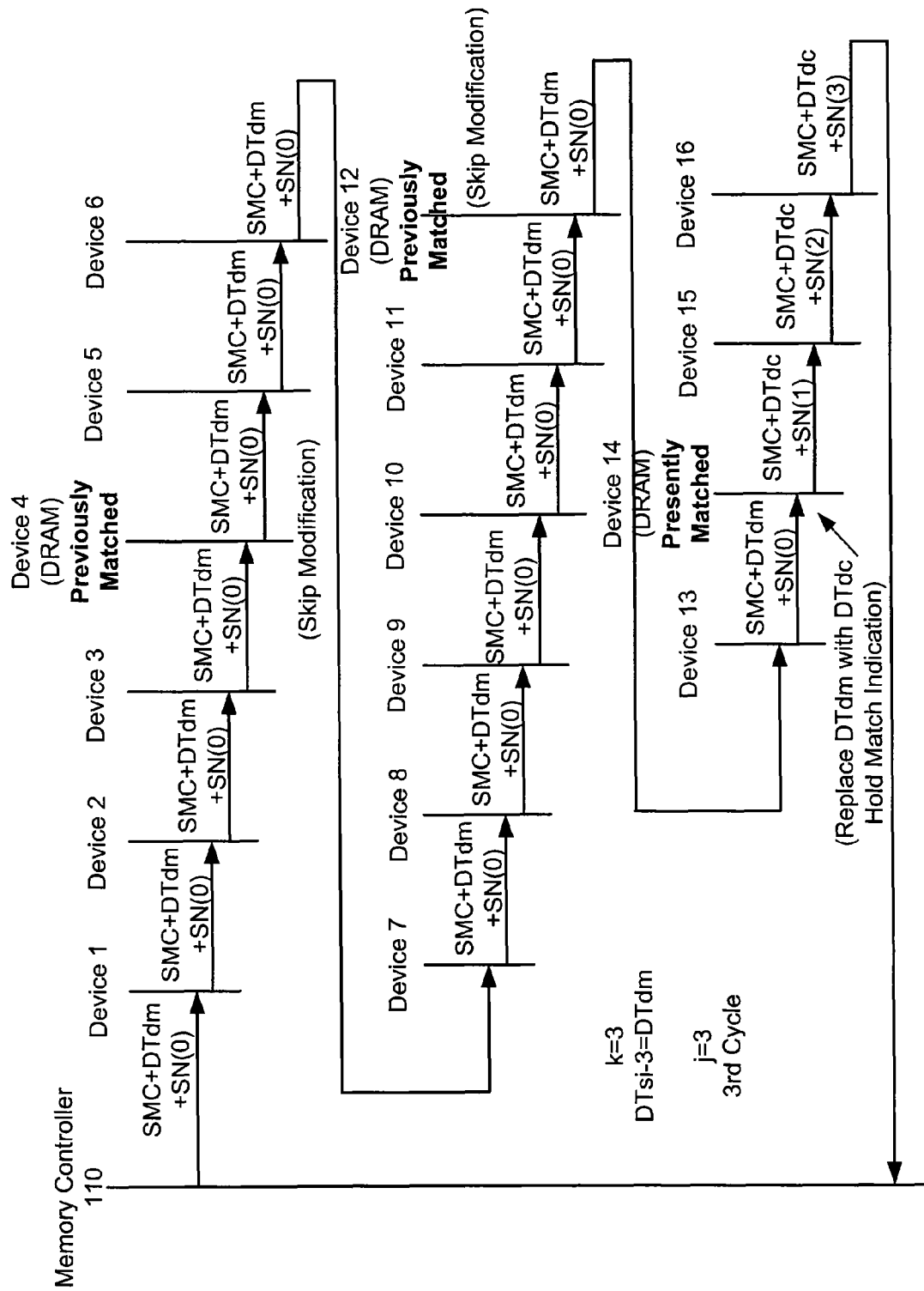
FIG. 17C is a schematic diagram illustrating a protocol conducted in the devices shown in FIG. 1, with a serial input device type DTsi of a DRAM device type DTdm and with a device type match of a third DRAM device being detected.

(3) Third Search Cycle (j=3):

The memory controller 110 again sends the DTdm as a search DTsi with an initial SN, SN(0), to device 1. The storages 324 of devices 4 and 12 store a "previous match indication" in the first and second search cycles, respectively. Devices 4 and 12 perform the operations of Path IV. It is assumed that device 14 detects a "present match" (YES at step 573). Device 14 performs the operations of Path II. Devices 1-3, 5-11 and 13 perform the operations of Path I. The other devices perform the operations of Path III. The SNo16 contains the propagated SN(3). From the value of "3", the memory controller 110 identifies device 14 (=(16+1)−3) as a NOR Flash device. This is shown in FIG. 17C.

Figure 17D:
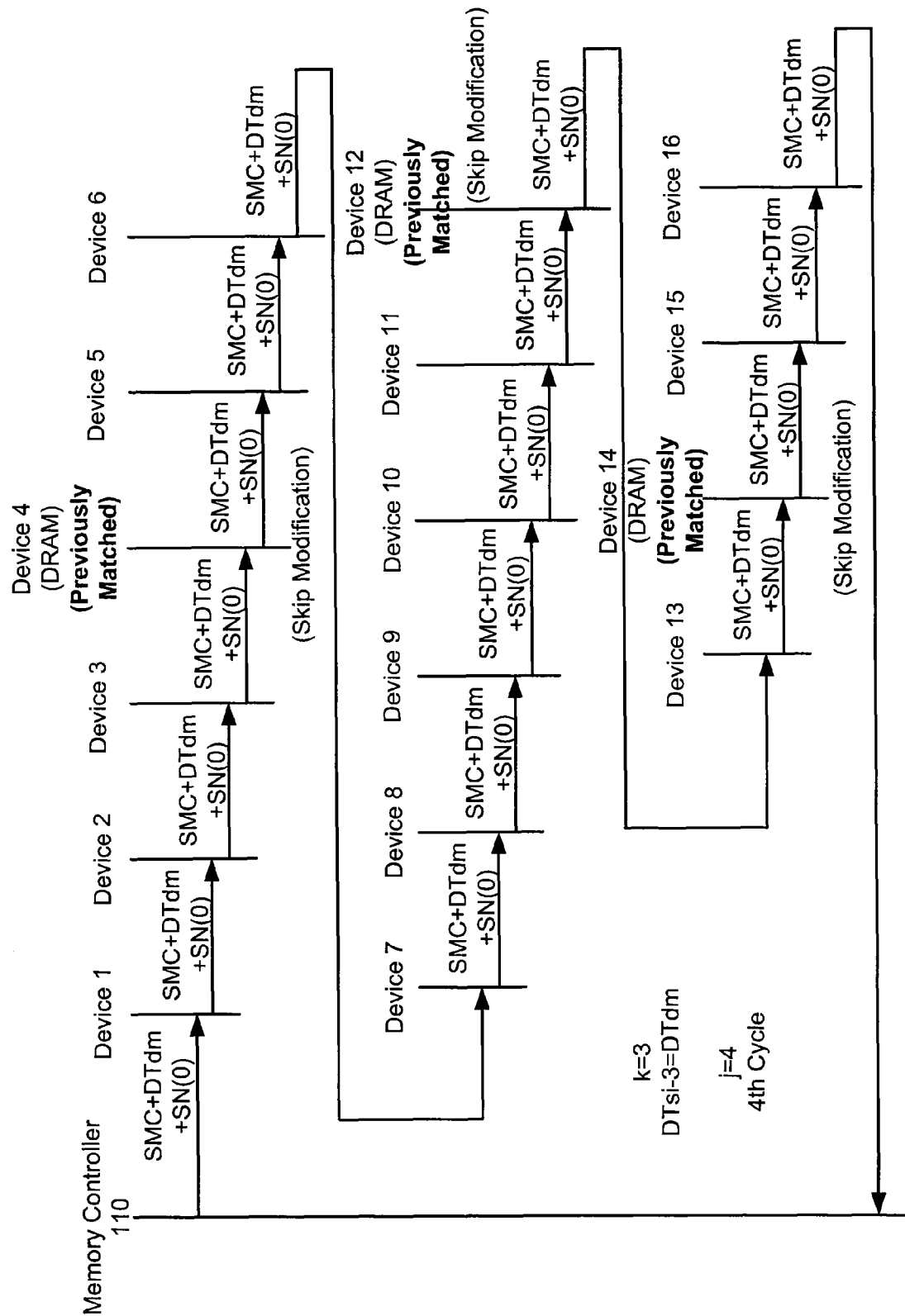
FIG. 17D is a schematic diagram illustrating a protocol conducted in the devices shown in FIG. 1, with a serial input device type DTsi of a DRAM device type DTdm and with no DRAM device being detected.

(4) Fourth Search Cycle (j=4):

The memory controller 110 again sends the DTdm as a search DTsi with an initial SN, SN(0), to device 1. The storages 324 of devices 4, 12 and 14 store a "previous match indication" in the first, second and third search cycles, respectively. Devices 4, 12 and 14 perform the operations of Path IV. It is assumed that none of devices detect a "present match". Devices 1-3, 5-11, 13 and 15-16 perform the operations of Path I. In this case, the modification operation is skipped. Therefore, the search number SN is propagated without being modified. The propagated SNo16 contains the SN(0). From the value of "0", the memory controller 110 recognizes that no more devices are required to be identified with reference to the DTsi-3 (DTdm). This is depicted in FIG. 17D. If another search is required (YES at step 535), the memory controller 110 changes the DTsi-k to another DTsi (step 536). Then, the modification operations are repeated.

Fourth Device Identification Operation (k=4)

A fourth device identification operation will be described. A search reference device type DTsi-4 is the DTsm for SRAM devices. Each of FIGS. 18A-18D shows a protocol conducted in the devices shown in FIG. 1, with a serial input device type DTsi of an SRAM device type DTsm and a device type match of an SRAM device being detected.

Prior to the start of the match determination and modification operations, the storages 324 of the DT match determiners 320 of all devices are reset by the reset signal SRST to cancel the "previous match indications" in the previous search with reference to the DTdm (step 532). A fourth device identification operation will be described referring to FIGS. 1-14.

Figure 18A:
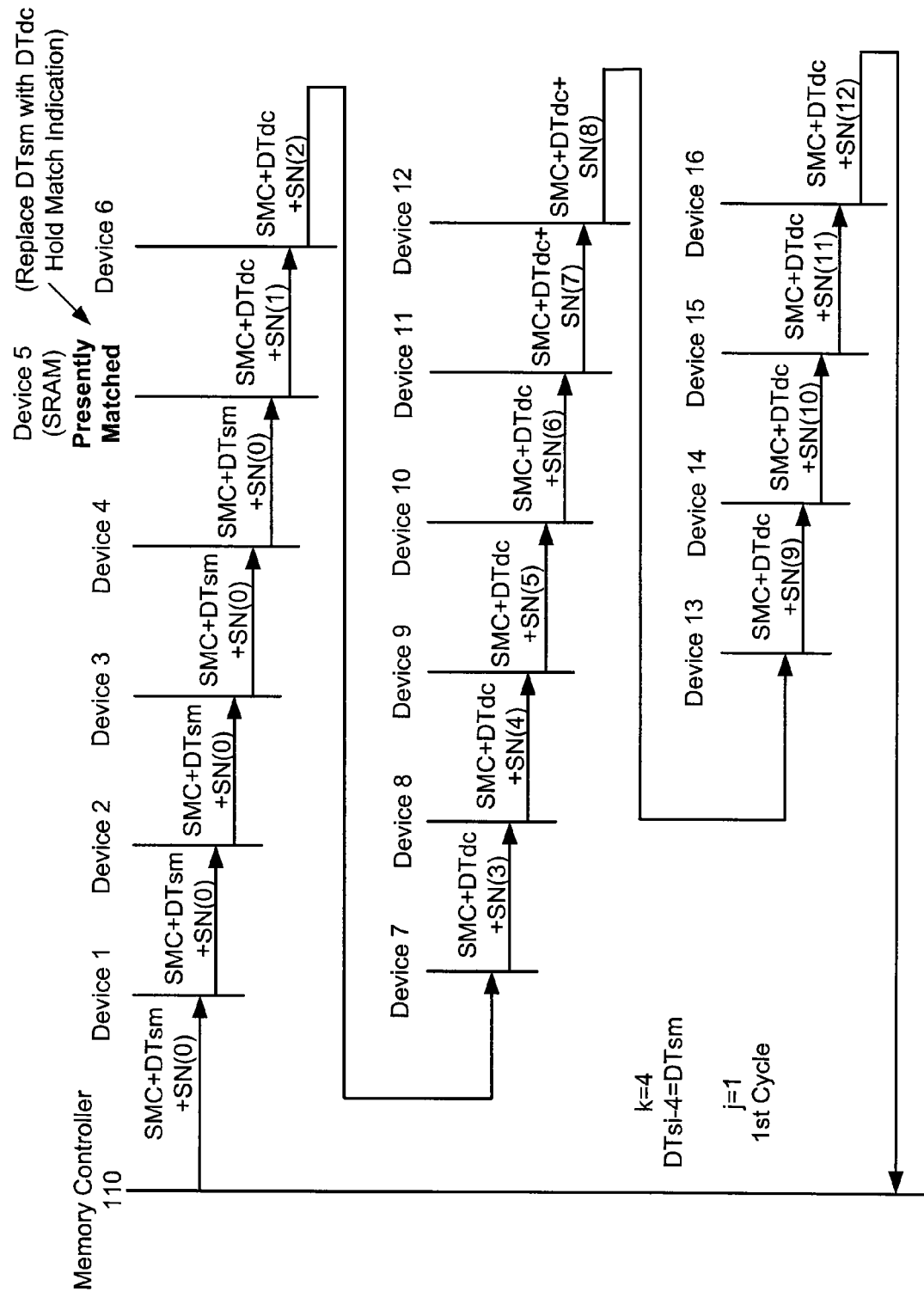
FIG. 18A is a schematic diagram illustrating a protocol conducted in the devices shown in FIG. 1, with a serial input device type DTsi of a SRAM device type DTsm and with a device type match of a first SRAM device being detected.

(1) First Search Cycle (j=1):

The memory controller 110 (the SI provider 133) sends the DTsi-4 of the DTsm to device 1 of the serial interconnection configuration, the DTsm being in a combination of the search operation command SMC and an initial search number SN(0). It is assumed that device 5 detects a "present match". Device 5 performs the operations of Path II. Devices 1-4 perform the operations of Path I. The other devices perform the operations of Path III. The SNo16 contains the propagated SN(12). From the value of "12", the memory controller 110 identifies device 5(=(16+1)−12) as a SRAM device. This is shown in FIG. 18A.

Figure 18B:
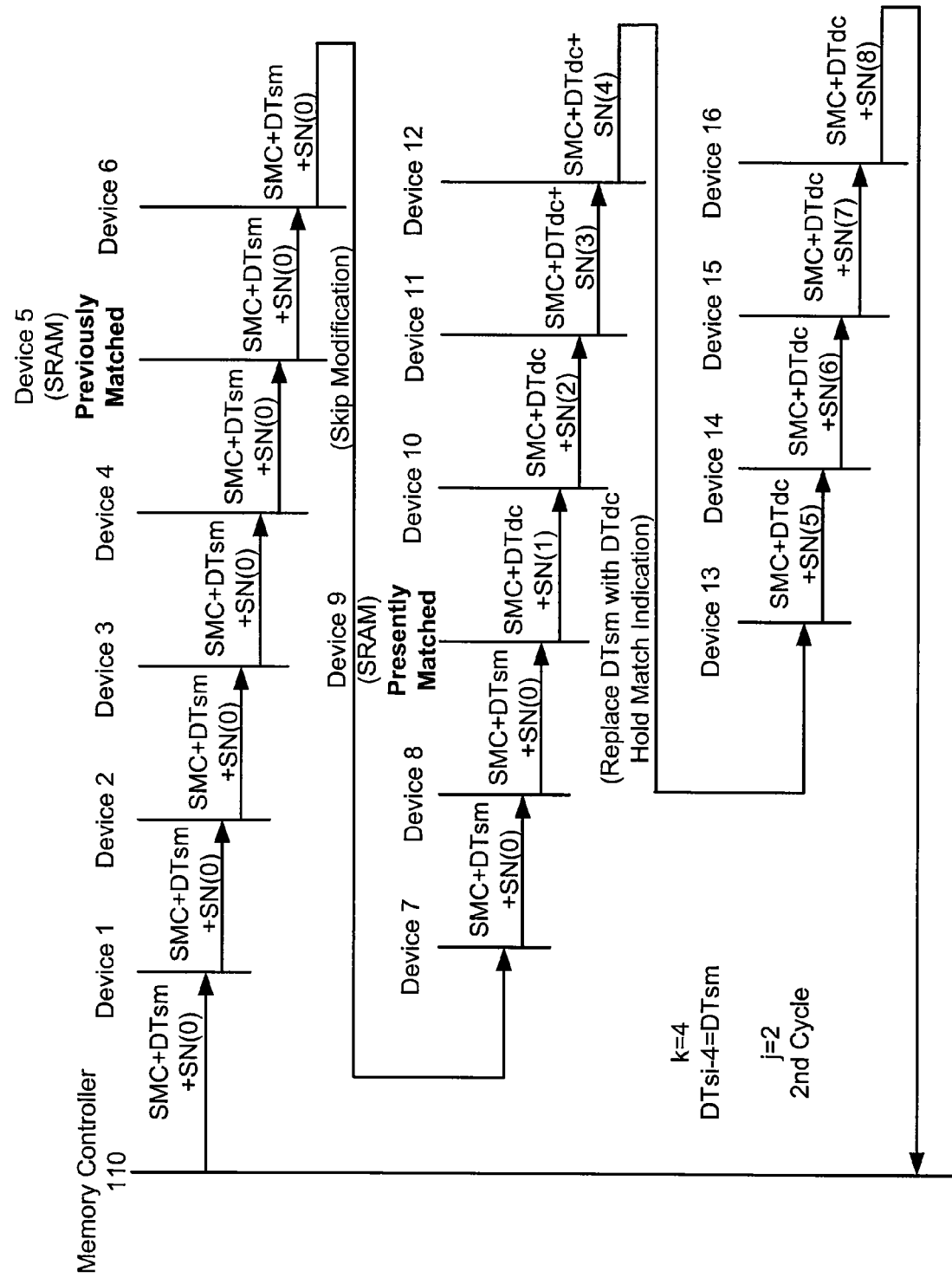
FIG. 18B is a schematic diagram illustrating a protocol conducted in the devices shown in FIG. 1, with a serial input device type DTsi of a SRAM device type DTsm and with a device type match of a second SRAM device being detected.

(2) Second Search Cycle (j=2):

The memory controller 110 again sends the DTsm as a search DTsi with an initial SN, SN(0), to device 1. The storage 324 of device 5 has a "previous match indication" stored therein in the first search cycle. Device 5 performs the operations of Path IV. It is assumed that device 9 detects a "present match". Device 9 performs the operations of Path II. Devices 1-4 and 6-8 perform the operations of Path I. Devices 10-16 perform the operations of Path III. The SNo16 contains the propagated SN(8). From the value of "8", the memory controller 110 identifies device 9(=(16+1)−8) as a SRAM device. This is shown in FIG. 18B.

Figure 18C:
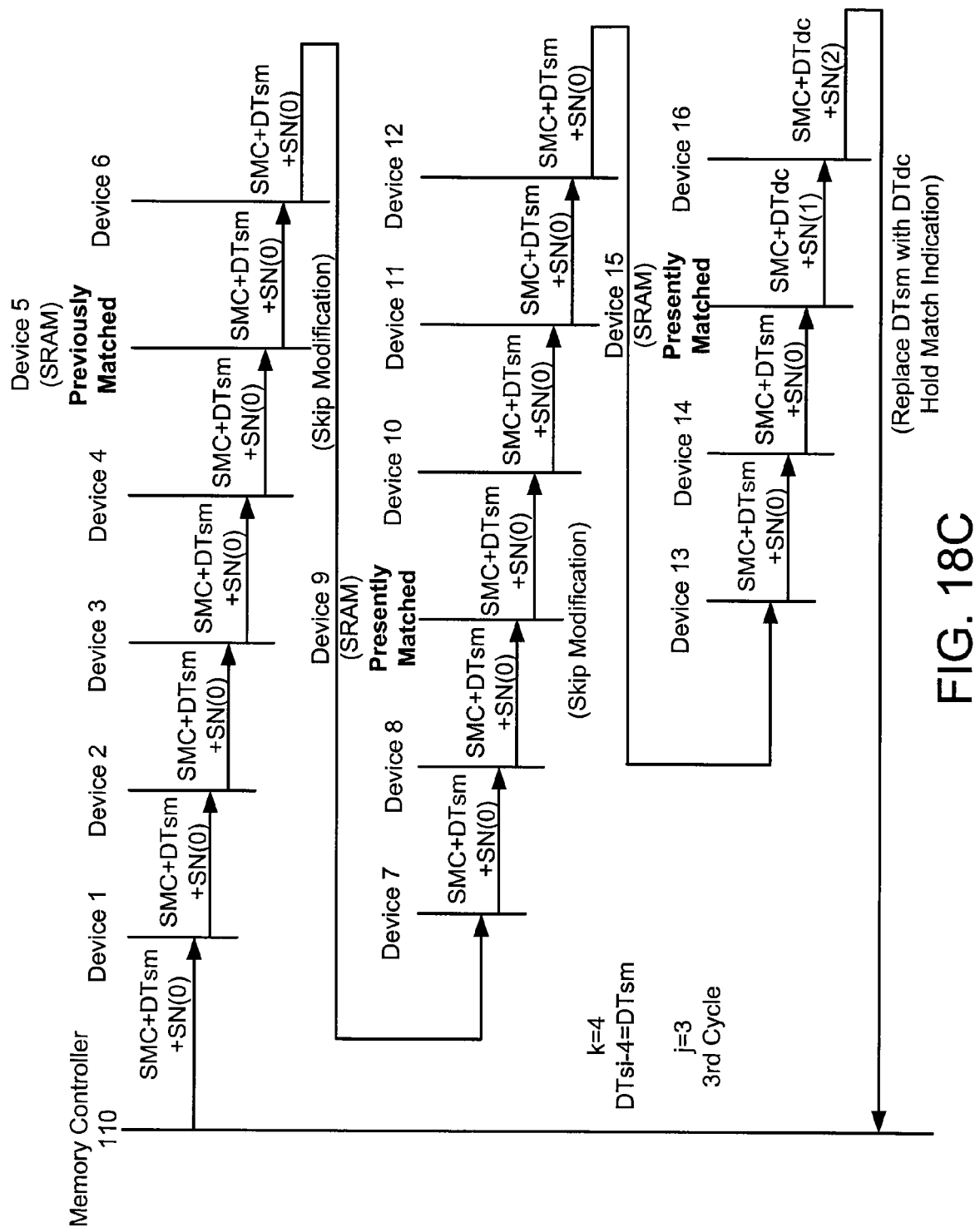
FIG. 18C is a schematic diagram illustrating a protocol conducted in the devices shown in FIG. 1, with a serial input device type DTsi of a SRAM device type DTsm and with a device type match of a third SRAM device being detected.

(3) Third Search Cycle (j=3):

The memory controller 110 again sends the DTsm as a search DTsi with an initial SN, SN(0), to device 1. The storages 324 of devices 5 and 9 store a "previous match indication" in the first and second search cycles, respectively. Devices 5 and 9 perform the operations of Path IV. It is assumed that device 15 detects a "present match". Device 15 performs the operations of Path II. Devices 1-4, 6-8 and 10-14 perform the operations of Path I. Device 16 performs the operations of Path III. The SNo16 contains the propagated SN(2). From the value of "2", the memory controller 110 identifies device 15(=(16+1)−2) as an SRAM device. This is shown in FIG. 18C.

Figure 18D:
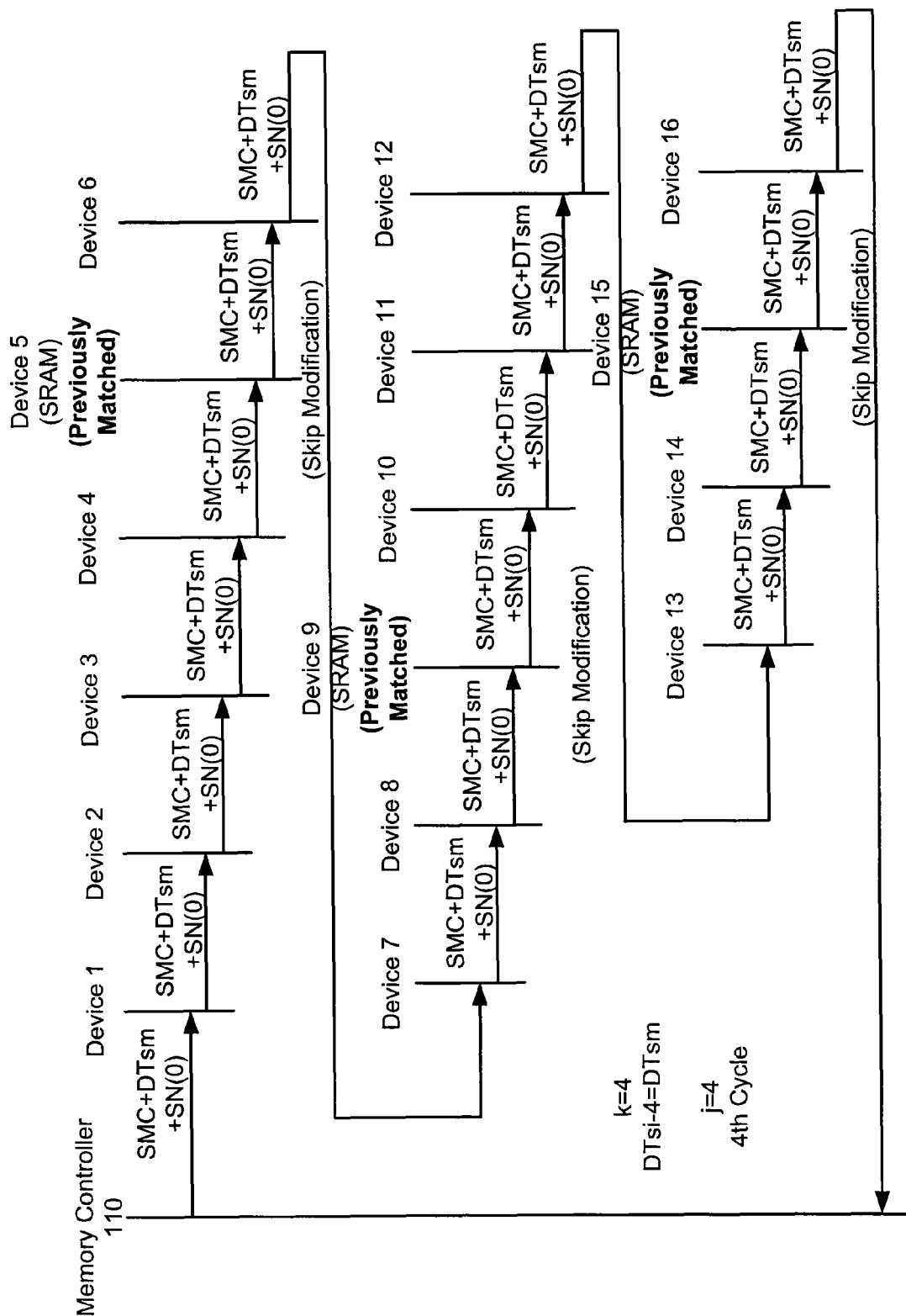
FIG. 18D is a schematic diagram illustrating a protocol conducted in the devices shown in FIG. 1, with a serial input device type DTsi of a SRAM device type DTsm and with no SRAM device being detected.

(4) Fourth Search Cycle (j=4):

The memory controller 110 again sends the DTsm as a search DTsi with an initial SN, SN(0), to device 1. The storages 324 of devices 5, 9 and 15 store a "previous match indication" in the first, second and third search cycles, respectively. Devices 5, 9 and 15 perform the operations of Path IV. It is assumed that none of the other devices detect a "present match". Devices 1-4, 6-8, 10-14 and 16 perform the operations of Path I. In this case, the modification operation is skipped. Therefore, the search number SN is propagated without being modified. The propagated SNo16 contains the SN(0). From the value of "0", the memory controller 110 recognizes that no more devices are required to be identified with reference to the DTsi-4 (DTsm). This is depicted in FIG. 18D. If another search is required (YES at step 535), the memory controller 110 changes the DTsi-k to another DTsi (step 536). Then, the modification operations are repeated.

Fifth Device Identification Operation (k=5)

Figure 19A:
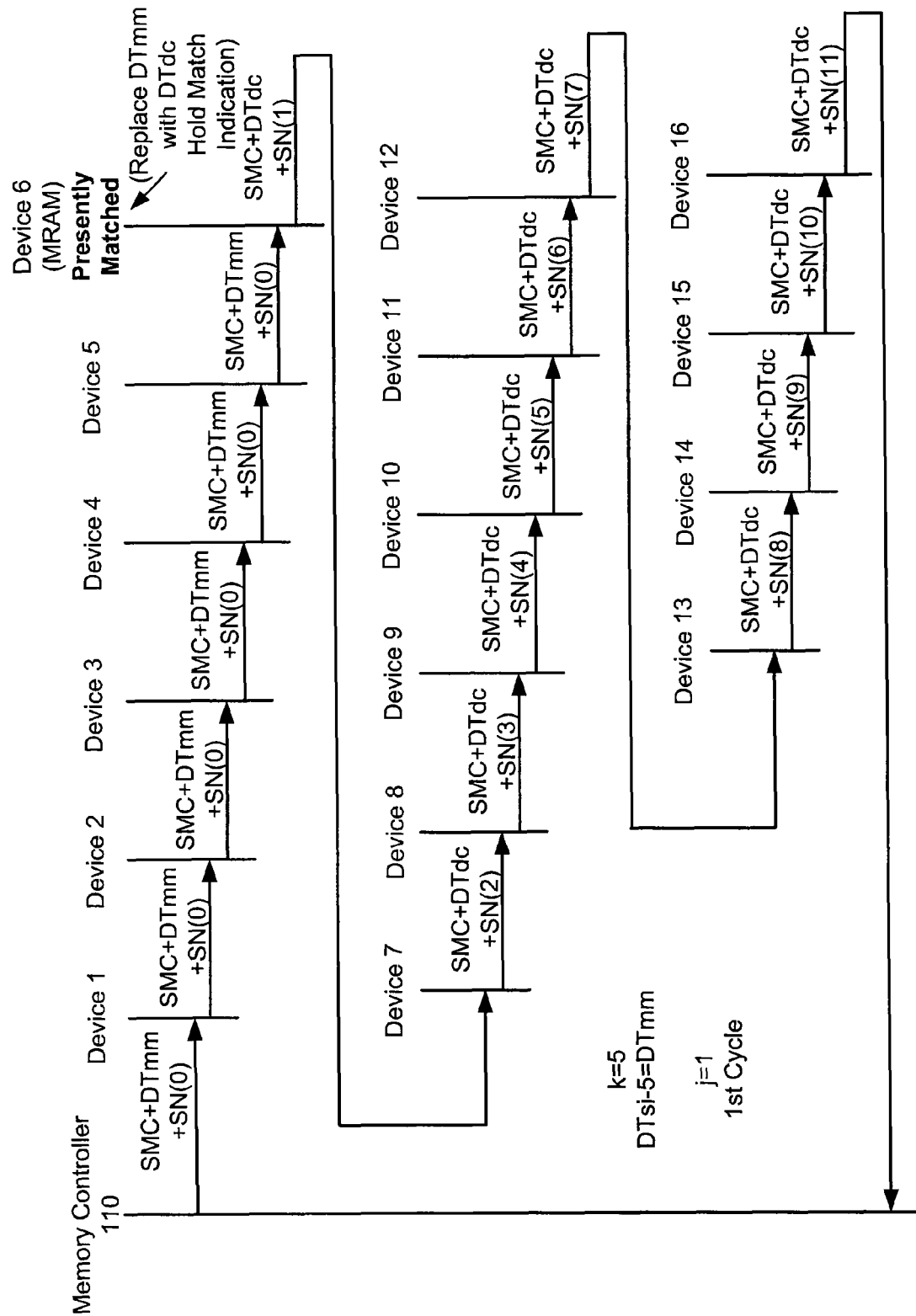
FIG. 19A is a schematic diagram illustrating a protocol conducted in the devices shown in FIG. 1, with a serial input device type DTsi of a MRAM device type DTmm and with a device type match of a first MRAM device being detected.
Figure 19B:
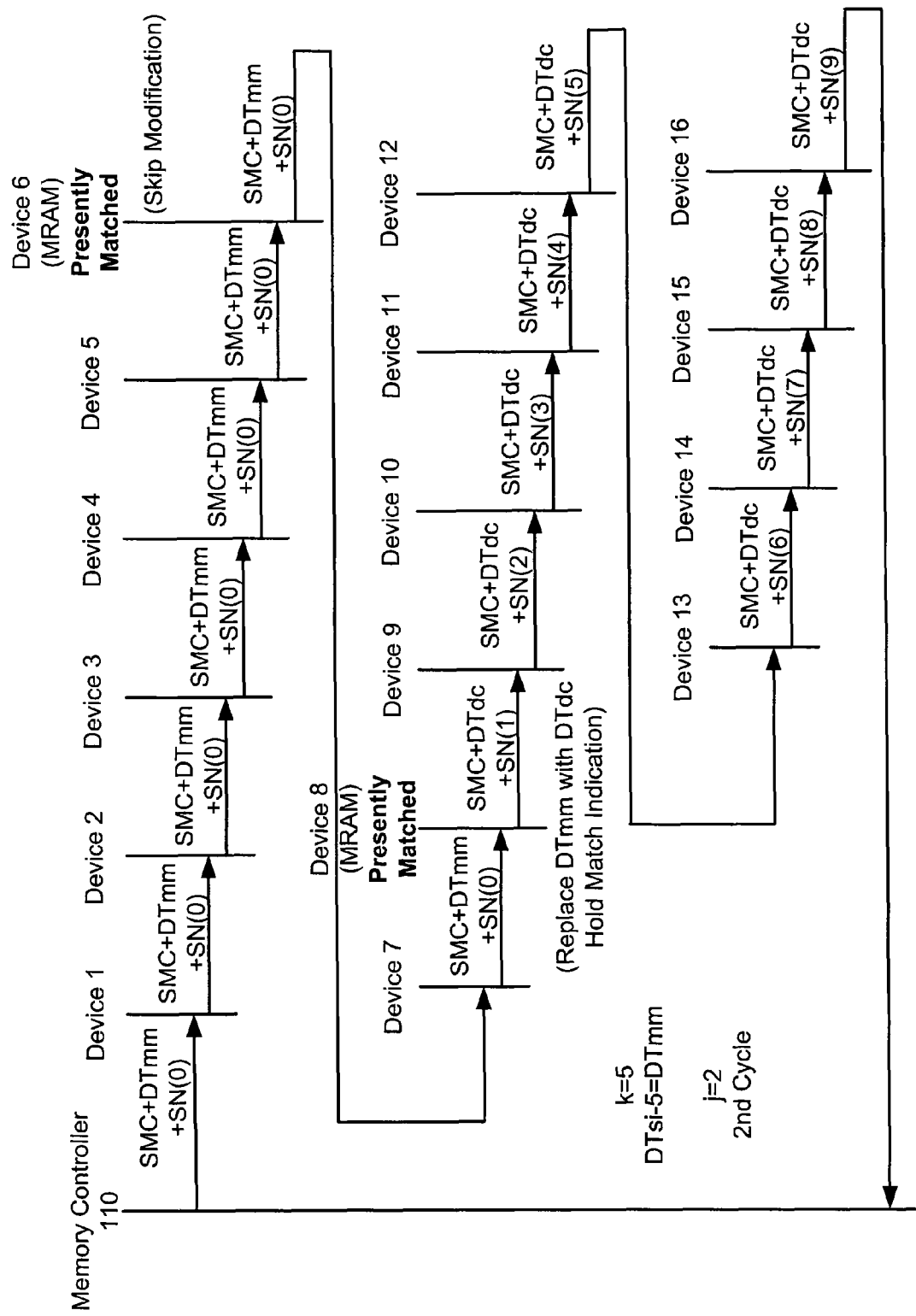
FIG. 19B is a schematic diagram illustrating a protocol conducted in the devices shown in FIG. 1, with a serial input device type DTsi of a MRAM device type DTmm and with a device type match of a second MRAM device being detected.
Figure 19C:
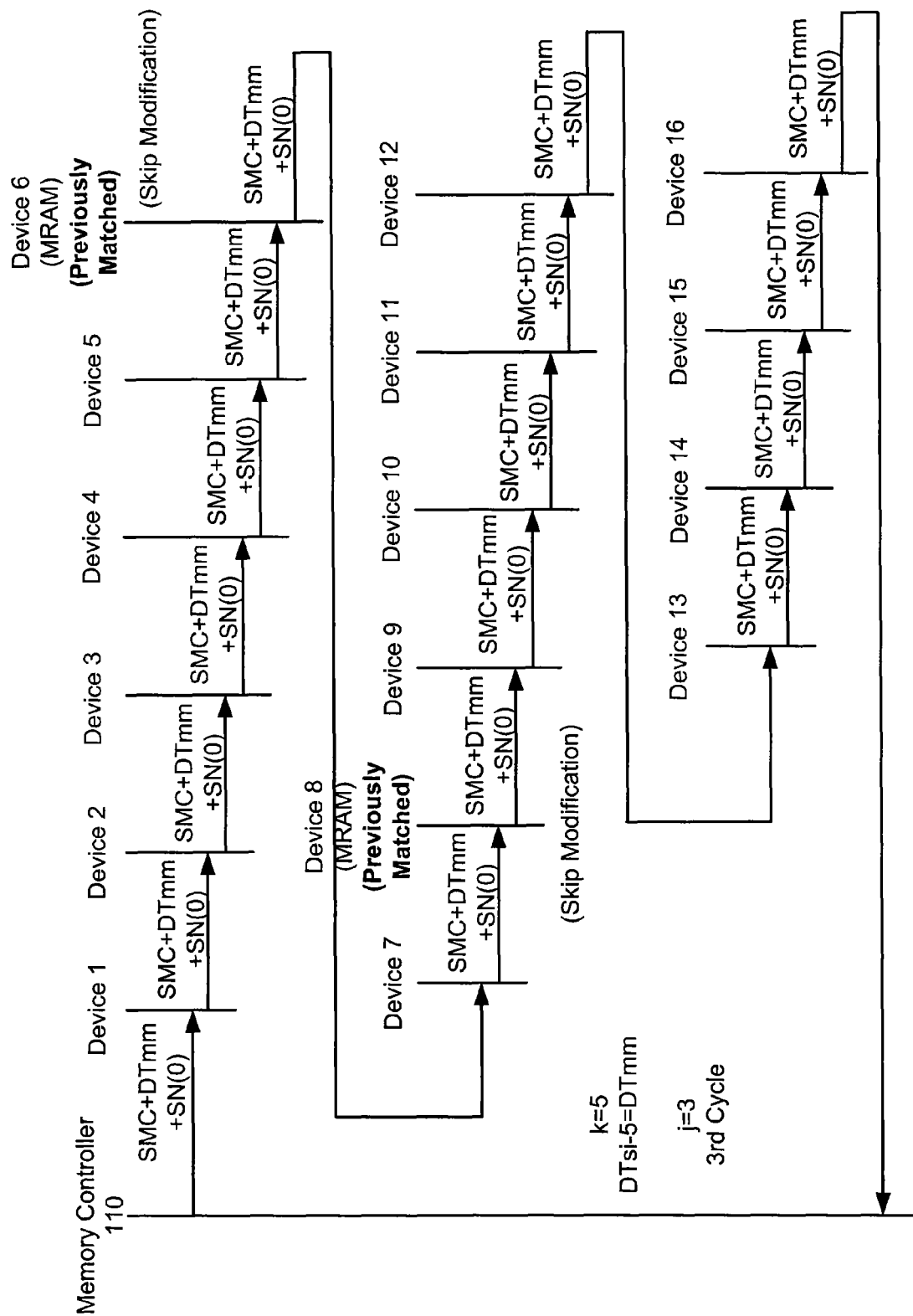
FIG. 19C is a schematic diagram illustrating a protocol conducted in the devices shown in FIG. 1, with a serial input device type DTsi of a MRAM device type DTmm and with no MRAM device being detected.

A fifth device identification operation will be described. A search reference device type DTsi-5 is the DTmm for MRAM devices. Each of FIGS. 19A-19C shows a protocol conducted in the devices shown in FIG. 1, with a serial input device type DTsi of an MRAM device type DTmm and a device type match of an MRAM device being detected.

Prior to the start of the match determination and modification operations, the storages 324 of the DT match determiners 320 of all devices are reset by the reset signal SRST to cancel the "previous match indications" in the previous search with reference to the DTsm (step 532). A fifth device identification operation will be described referring to FIGS. 1-14.

(1) First Search Cycle (j=1):

The memory controller 110 (the SI provider 133) sends the DTsi-5 of the DTmm to device 1 of the serial interconnection configuration, the DTmm being in a combination of the search operation command SMC and an initial search number SN(0). It is assumed that device 6 detects a "present match". Device 6 performs the operations of Path II. Devices 1-5 perform the operations of Path I. Devices 7-16 perform the operations of Path III. The SNo16 contains the propagated SN(11). From the value of "11", the memory controller 110 identifies device 6(=(16+1)−11) as an MRAM device. This is shown in FIG. 19A.

(2) Second Search Cycle (j=2):

The memory controller 110 again sends the DTmm as a search DTsi with an initial SN, SN(0), to device 1. The storage 324 of device 6 stores a "previous match indication" stored therein in the first search cycle. Device 6 performs the operations of Path IV. It is assumed that device 8 detects a "present match". Device 8 performs the operations of Path II. Devices 1-5 perform the operations of Path I. Devices 9-16 perform the operations of Path III. The SNo16 contains the propagated SN(9). From the value of "9", the memory controller 110 identifies device 8(=(16+1)−9) is an MRAM device. This is shown in FIG. 19B.

(3) Third Search Cycle (j=3):

The memory controller 110 again sends the DTmm as a search DTsi with an initial SN, SN(0), to device 1. The storages 324 of devices 6 and 8 store a "previous match indication" in the first and second search cycles, respectively. Devices 6 and 8 perform the operations of Path IV. It is assumed that none of devices detect a "present match". Devices 1-5, 7 and 9-16 perform the operations of Path I. In this case, the modification operation is skipped. Therefore, the search number SN is propagated without being modified. The propagated SNo16 contains the SN(0). From the value of "0", the memory controller 110 recognizes that no more devices are required to be identified with reference to the DTsi-5 (DTmm). This is depicted in FIG. 19C. If another search is required (YES at step 535), the memory controller 110 changes the DTsi-k to another DTsi (step 536). Then, the modification operation is repeated.

Sixth Device Identification Operation (k=6)

Figure 20A:
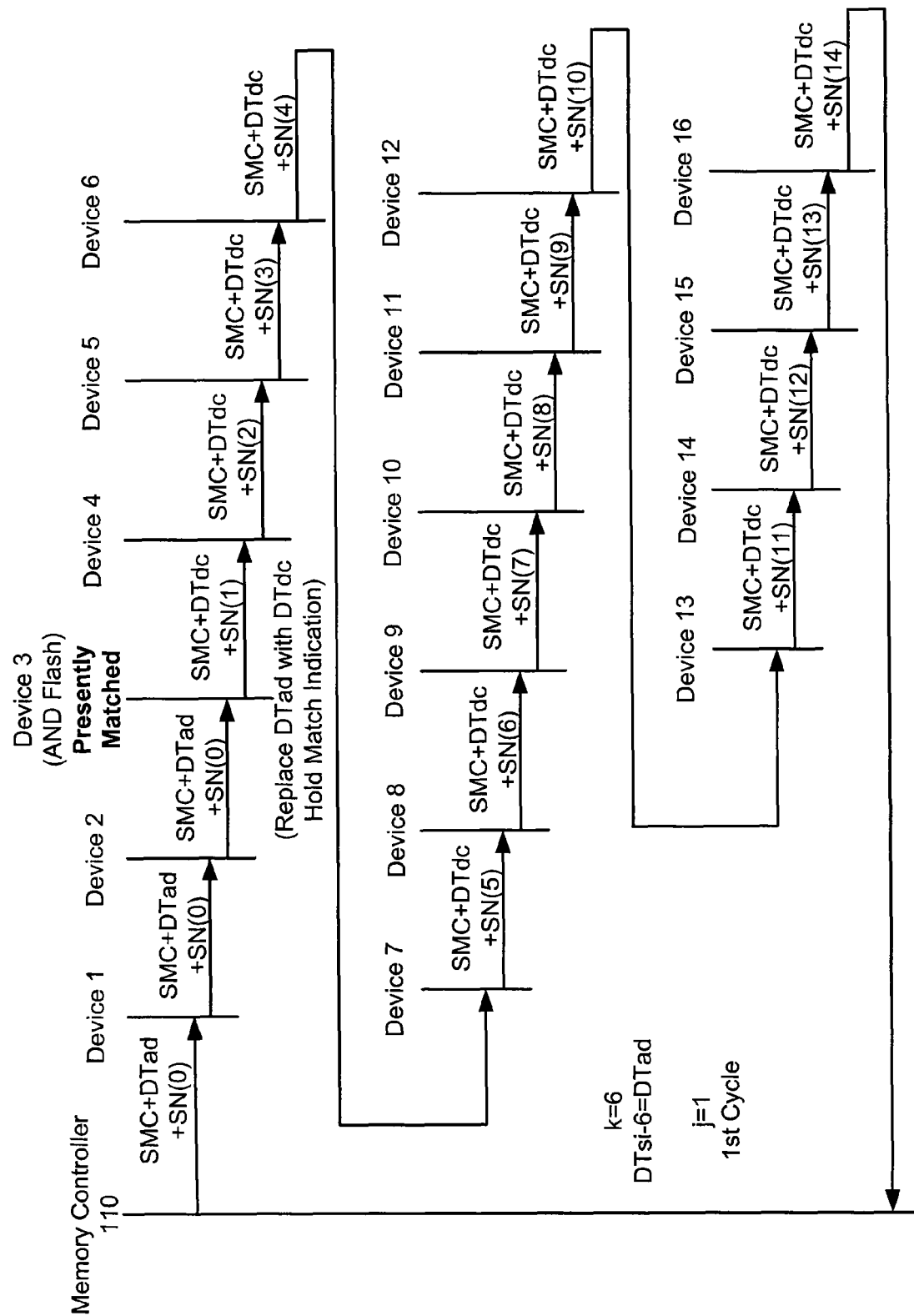
FIG. 20A is a schematic diagram illustrating a protocol conducted in the devices shown in FIG. 1, with a serial input device type DTsi of an AND Flash device type DTad and with a device type match of a first AND Flash device being detected.
Figure 20B:
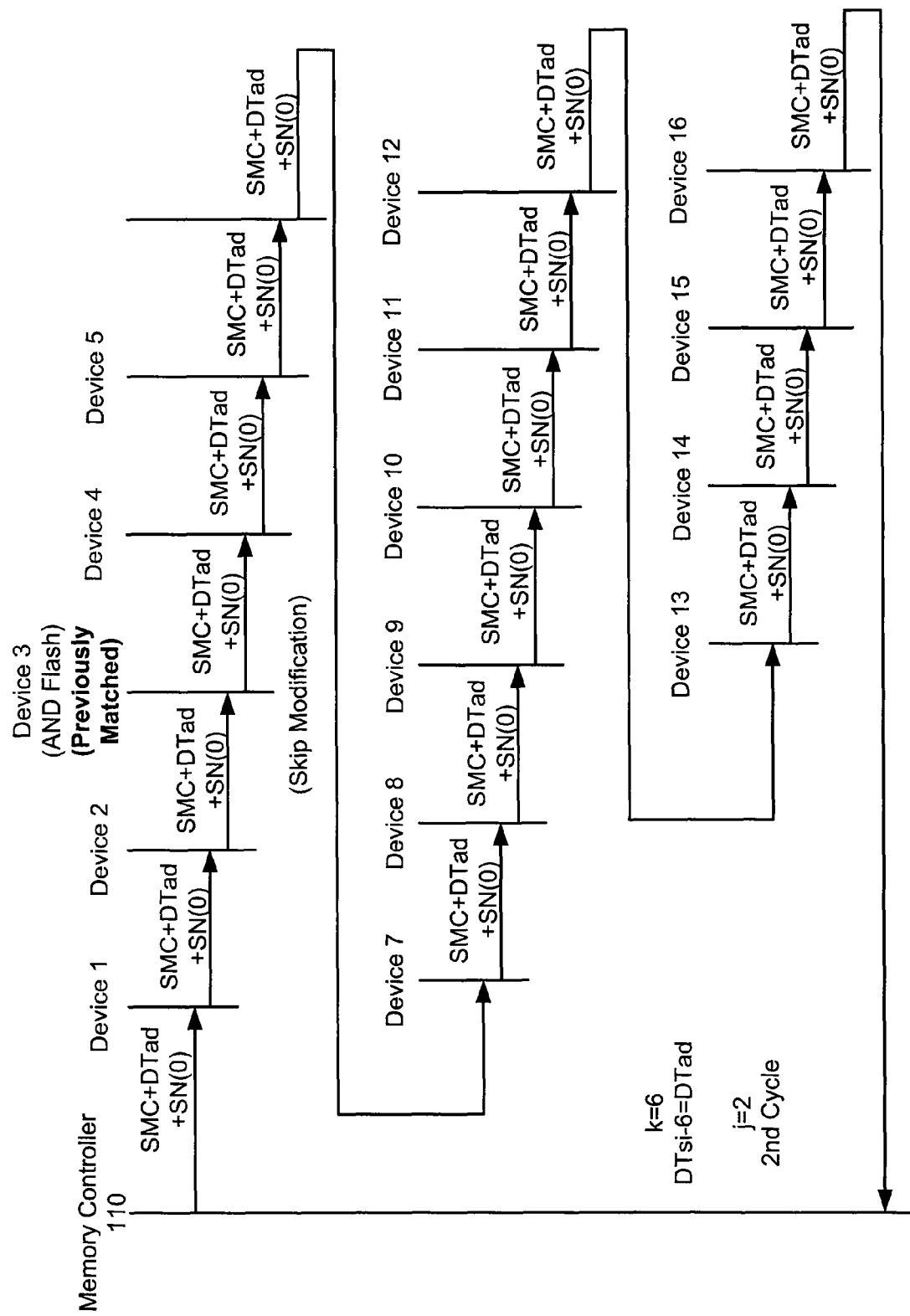
FIG. 20B is a schematic diagram illustrating a protocol conducted in the devices shown in FIG. 1, with a serial input device type DTsi of an AND Flash device type DTad and with no AND Flash device being detected.

A sixth device identification operation will be described. A search reference device type DTsi-6 is the DTad for AND Flash devices. Each of FIGS. 20A-20B shows a protocol conducted in the devices shown in FIG. 1, with a serial input device type DTsi of an AND Flash device type DTad and a device type match an AND Flash device being detected.

Prior to the start of the match determination and modification operations, the storages 324 of the DT match determiners 320 of all devices are reset by the reset signal SRST to cancel the "previous match indications" in the first search with reference to the DTmm (step 532). A sixth device identification operation will be described referring to FIGS. 1-14.

(1) First Search Cycle (j=1):

The memory controller 110 (the SI provider 133) sends the DTsi-6 of the DTad to device 1 of the serial interconnection configuration, the DTad being in a combination of the search operation command SMC and an initial search number SN(0). It is assumed that device 3 detects a "present match". Device 3 performs the operations of Path II. Devices 1-2 perform the operations of Path I. Devices 4-16 perform the operations of Path II. The SNo16 contains the propagated SN(14). From the value of "14", the memory controller 110 identifies device 3(=(16+1)−14) as an AND Flash device. This is shown in FIG. 20A.

(2) Second Search Cycle (j=2):

The memory controller 110 again sends the DTad as a search DTsi with an initial SN, SN(0), to device 1. The storage 324 of device 3 has a "previous match indication" stored therein in the first search cycle. Device 3 performs the operations of Path IV. It is assumed that none of devices detect a "present match". Devices 1-2 and 4-16 perform the operations of Path I. In this case, the modification operation is skipped. Therefore, the search number SN is propagated without being modified. The propagated SNo16 contains the SN(0). From the value of "0", the memory controller 110 recognizes that no more devices are required to be identified with reference to the DTsi-6 (DTad). This is depicted in FIG. 20B. If another search is required (YES at step 535), the memory controller 110 changes the DTsi-k to another DTsi (step 536). Then, the modification operations are repeated.

Figure 21:
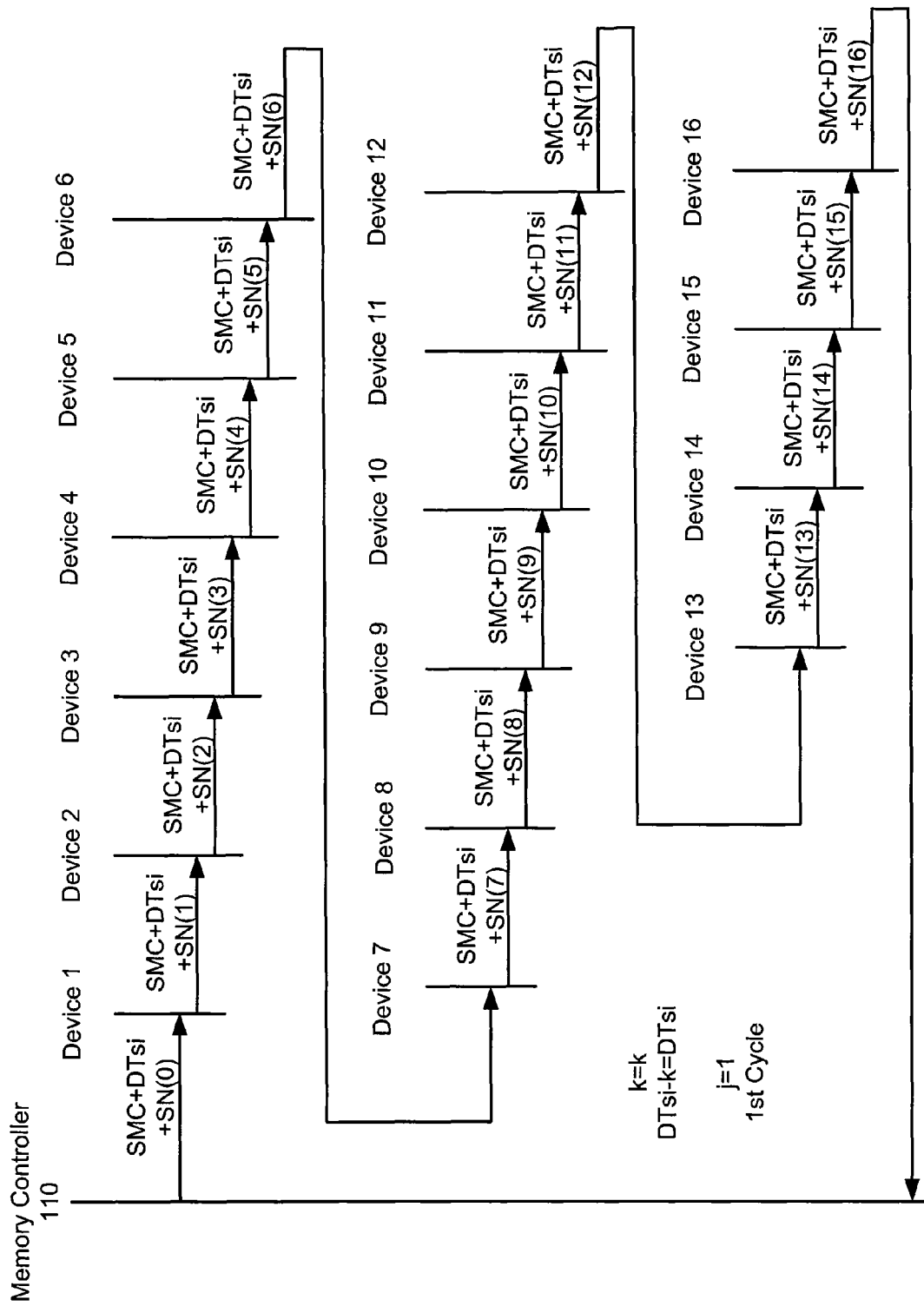
FIG. 21 is a block diagram illustrating the memory system including a plurality of memory devices in a serial interconnection configuration as shown in FIG. 1, here, no devices match a serial input device type DTsi.

If a serial input device type DTsi sent by the memory controller 110 does not match any of the memory devices in a serial interconnection configuration as shown in FIG. 1, the propagated SNo16 will contain an initial search number SN(0), as shown in FIG. 21. In this case, all devices perform the operations of Path I and skip the modification operations.

During the device identifying operations as described above, the data fed by the data compiler 137 is stored in the memory 139 of the memory controller 110. Table 2 shows compiled data.

TABLE 2

| k | DTsi-k | Search Cycle (j-th) | Number of SNo16 | Number Identification by: (Ndv + 1) − SNo16 | Identified Device Type of Device (DV) |
|---|--------|---------------------|-----------------|---------------------------------------------|---------------------------------------|
| 1 | DTnd   | 1st | SN(16) | 1    | DV1: NAND Flash Device |
|   |        | 2nd | SN(10) | 7    | DV7: NAND Flash Device |
|   |        | 3rd | SN(6)  | 11   | DV11: NAND Flash Device |
|   |        | 4th | SN(1)  | 16   | DV16: NAND Flash Device |
|   |        | 5th | SN(0)  | N/A* | N/A** |
| 2 | DTnr   | 1st | SN(15) | 2    | DV2: NOR Flash Device |
|   |        | 2nd | SN(7)  | 10   | DV10: NOR Flash Device |
|   |        | 3rd | SN(4)  | 13   | DV13: NOR Flash Device |
|   |        | 4th | SN(0)  | N/A* | N/A** |

TABLE 2-continued

| k | DTsi-k | Search Cycle (j-th) | Number of SNo16 | Number Identification by: (Ndv + 1) − SNo16 | Identified Device Type of Device (DV) |
|---|--------|---------------------|-----------------|---------------------------------------------|---------------------------------------|
| 3 | DTdm   | 1st | SN(13) | 4 | DV4: DRAM Device |
|   |        | 2nd | SN(5)  | 12 | DV12: DRAM Device |
|   |        | 3rd | SN(3)  | 14 | DV14: DRAM Device |
|   |        | 4th | SN(0)  | N/A* | N/A** |
| 4 | DTsm   | 1st | SN(12) | 5 | DV5: SRAM Device |
|   |        | 2nd | SN(8)  | 9 | DV9: SRAM Device |
|   |        | 3rd | SN(2)  | 15 | DV15: SRAM Device |
|   |        | 4th | SN(0)  | N/A* | N/A** |
| 5 | DTmm   | 1st | SN(11) | 6 | DV6: MRAM Device |
|   |        | 2nd | SN(9)  | 8 | DV8: MRAM Device |
|   |        | 3rd | SN(0)  | N/A* | N/A** |
| 6 | DTad   | 1st | SN(14) | 3 | DV3: AND Flash Device |
|   |        | 2nd | SN(0)  | N/A* | N/A** |
| — | —      | —   | —      | —    | —     |
| — | —      | —   | —      | —    | —     |
| — | —      | —   | —      | —    | —     |
| M | —      | —   | —      | —    | —     |
|   | —      | —   | —      | —    | —     |

In Table 2, N/A* indicates that search cycles of that device identification process end. N/A** indicates that there is no data.

Upon completion of the M-th device identification process, no more device identification is required (NO at step 535), the data compiler 137 of the memory controller 110 re-compiles the data stored in the memory 139 and re-stores the re-compiled data therein.

Figure 22:
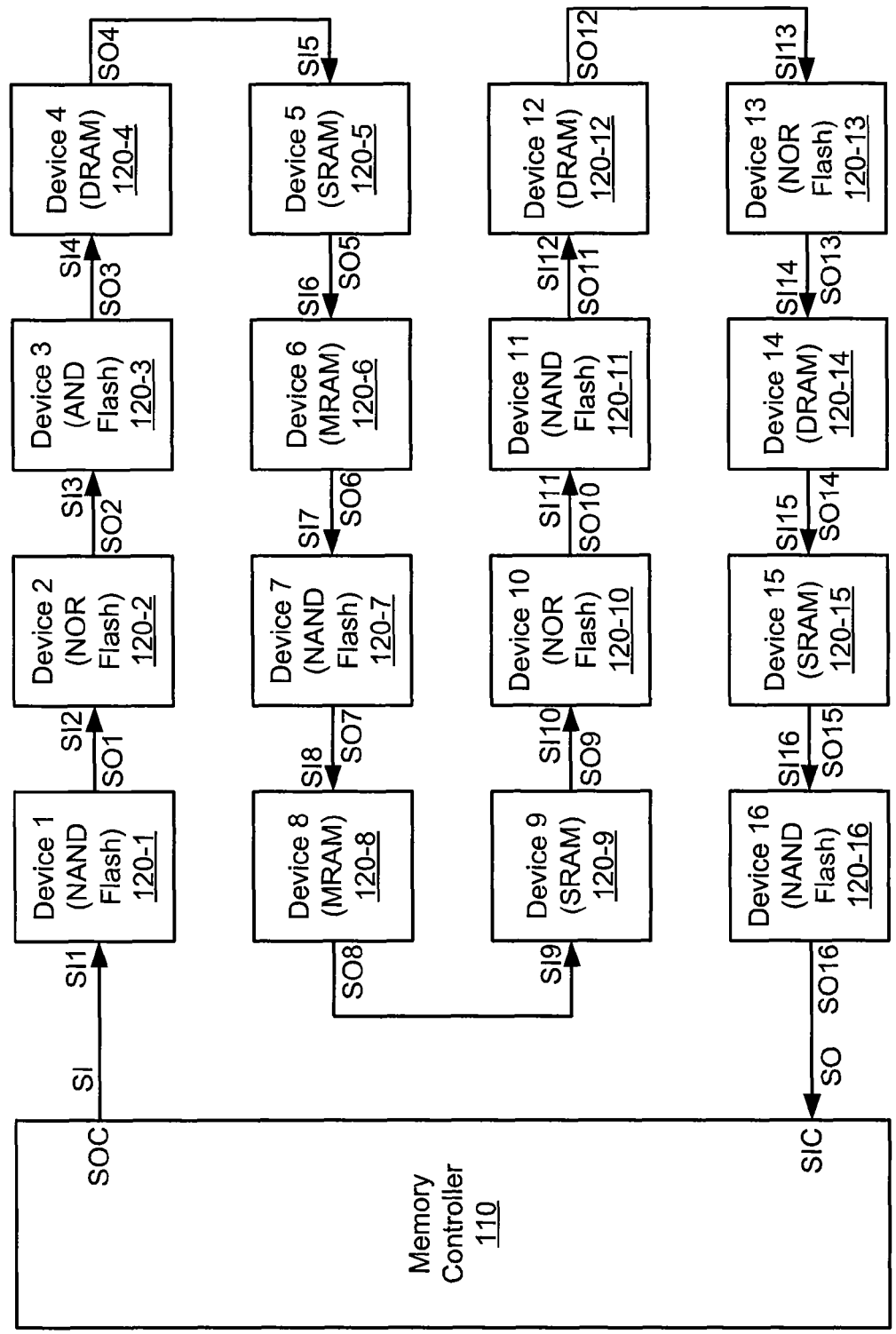
FIG. 22 is a block diagram illustrating the memory system including a plurality of memory devices in a serial interconnection configuration as shown in FIG. 1, after the device types of the devices are identified.

In the examples, as identified by the methods described above, the device types in the serial interconnection configuration are mixed. The identified types of devices are shown in FIG. 22. Re-compiled data regarding the device numbers (device addresses) and identified devices are shown in Table 3.

TABLE 3

| Device Number (Device Address) | Device Type of Identified Type |
|--------------------------------|--------------------------------|
| 1 | NAND Flash Device |
| 2 | NOR Flash Device |
| 3 | AND Flash Device |
| 4 | DRAM Device |
| 5 | SRAM Device |
| 6 | MRAM Device |
| 7 | NAND Flash Device |
| 8 | MRAM Device |
| 9 | SRAM Device |
| 10 | NOR Flash Device |
| 11 | NAND Flash Device |
| 12 | DRAM Device |
| 13 | NOR Flash Device |
| 14 | DRAM Device |
| 15 | SRAM Device |
| 16 | NAND Flash Device |

Upon completion of the device identification process, the memory 139 stores the above data, the memory controller 110 becomes aware of the device types of the memory devices in the serial interconnection configuration. Referring to the device addresses and their device types, the memory controller 110 can address intended devices for data processing in a normal mode.

Figure 23:
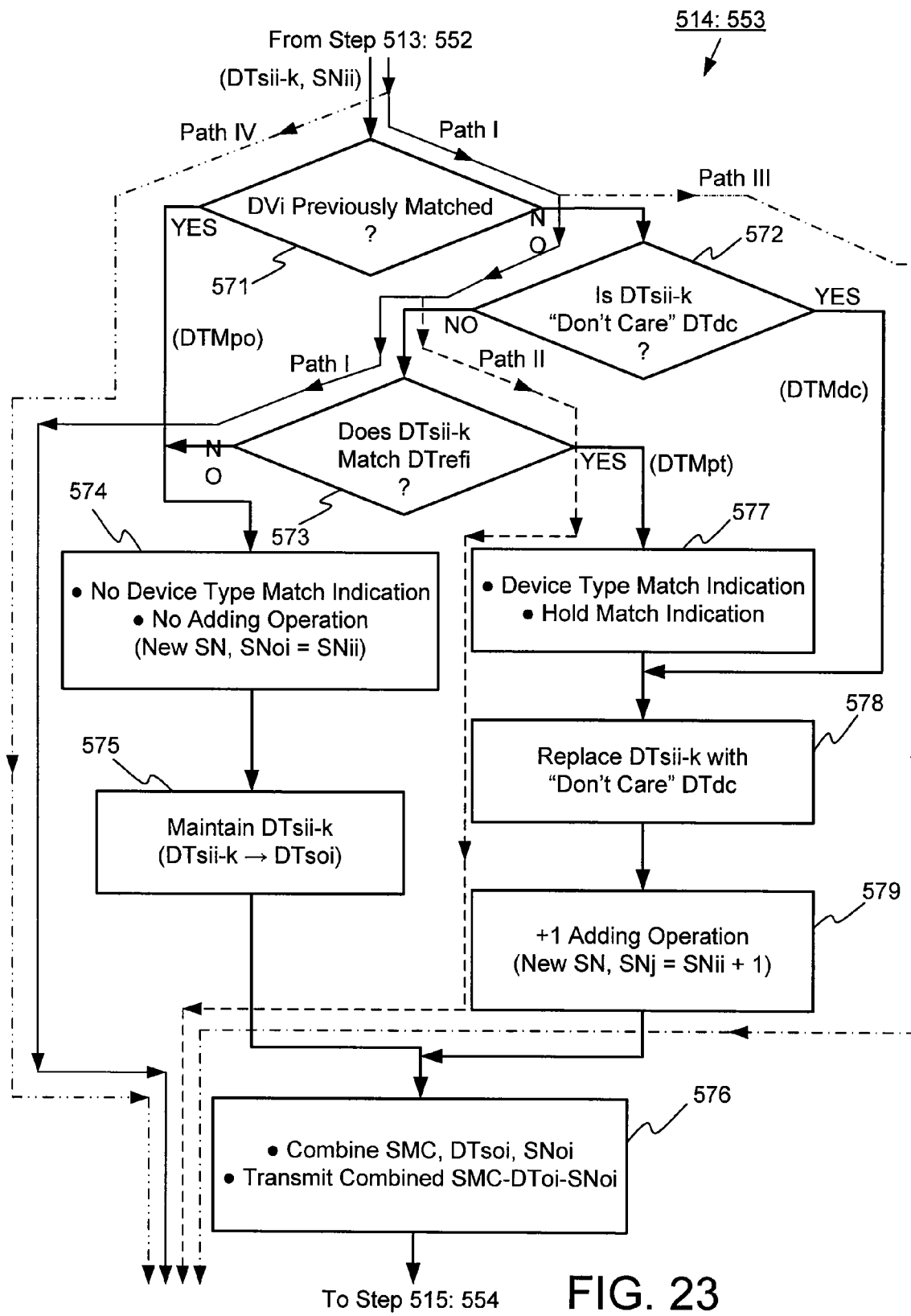
FIG. 23 is a flow chart illustrating another example of a method for performing DT match determination and modification shown in FIGS. 9 and 11.

FIG. 23 shows another example of a method for performing DT match determination and modification shown in FIGS. 9 and 11. The method shown in FIG. 23 is similar to that of FIG. 12. A difference is that the method of FIG. 23 has no step 580 and instead, the input DTsii is always replaced with the "don't care" code DTdc at step 578 when the "don't care" DT match indication DTMdc is enabled (YES at step 572). In Path III, the input DTsii is the DTdc and thus, a combined SMC-DTsoi-SNoi at step 576 is the same as that of the method shown in FIG. 12. The DT modification provider 344 shown in FIG. 7 is required to be changed to achieve such a modification logic function. It is required to enable the DT modifying indication MFdt when an enabled present DT match indication DTMpt or an enabled "don't care" DT match indication DTMdc is input thereto, with the result that the selector 332 of the DT output provider 330 (of FIG. 6) selects the "don't care" code DTdc.

Figure 24:
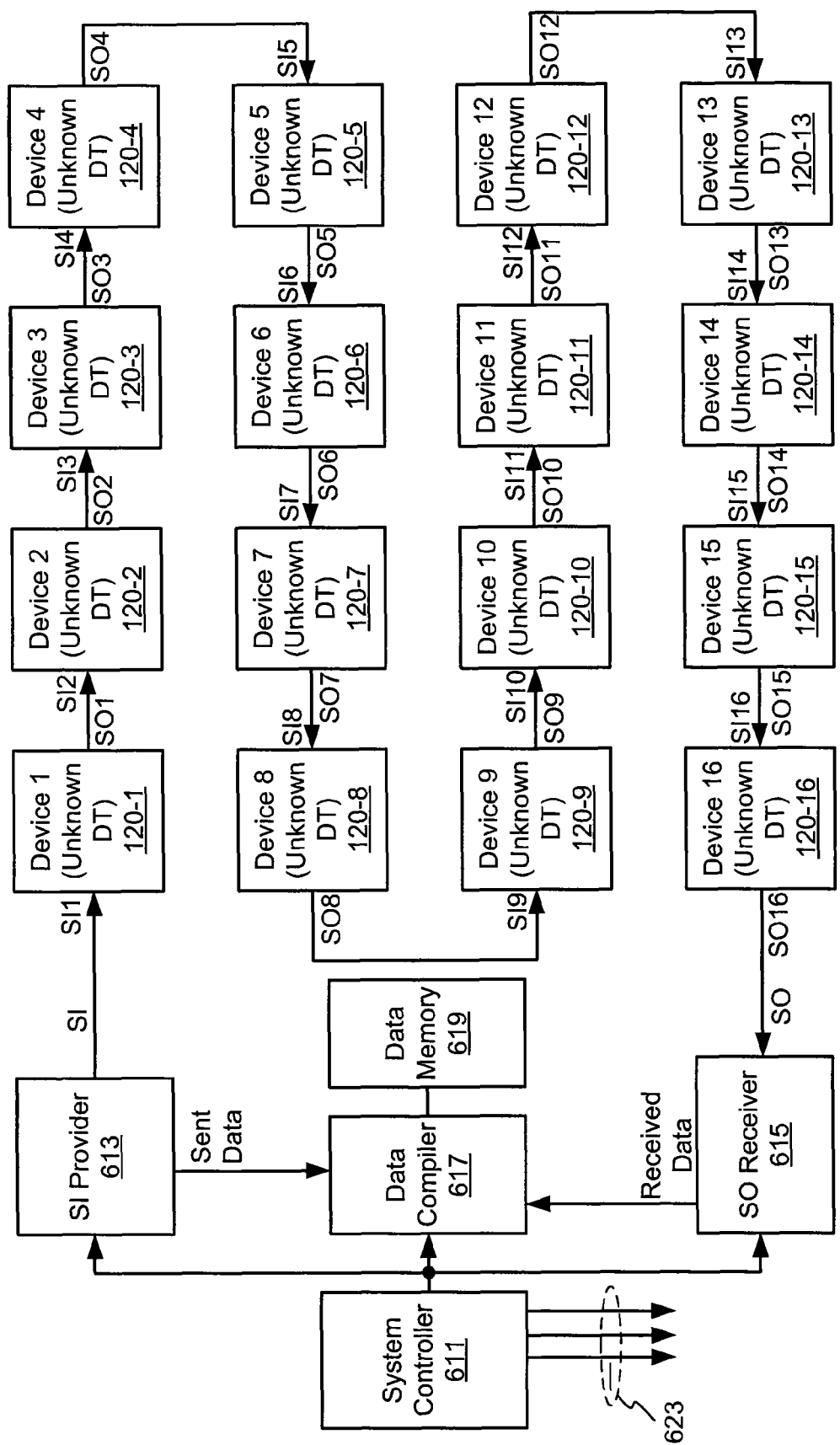
FIG. 24 is a block diagram illustrating another example of a memory system including a plurality of memory devices in a serial interconnection configuration to which embodiments of the present invention are applied.

FIG. 24 shows another example of a memory system including a plurality of memory devices in a serial interconnection configuration to which embodiments of the present invention are applied. Referring to FIG. 24, a single memory controller is not used and instead, each function of the memory controller is assigned to an individual part. A system controller 611 controls an SI provider 613, an SO receiver 615 and a data compiler 617. A data memory 619 stores data provided by the data compiler before and after compiled. The functions of each part are similar to the corresponding part of the memory controller 110 shown in FIG. 1. The system controller 611 provides a group of signals 623 containing a clock signal and others to the devices.

The above-described embodiments may operate with either of a single data rate (SDR) interface or a double data rate (DDR) interface.

In accordance with an embodiment of the present invention, there is provided a machine-readable medium storing commands and instructions which, when executed, cause a processor to perform any one of the methods described above.

FIG. 25A shows a machine-readable medium storing commands and instructions that can be used for the devices 120-1-120-16 of FIG. 1. Referring to FIGS. 1, 4 and 25A, a computer-readable medium 711 (e.g., a non-volatile memory) containing instruction codes 712 is provided to a reader 713 which in turn reads the instruction codes 712. The read codes are provided to a memory 714 and stored therein. If the memory 714 is included in the device 120-i, its device controller 230-i can process the codes stored in the memory 714 and perform the functions defined by the instruction codes 712. In a case where the instruction codes 712 define the methods of the DT match determination and the SN and DT modifications described earlier, the device controller 230-*i* performs to execute the methods.

FIG. 25B shows a machine-readable medium storing commands and instructions that can be used for the memory controller 110 of FIG. 1. Referring to FIGS. 1, 3 and 25B, a computer-readable medium 721 (e.g., a non-volatile memory) containing instruction codes 722 is provided to a reader 723. The reader 723 reads the instruction codes 722 and the read codes are provided to a memory 724 and stored therein. If the memory 724 is included in the memory controller 110, its operation controller 131 can process the codes stored in the memory 724 and perform the functions defined by the instruction codes 722. In a case where the instruction codes 722 contained in the computer-readable medium 721 defines the method of providing the SMC, DTs and SNs through the SI provider 133 and of receiving the SMC, DTs and SNs through the SO receiver 135 described earlier, the operation controller 131 performs to execute the methods. The instruction codes 722 contained in the computer readable medium 721 can be provided and executed by the system controller 611 shown in FIG. 24.

In the embodiments described above, the device elements are connected to each other as shown in the figures, for the sake of simplicity. In practical applications of the present invention to an apparatus, devices, elements, circuits, etc. may be connected directly to each other. As well, devices, elements, circuits etc. may be connected indirectly to each other through other devices, elements, circuits, etc., necessary for operation of the apparatus. Thus, in actual configuration, the circuit elements and devices are directly or indirectly coupled with, or connected to, each other.

The embodiments described above are directed to systems including memory devices. The technique described above can be applied to systems including other semiconductor devices, such as, for example, data processing devices, which are distinguishable in accordance with predetermined data or information on their characteristics or types. Such systems can be included by electronic equipment or products.

It will be apparent to those of ordinary skill in the art that the search number modifiers or producers, the controllers, the processors and the other device elements and the memory controllers may be provided by hardware or software.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A system comprising:
a signal provider for providing an initial serial input signal including a search device type and a search number;
a signal receiver for receiving a final serial output signal containing a device type determination result; and
a serial interconnection configuration of first to N-th semiconductor memory devices, N being an integer greater than one, each of the semiconductor memory devices having a semiconductor memory associated therewith, and a device type, the device type being related to the semiconductor memory;
each i-th semiconductor memory device of the first to N-th semiconductor memory devices, where i is one to N, being configured to receive the initial serial input signal or a serial input signal from a previous semiconductor memory device, each i-th semiconductor memory device of the first to N-th semiconductor memory devices being configured to provide a serial output signal including an intermediate search device type and an intermediate search number as the serial input signal for the (i+1)-th semiconductor memory device except for the i=N-th semiconductor memory device for providing the final serial output signal, each i-th semiconductor memory device including
a device type determiner for comparing the device type of the i-th semiconductor memory device to the search device type or the intermediate search device type, to provide a device type determination,
a number modifier for modifying the search number or the intermediate search number in response to the device type determination to provide an output search number with or without being modified to the (i+1)-th semiconductor memory device or the signal receiver,
a device type modifier for modifying the search device type or the intermediate search device type to an other device type in response to the device type determination to provide an output search device type with or without being modified to the (i+1)-th semiconductor memory device or the signal receiver, the output search number and the output search device type corresponding to the serial output signal or the final serial output signal.

2. The system of claim 1, wherein each of the first to N-th semiconductor memory devices have unidentified device types, the device types of the first to N-th semiconductor memory devices in the serial interconnection configuration being either identical or mixed.

3. The system of claim 1, wherein each i-th semiconductor memory device comprises:
a serial input connection and a serial output connection, the serial input connection of each i-th semiconductor memory device is coupled to the serial output connection of an (i−1)-th semiconductor memory device or the signal provider, the serial output connection of each i-th semiconductor memory device being coupled to the serial input connection of the (i+1)-th semiconductor memory device or the signal receiver.

4. The system of claim 1, wherein the device type modifier comprises:
a device type replacer for replacing the search device type or the intermediate search device type with a pre-defined device type that matches any one of the device types, as the output search device type.

5. The system of claim 1, wherein each i-th semiconductor memory device further comprises:
an information combiner for combining the output search number and the output search device type.

6. The system of claim 1, wherein the first to N-th semiconductor memory devices in the serial interconnection configuration are any one of random access memories and Flash memories.

7. A method for identifying a device type of a semiconductor memory device in a serial interconnection configuration of first to N-th semiconductor memory devices, N being an integer greater than one, each semiconductor memory device having a semiconductor memory associated therewith and a device type as a reference device type for being determined, the device type being based on the semiconductor memory, the method comprising:
sending a serial input signal including a search device type and a search number to an i-th semiconductor memory device of the first to N-th semiconductor memory devices, where i can be 1 to N;
determining the device type at the i-th semiconductor memory device by comparing the device type of the i-th semiconductor memory device to the search device type, and providing a device type determination result from the comparison;

modifying the search number in response to the device type determination result, to provide an output search number with or without being modified to the (i+1)-th semiconductor memory device;

modifying the search device type to an other device type in response to the device type determination result, to provide an output search device type with or without being modified to the (i+1)-th semiconductor memory device, the output search number and the output search device type being provided in a serial output signal; and receiving the serial output signal from the i=N-th semiconductor memory device.

8. The method of claim 7, wherein each of the first to N-th semiconductor memory devices have identical device types or mixed device types in the serial interconnection configuration that are unidentified.

9. The method of claim 7, wherein the step of modifying the search device type comprises:
replacing the search device type with a pre-defined device type that matches any device type, as the output search device type.

10. The method of claim 7, further comprising:
combining the output search number and the output search device type; and
outputting the combined output search number and output search device type.

11. The method of claim 10, wherein the step of outputting comprises:
transmitting the combined output search number and output search device type to the (i+1)-th semiconductor memory device.

12. The method of claim 10, wherein the step of transmitting the combined output search number and output search device type comprises:
transmitting the combined output search number and output search device type from the N-th semiconductor memory device in the serial interconnection configuration.

13. The method of claim 12, wherein the step of receiving comprises:
receiving the serial output signal from the N-th semiconductor memory device in the serial interconnection configuration, the received serial output signal containing the combined output search number and output search device type.

14. The method of claim 13, further comprising:
recognizing an address of the i-th semiconductor memory device in the serial interconnection configuration in response to the output search number of the serial output signal.

15. The method of claim 7, wherein the step of determining comprises:
receiving a reference device type associated with the i-th semiconductor memory device.

16. The method of claim 15, wherein the step of determining comprises:
comparing the search device type with the reference device type to provide a comparison result as the device type determination result.

17. The method of claim 16, further comprising:
holding the comparison result, thereby indicating a previous match between the reference device type and the search device type.

18. The method of claim 7, further comprising:
holding the device type determination result, thereby indicating a previous match between the device type of the i-th semiconductor memory device and the search device type.

19. The method of claim 18, further comprising:
determining whether the step of modifying the search number is performed in response to the held device type determination result.

20. The method of claim 19, wherein the step of modifying the search number comprises:
performing a calculation of the search number with a pre-defined number to provide a modified search number as the output search number.

21. The method of claim 20, wherein the step of determining comprises:
skipping the step of modifying the search number in response to the previous match.

22. The method of claim 19, wherein the step of determining comprises:
skipping the step of modifying the search number in response to the previous match.

23. The method of claim 22, wherein the step of determining comprises:
skipping the step of modifying the received device type in response to the previous match.

24. The method of claim 22, further comprising:
determining the device type of the i-th semiconductor memory device based on the search device type and the reference device type of the i-th semiconductor memory device, thereby providing a present match between the search device type and the reference device type.

25. The method of claim 24, further comprising:
determining whether the step of modifying the search number is skipped, in response to the present match.

26. The method of claim 24, further comprising:
determining whether the step of modifying the search device type is skipped, in response to the present match.

27. The method of claim 24, further comprising:
in response to the present match, determining (i) whether the step of modifying the search device type is skipped; and (ii) whether the step of modifying the search number is skipped.

28. The method of claim 18, further comprising:
determining whether the step of modifying the search device type is performed in response to the held device type determination result.

29. The method of claim 28, wherein the step of determining comprises:
skipping the step of modifying the search device type in response to the previous match.

30. The method of claim 7, wherein the step of sending the serial input signal is repeated with reference to other device type information.

31. The method of claim 7, further comprising:
defining the number of the first to N-th semiconductor memory devices in the serial interconnection configuration,
wherein after the number of the first to N-th semiconductor memory devices in the serial interconnection configuration is defined, the steps of sending, determining, transmitting and receiving are performed.

32. The method of claim 31, wherein the step of defining comprises:
sending a pre-defined device type and an initial search number to a first semiconductor memory device of the first to N-th semiconductor memory devices, the predefined device type matching any device type;

modifying the search number by each of the first to N-th semiconductor memory devices;

receiving the output search number from the N-th semiconductor memory device in the serial interconnection configuration; and recognizing the number of the first to N-th semiconductor memory devices from the received output search number.

33. An apparatus for identifying a device type of a semiconductor memory device in a serial interconnection configuration of first to N-th semiconductor memory devices, N being an integer greater than one, each of the semiconductor memory devices having a semiconductor memory associated therewith, and a device type, the device type being related to the semiconductor memory, at least one semiconductor memory device of the first to N-th semiconductor memory devices being configured to determine the device type of the at least one semiconductor memory device to provide a device type determination result, the device type determination result being transmitted to either a subsequent semiconductor memory device or the apparatus, the at least one semiconductor memory device including:

a device type determiner for providing a device type determination by comparing the device type of the at least one semiconductor memory device to a search device type, a number modifier for modifying a search number in response to the device type determination to provide an output search number with or without being modified, and a device type modifier for modifying the search device type to an other device type in response to the device type determination to provide an output search device type with or without being modified, the output search device type and the output search number corresponding to the device type determination result, the apparatus comprising:

a signal sender for sending a serial input signal including the search device type and the search number to the at least one semiconductor memory device;

a determiner for determining the device type of the at least one semiconductor memory device that receives the serial input signal; and a signal receiver for receiving a serial output signal from the N-th semiconductor memory device, the received serial output signal containing the device type determination result.

34. The apparatus of claim 33, wherein the first to N-th semiconductor memory devices have identical device types or mixed device types that are unidentified.

35. The apparatus of claim 33, wherein the signal sender comprises:

a provider for providing information on the search device type and the search number.

36. An apparatus for identifying a device type of a semiconductor memory device in a serial interconnection configuration of first to N-th semiconductor memory devices, N being an integer greater than one, each of the semiconductor memory devices having a semiconductor memory associated therewith, and a device type, the device type being related to the semiconductor memory, at least one semiconductor memory device of the first to N-th semiconductor memory devices being configured to determine the device type of the at least one semiconductor memory device to provide a device type determination result, the device type determination result being transmitted to either a subsequent semiconductor memory device or the apparatus, the semiconductor memory device including:

a device type determiner for providing a device type determination by comparing the device type of the at least one semiconductor memory device to a search device type, a number modifier for modifying a search number in response to the device type determination to provide an output search number with or without being modified, and a device type modifier for modifying a search device type to an other device type in response to the device type determination to provide an output search device type with or without being modified, the output search device type and the output search number corresponding to the device type determination result, the apparatus being configured to identify a number of the first to N-th semiconductor memory devices in the serial interconnection configuration and to be responsive to the identification of the number of the semiconductor memory devices in the serial interconnection configuration, the apparatus comprising:

a sender for sending a serial input signal including the search device type and the search number to the at least one semiconductor memory device;

a receiver for receiving a serial output signal from the N-th semiconductor memory device, the serial output signal containing the device type determination result; and, a determiner for determining the device type of the at least one semiconductor memory device that receives the serial input signal in response to the device type determination result.

37. An apparatus for communicating with a serial interconnection configuration of first to N-th semiconductor memory devices, N being an integer greater than one, each semiconductor memory device having a semiconductor memory associated therewith, and a device type, the device type being related to the semiconductor memory, each i-th semiconductor memory device of the first to N-th semiconductor memory devices, where i can be 1 to N, being configured to a compare the device type of the i-th semiconductor memory device to information data to provide a comparison result, to modify the information data in response to the comparison result, and to provide a device type determination result containing the information data to an (i+1)-th semiconductor memory device or the apparatus, the apparatus comprising:

a signal provider for providing a serial input signal including the information data to a first semiconductor memory device of the first to N-th semiconductor memory devices, the information data including a search device type and a search number that are modifiable by each i-th semiconductor memory device in response to the comparison result by each i-th semiconductor memory device;

a signal receiver for receiving a serial output signal from the N-th semiconductor memory device of the first to N-th semiconductor memory devices, the serial output signal containing the device type determination result; and a recognizer for recognizing a total number of the semiconductor memory devices of the first to N-th semiconductor memory devices in response to the search number, and identifying the device type in the serial interconnection configuration in response to the total number, the search device type and the search number.

38. A semiconductor memory device configured in a serial interconnection of first to N-th semiconductor memory devices, N being an integer greater than one, each of the semiconductor memory devices having a semiconductor memory associated therewith, and a device type, the device type being related to the semiconductor memory, the serial interconnection of first to N-th semiconductor memory devices being coupled to an external device for providing information data including a search device type and a search number, the semiconductor memory device comprising:

a determiner for comparing the device type of the semiconductor memory to the search device type and providing a determination result in response to the information data provided by the external device or a previous semiconductor memory device;

a modifier for modifying the search device type and the search number in response to the determination result; and a transmitter for transmitting a combination of the search device type and the search number to a subsequent semiconductor memory device.

39. The semiconductor memory device of claim 38, wherein the modifier comprises:

a number modifier for modifying the received search number in response to the device type determination result, thereby providing an output search number with or without being modified.

40. The semiconductor memory device of claim 39, wherein the modifier further comprises:

a device type modifier for modifying the received search device type in response to the determination result, thereby providing an output search device type with or without being modified.

41. The semiconductor memory device of claim 40, further comprising:

a device type replacer for replacing the received search device type with a pre-defined device type that matches any one of the device types, as the output search device type.

42. A machine-readable medium storing commands and instructions which, when executed, cause a processor to perform a method of identifying a device type of a semiconductor memory device in a serial interconnection configuration of first to N-th semiconductor memory devices, N being an integer greater than one, each semiconductor memory device having a semiconductor memory associated therewith, and a device type, the device type being determined by the semiconductor memory, the method comprising:

sending a serial input signal including device type information to an i-th semiconductor memory of the first to N-th semiconductor memory devices, where i can be 1 to N, the device type information including a search device type and a search number;

determining the device type at the i-th semiconductor memory device that receives the device type information by comparing the device type of the i-th semiconductor memory device to the search device type and providing a device type determination result from the comparison;

modifying the search number in response to the device type determination result to provide an output search number with or without being modified to an (i+1)-th semiconductor memory device or the processor;

modifying the search device type to an other device type in response to the device type determination result to provide an output search device type with or without being modified to the (i+1)-th semiconductor memory device or the processor, the output search number and the output search device type being provided in a serial output signal; and receiving the serial output signal from the i=N-th semiconductor memory device at the processor.

43. The machine-readable medium of claim 42, wherein the method further comprises:

identifying the number of the first to N-th semiconductor memory devices in the serial interconnection configuration, wherein the step of identifying the number is performed before the steps of sending, determining, modifying the search number, modifying the search device and receiving.

44. A machine-readable medium storing commands and instructions which, when executed, cause a processor to perform a method for modifying received information in a semiconductor memory device of a serial interconnection configuration of first to N-th semiconductor memory devices, N being an integer greater than one, each of the semiconductor memory device having a semiconductor memory associated therewith, a device type, the device type being related to the semiconductor memory, the method comprising:

receiving the information including a search device type and a search number at an i-th semiconductor memory device of the first to N-th semiconductor memory devices, where i can be one to N;

determining the device type of the i-th semiconductor memory device by comparing the search device type to the device type of the i-th semiconductor memory device, and providing a device type determination result from the comparison;

modifying the search device type and the search number in response to the device type determination result to provide a modified search device type and a modified search number; and transmitting the modified device type and the modified search number.

* * * * *